INVENTORS
DONALD E. HUFFMAN
PETER P. PETROS
WALTER J. ZENNER
BY
ATTORNEY

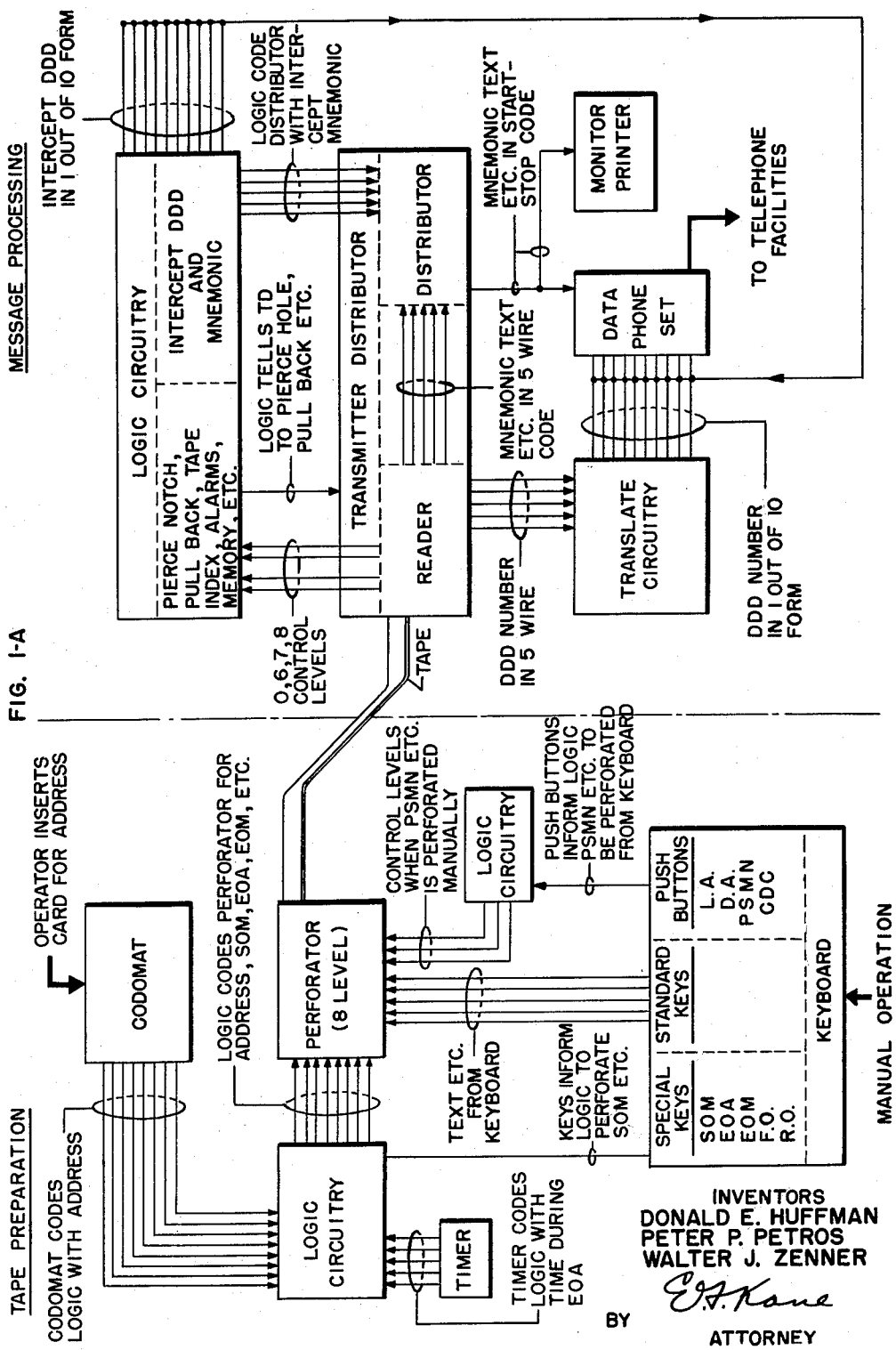

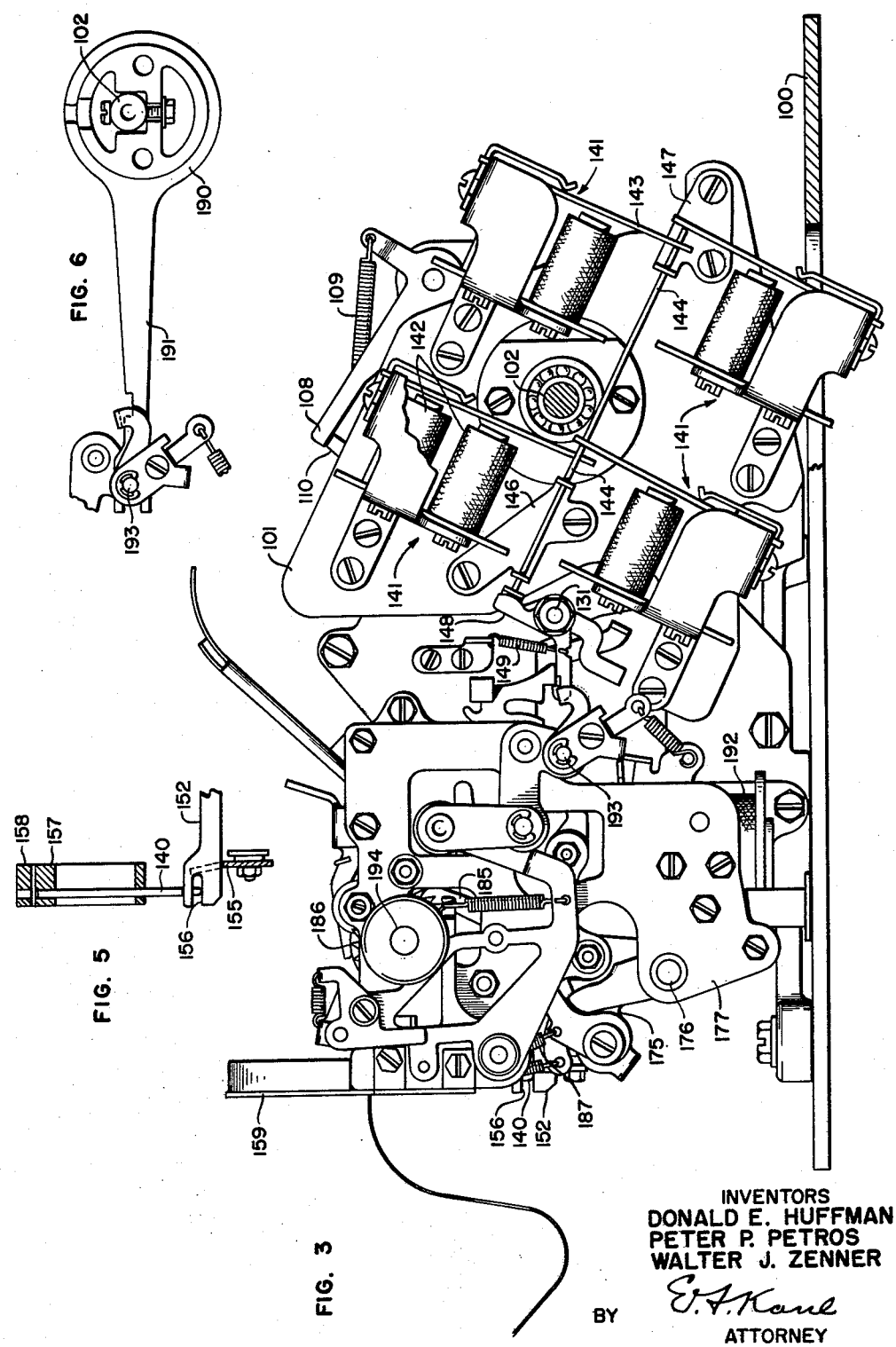

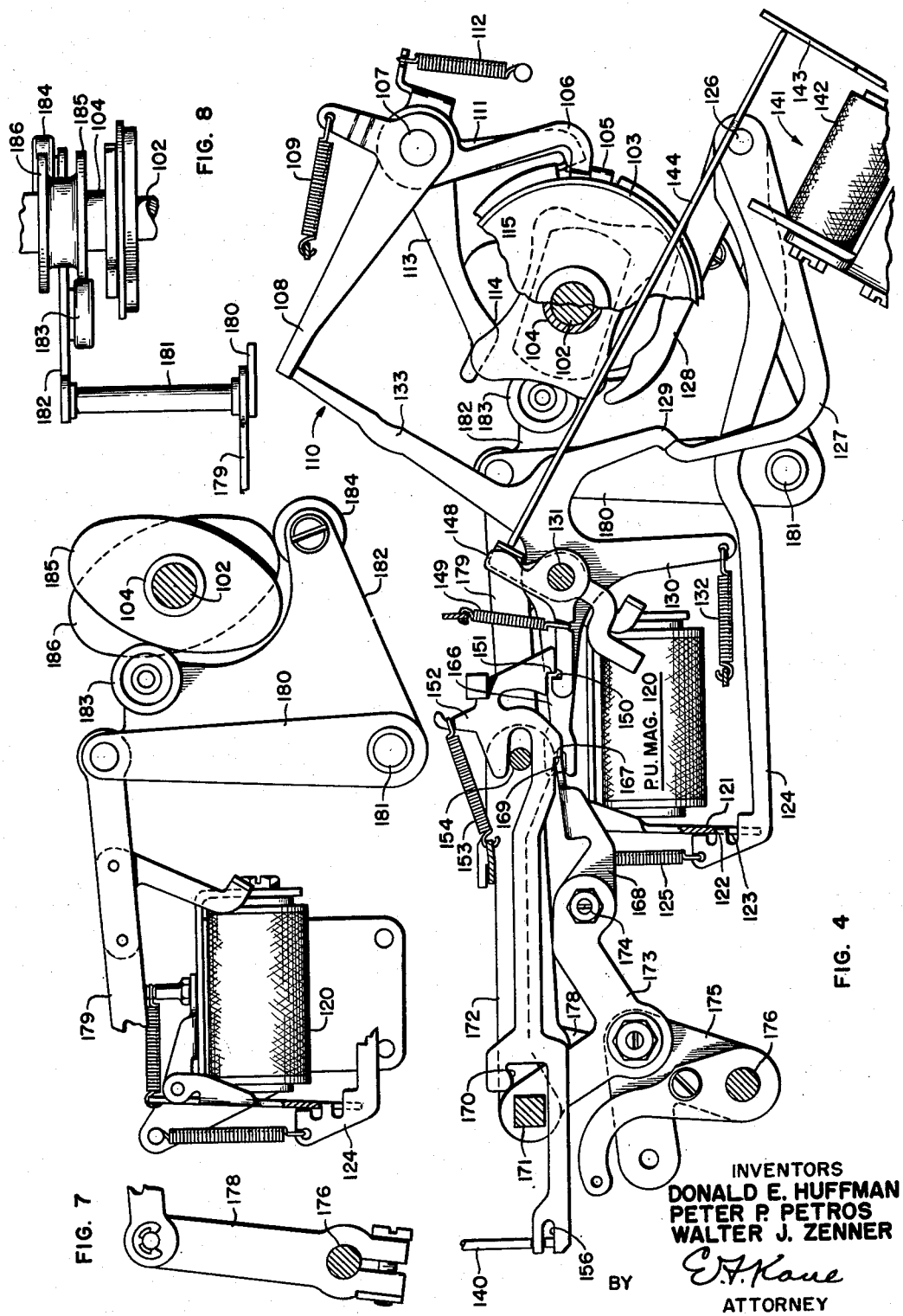

INVENTORS
DONALD E. HUFFMAN
PETER P. PETROS
WALTER J. ZENNER

BY E.H.Kane
ATTORNEY

INVENTORS
DONALD E. HUFFMAN
PETER P. PETROS
WALTER J. ZENNER

BY  E. F. Kane
ATTORNEY

INVENTORS
DONALD E. HUFFMAN
PETER P. PETROS
WALTER J. ZENNER

BY *E.F. Kane*

ATTORNEY

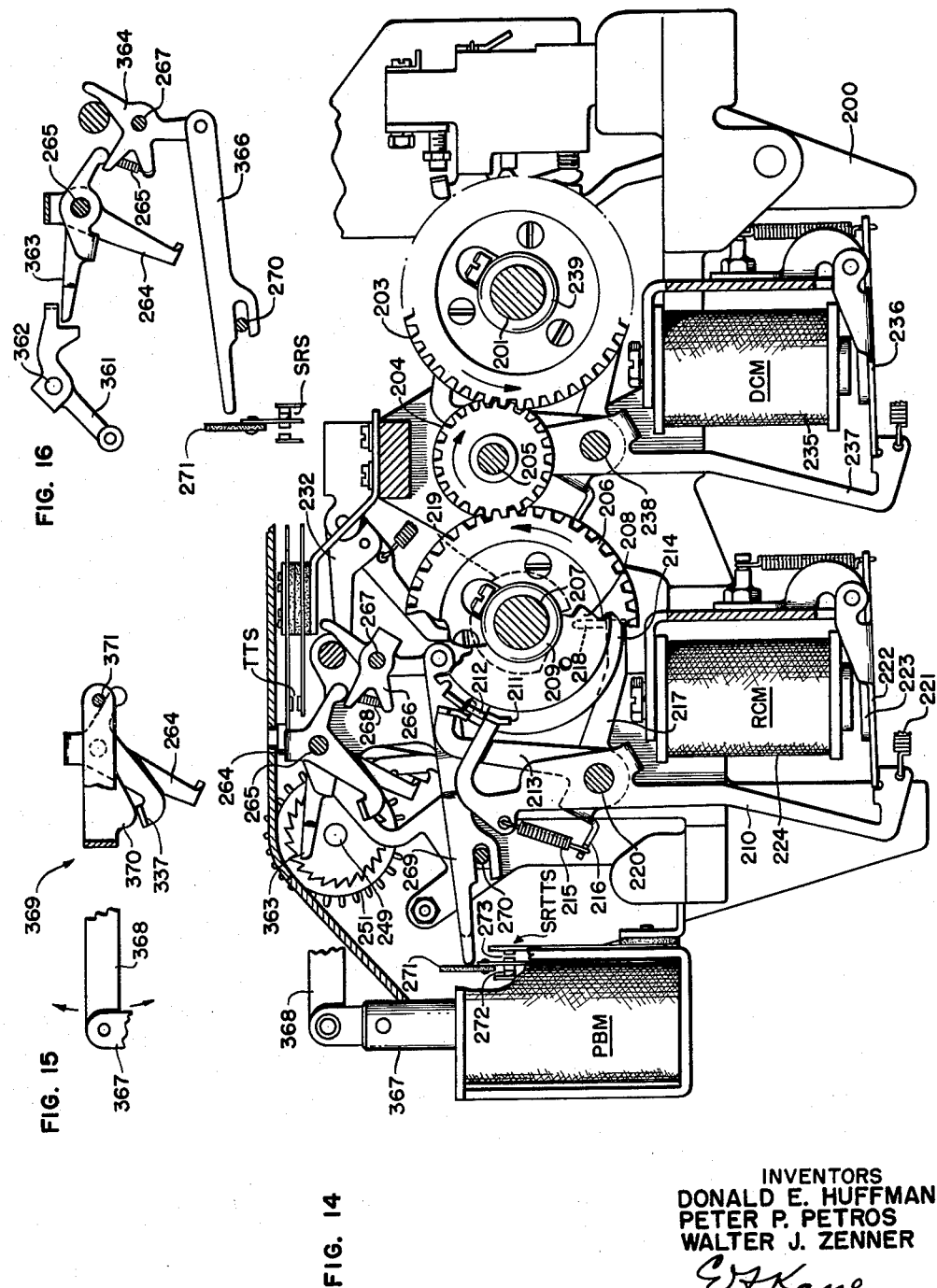

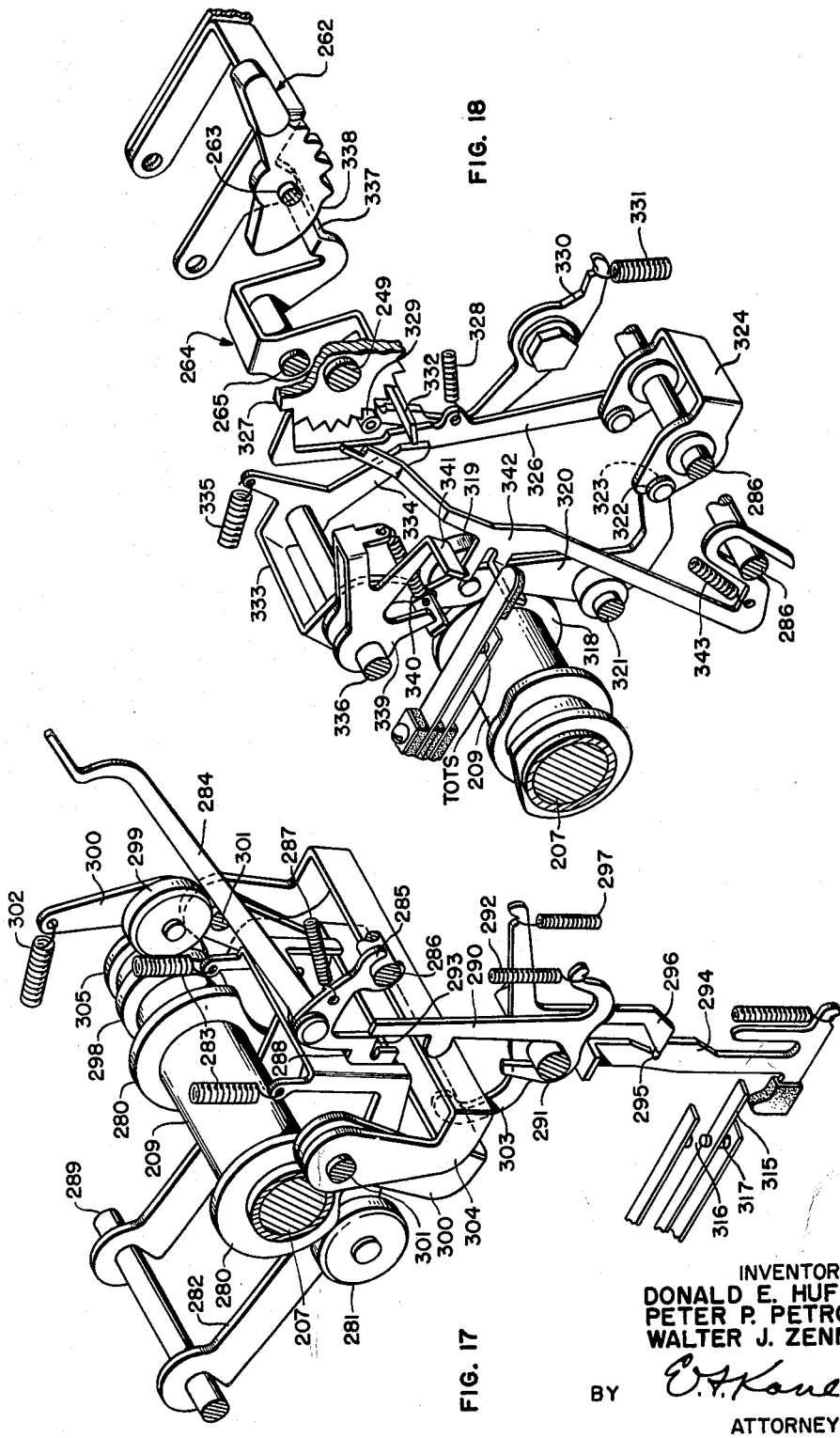

S.O.M. & E.O.M. CONTROL CIRCUIT

SESS SELECTOR CIRCUIT

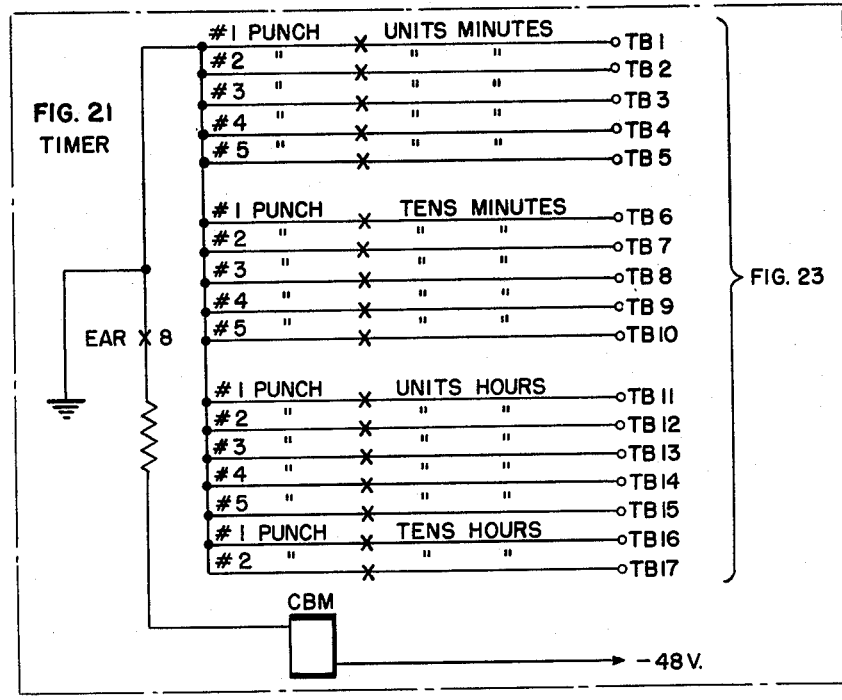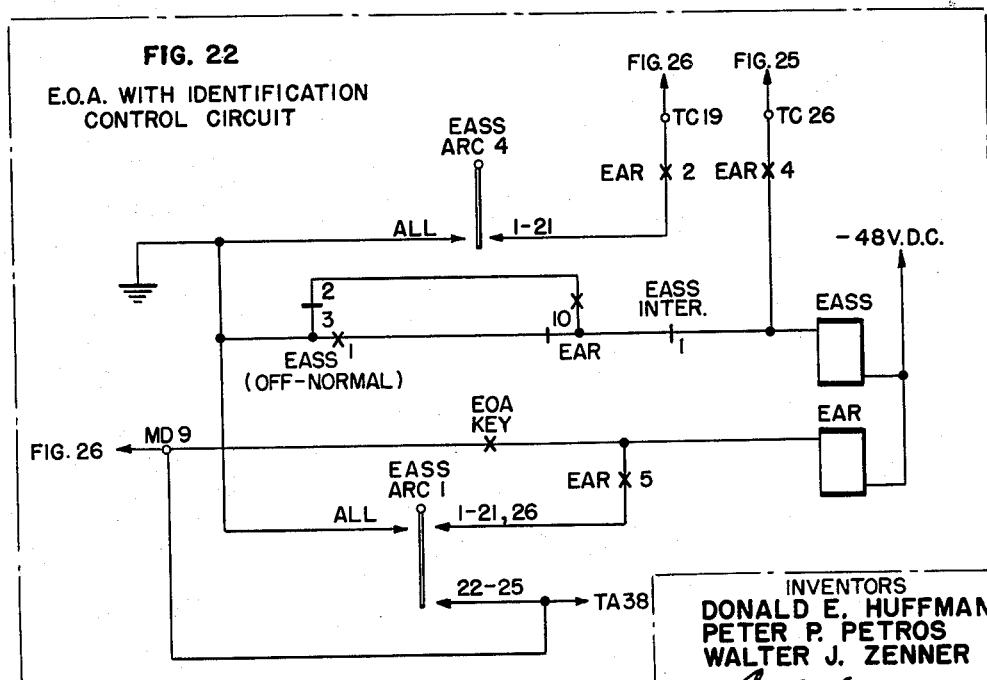

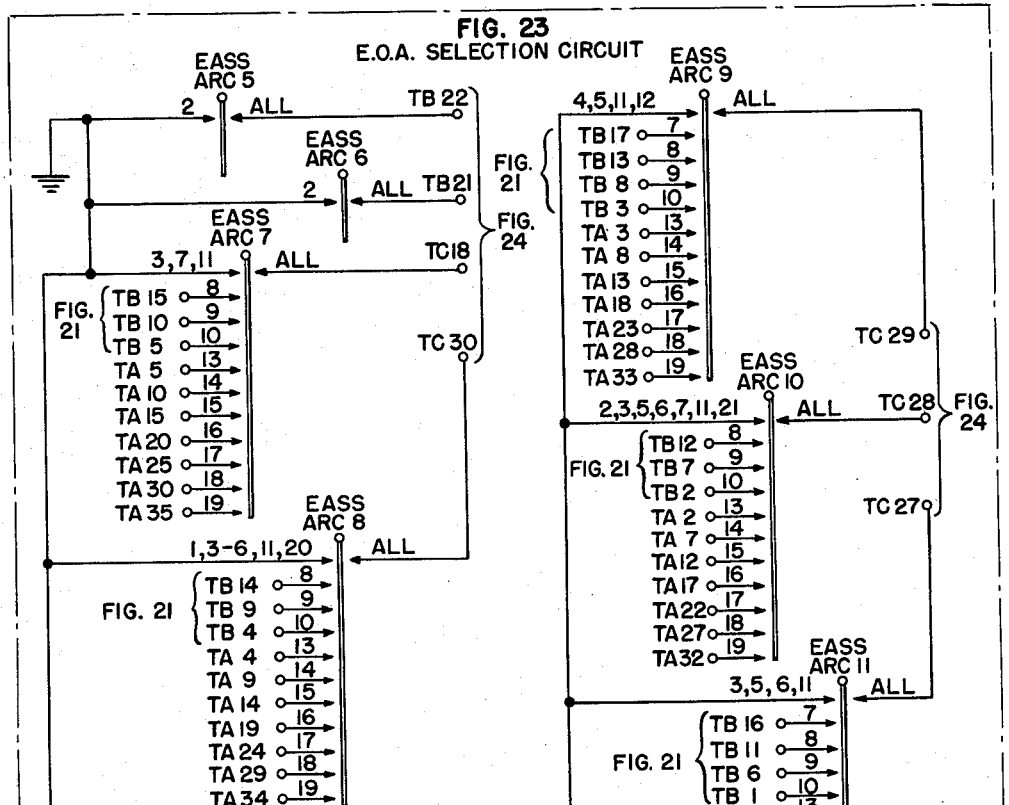
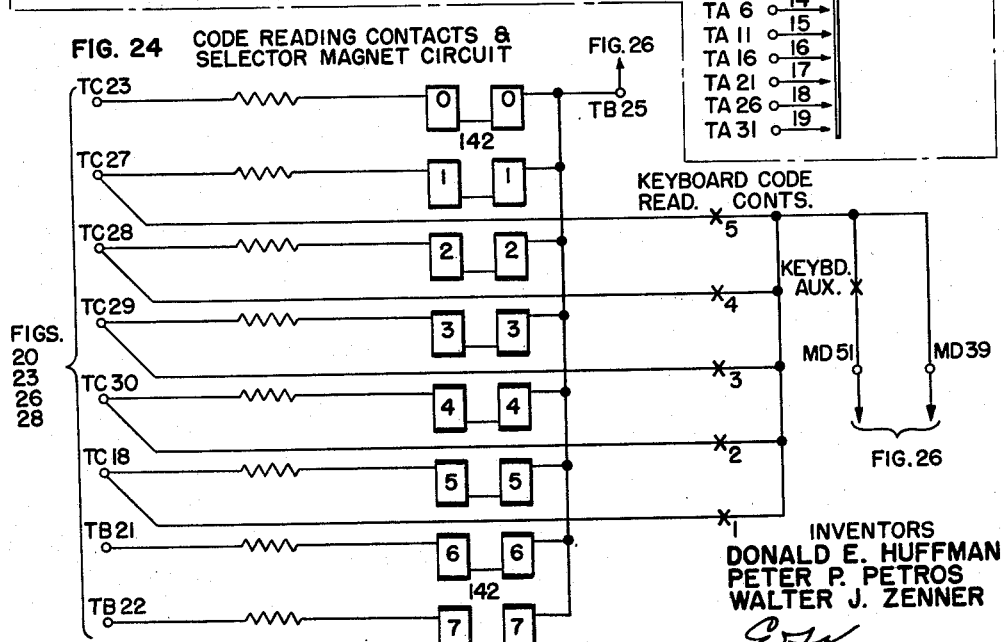

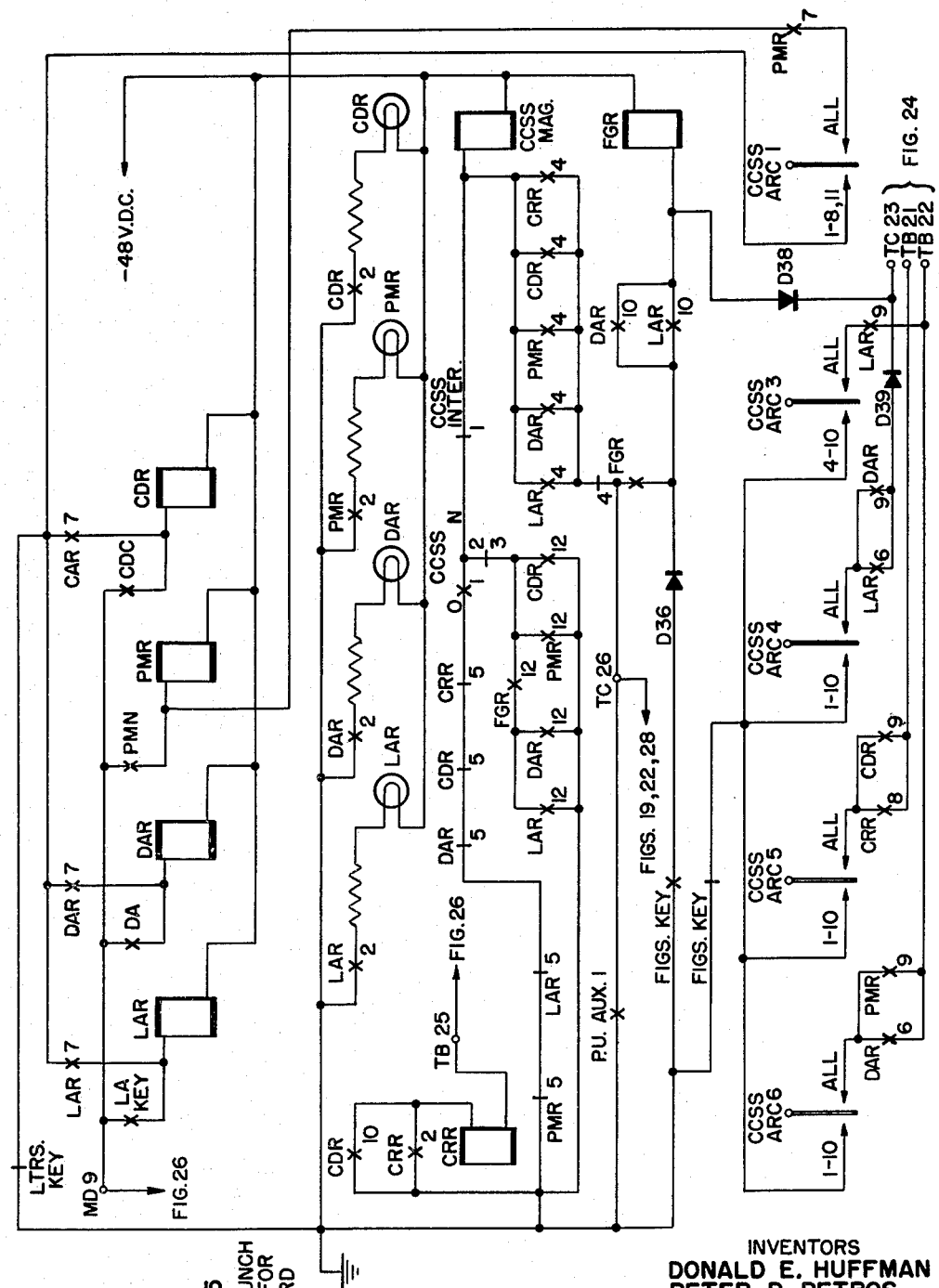

CODOMAT & PUNCH
CONTROL CIRCUIT

INVENTORS
DONALD E. HUFFMAN
PETER P. PETROS
WALTER J. ZENNER
BY E.F. Kane
ATTORNEY

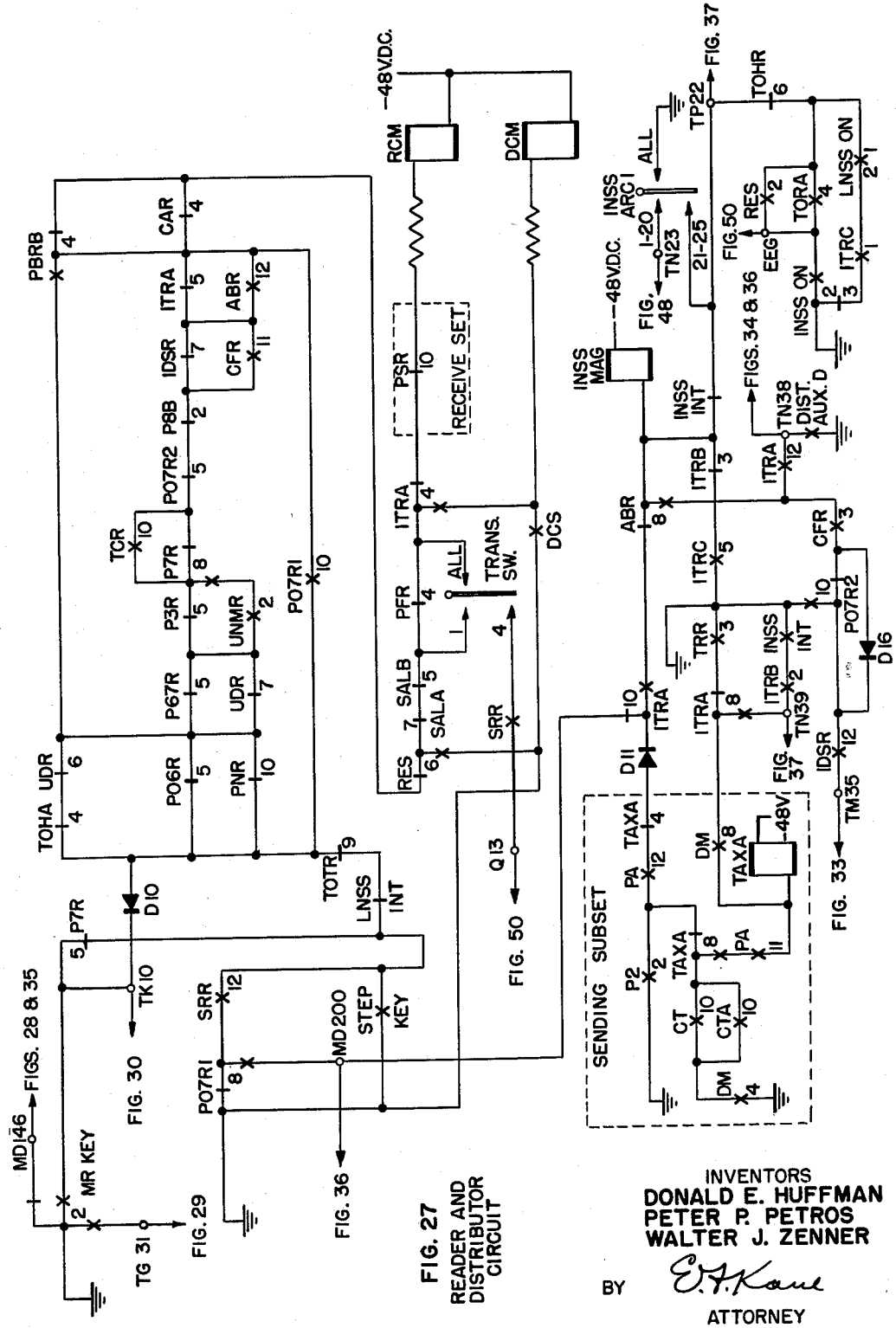

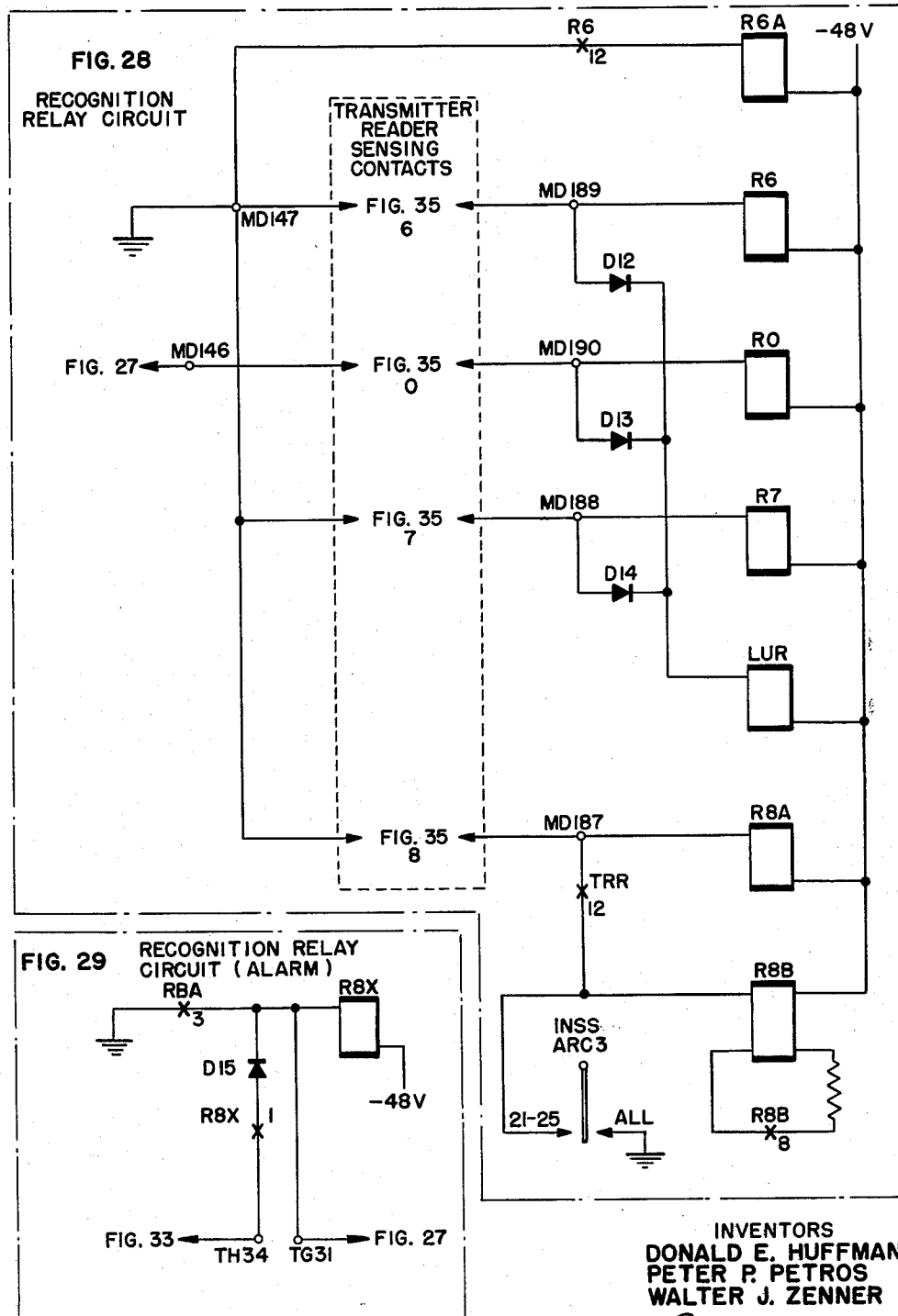

March 10, 1964  D. E. HUFFMAN ETAL  3,124,643
APPARATUS FOR AUTOMATICALLY EFFECTING LINE
SWITCHING OF TELEGRAPH MESSAGES
Filed Sept. 5, 1961  31 Sheets-Sheet 18

RUN OUT MAGNET CIRCUIT

TAPE CLAMP CIRCUIT

STOP RUN SWITCH CIRCUIT

INVENTORS
DONALD E. HUFFMAN
PETER P. PETROS
WALTER J. ZENNER

BY *E. F. Kane*

ATTORNEY

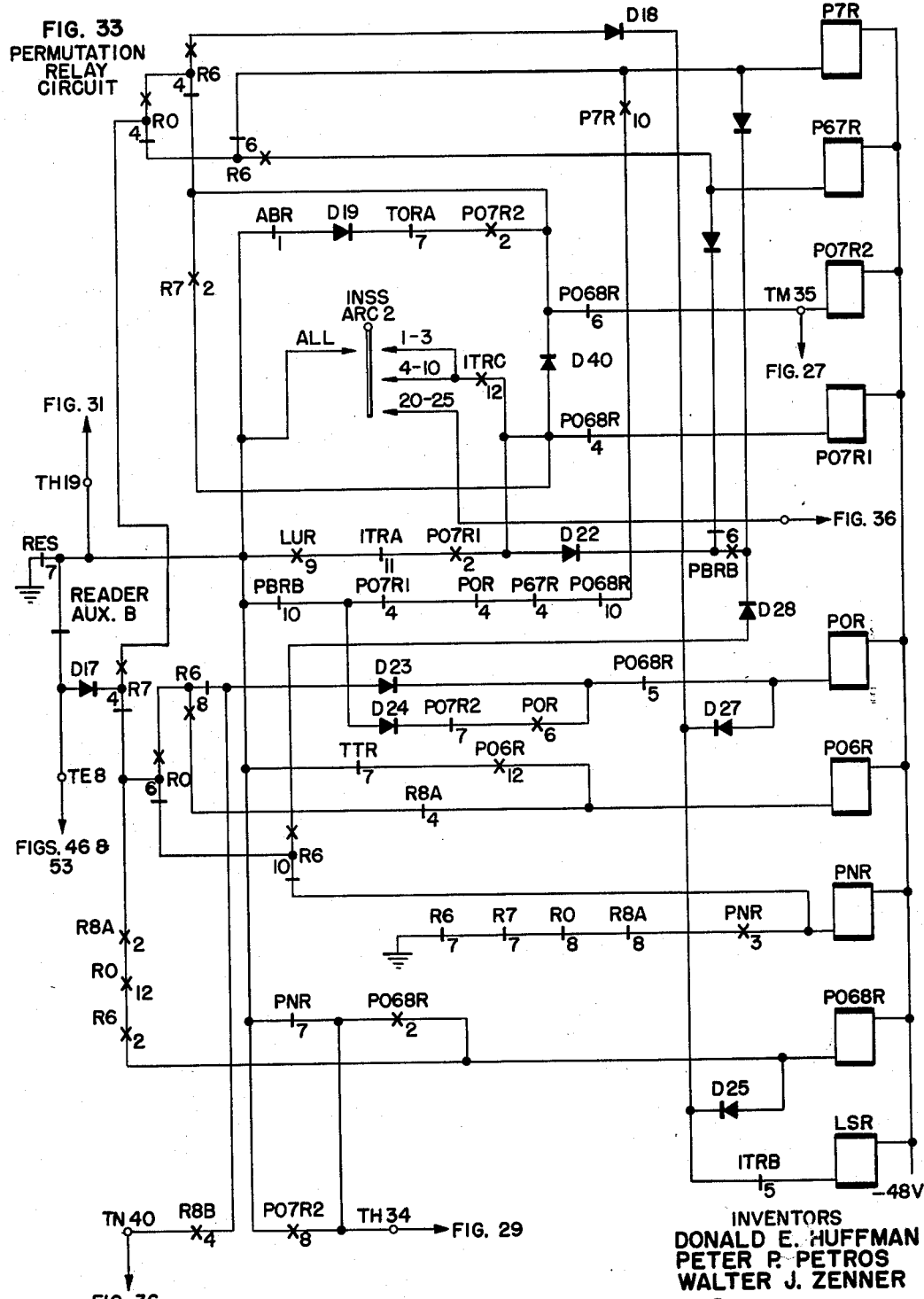

TRANSMITTER OFF HOOK CIRCUIT

INTERCEPT INITIATION CIRCUIT

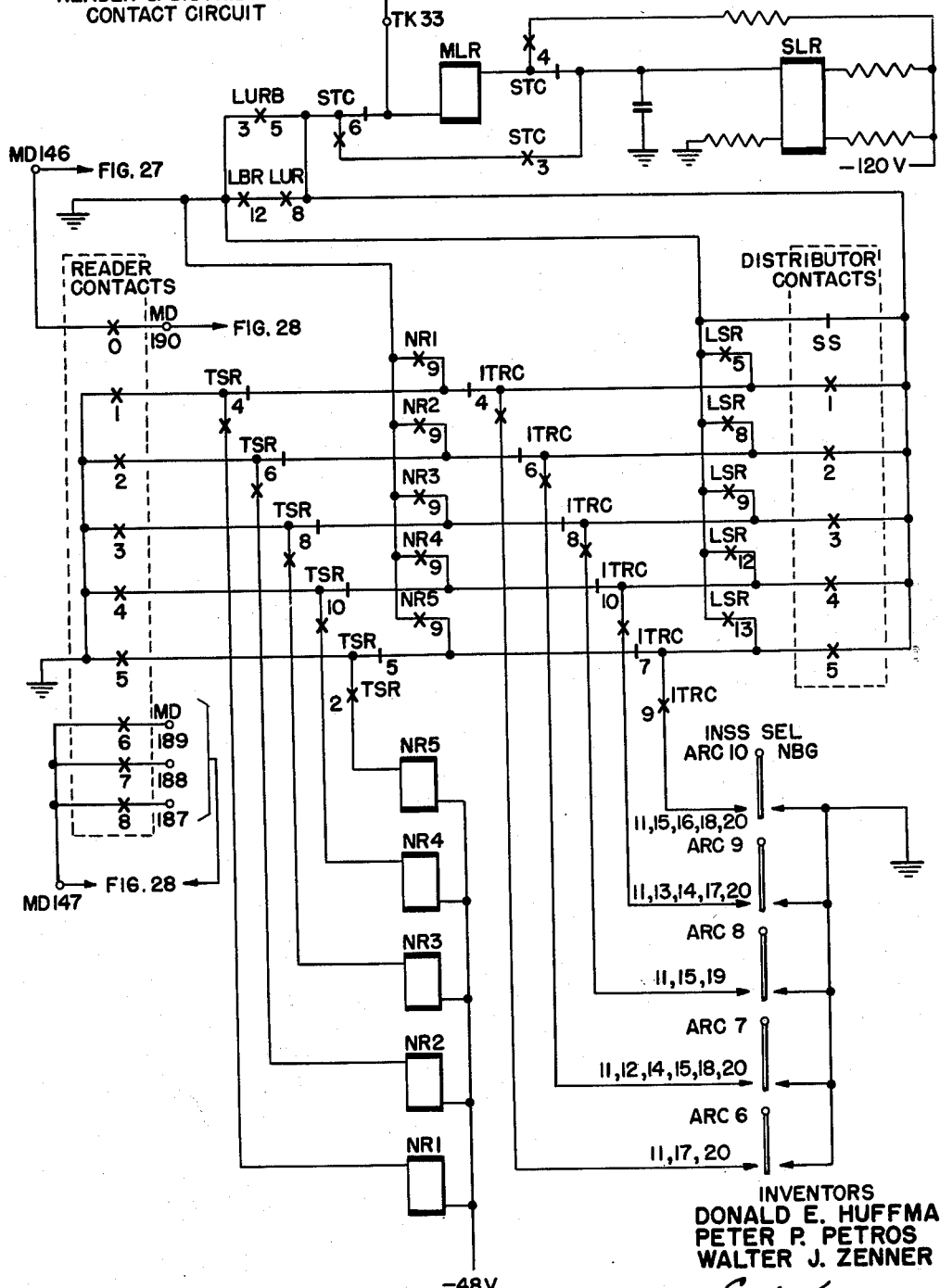

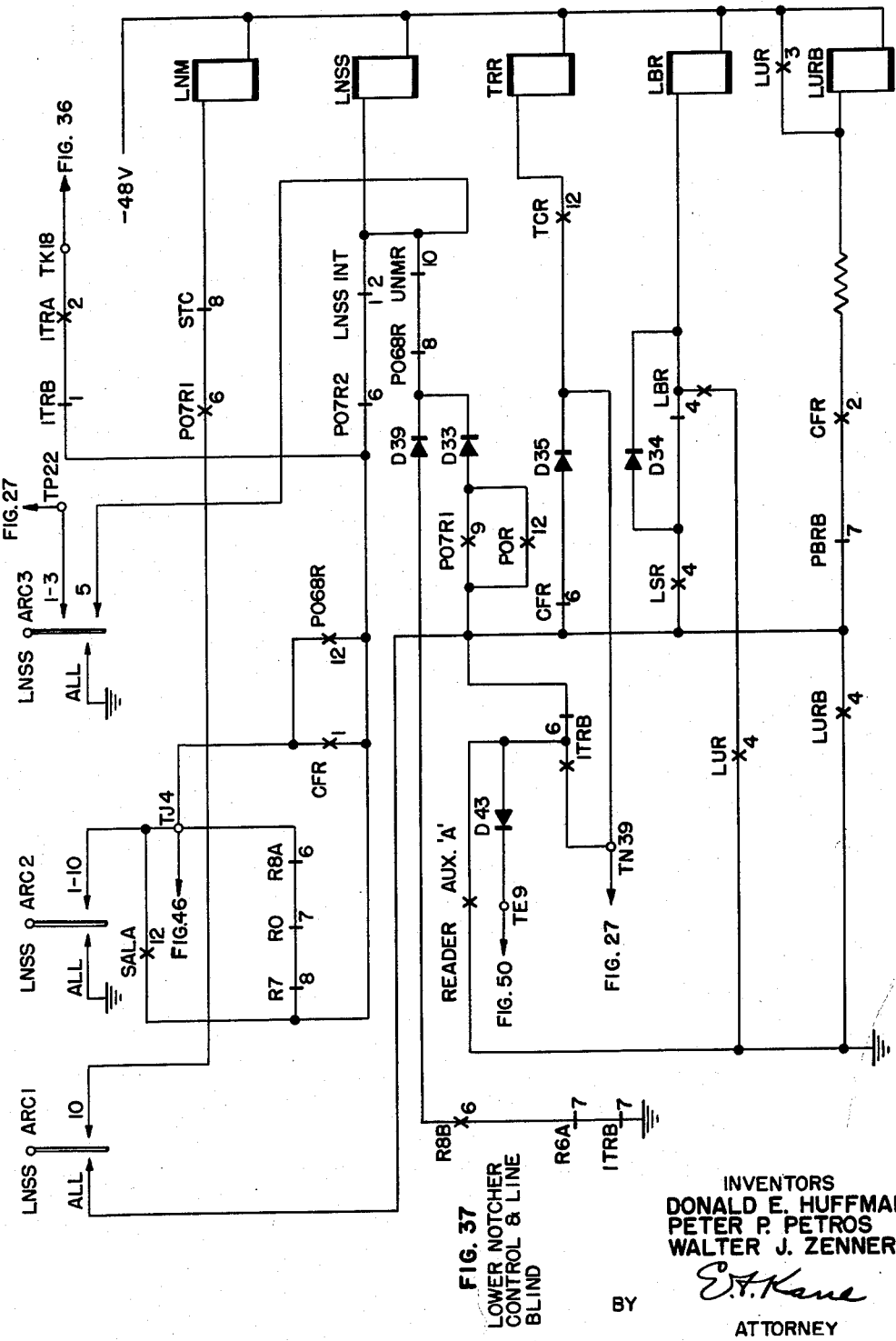

ANSWER BACK CONFIRMATION
AND CIRCUIT ASSURANCE

INVENTORS
DONALD E. HUFFMAN
PETER P. PETROS
WALTER J. ZENNER
BY
ATTORNEY

SENDING LINE CIRCUIT

TIGHT TAPE CIRCUIT

UPPER NOTCHER

PULL BACK & PULL FORWARD
RELAY CIRCUIT

INVENTORS
DONALD E. HUFFMAN
PETER P. PETROS
WALTER J. ZENNER

BY *E.F.Kane*

ATTORNEY

March 10, 1964   D. E. HUFFMAN ETAL   3,124,643
APPARATUS FOR AUTOMATICALLY EFFECTING LINE
SWITCHING OF TELEGRAPH MESSAGES
Filed Sept. 5, 1961   31 Sheets-Sheet 25
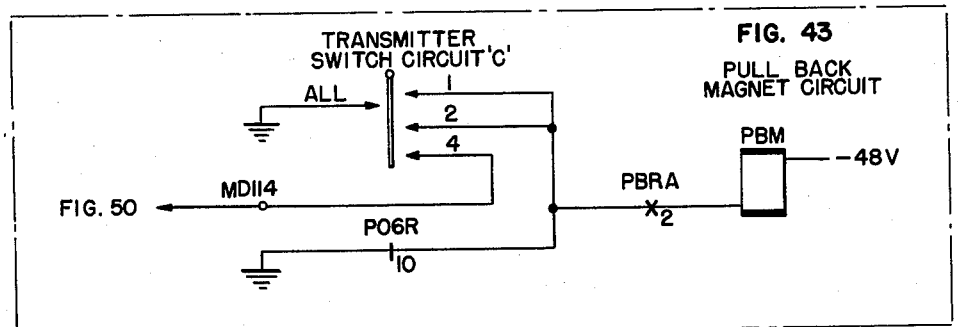
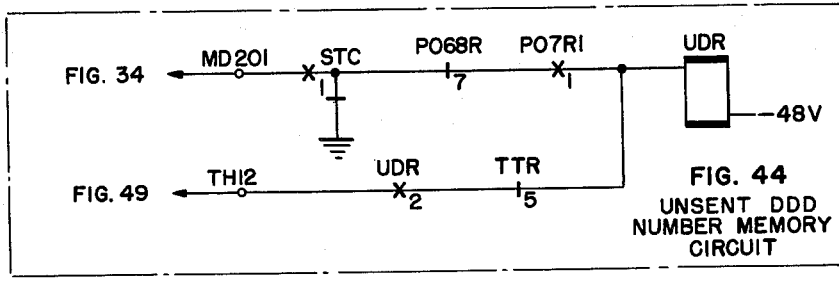
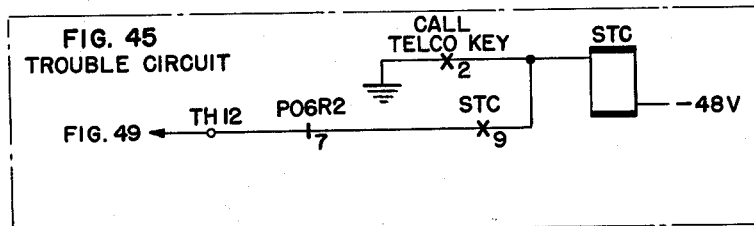
INVENTORS
DONALD E. HUFFMAN
PETER P. PETROS
WALTER J. ZENNER
BY   *E.F.Kane*
ATTORNEY

TAPE CHECK CIRCUIT

INVENTORS
DONALD E. HUFFMAN
PETER P. PETROS
WALTER J. ZENNER

MONITORING CIRCUIT

March 10, 1964    D. E. HUFFMAN ETAL    3,124,643
APPARATUS FOR AUTOMATICALLY EFFECTING LINE
SWITCHING OF TELEGRAPH MESSAGES
Filed Sept. 5, 1961    31 Sheets-Sheet 28

TIMER RELAY CIRCUIT

ALARM, LAMP & BUZZER CIRCUIT

INVENTORS
DONALD E. HUFFMAN
PETER P. PETROS
WALTER J. ZENNER

BY E. F. Kane
ATTORNEY

March 10, 1964   D. E. HUFFMAN ETAL   3,124,643
APPARATUS FOR AUTOMATICALLY EFFECTING LINE
SWITCHING OF TELEGRAPH MESSAGES
Filed Sept. 5, 1961   31 Sheets-Sheet 29
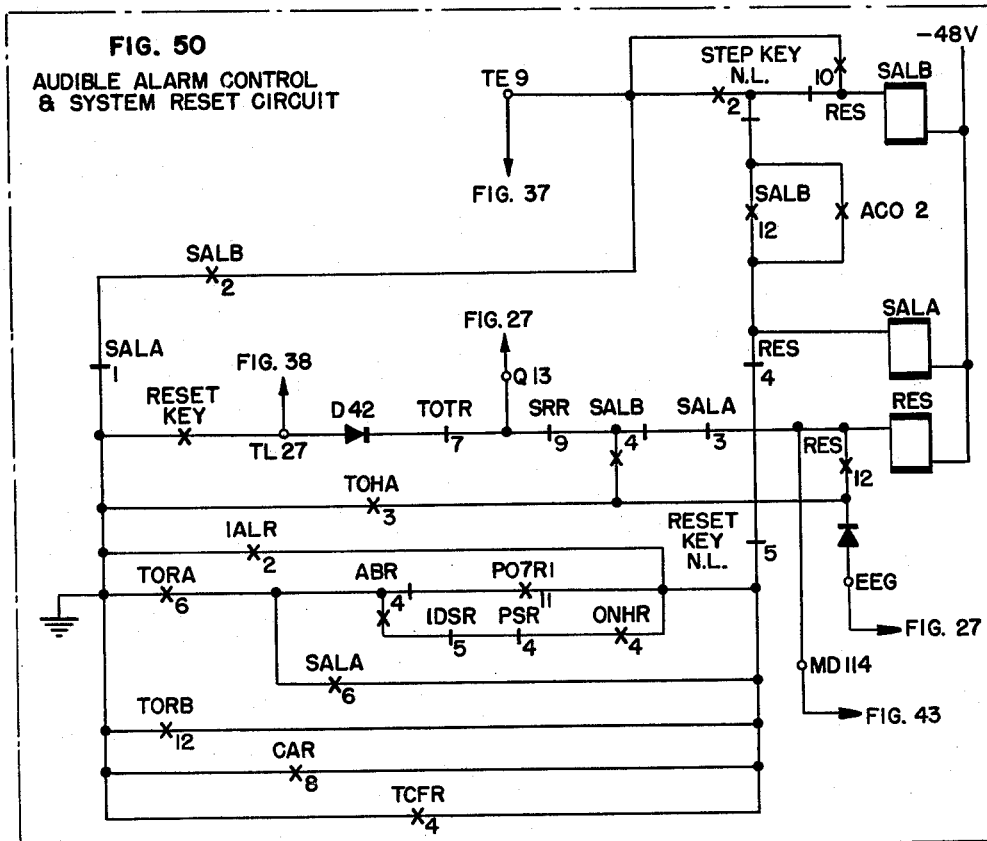
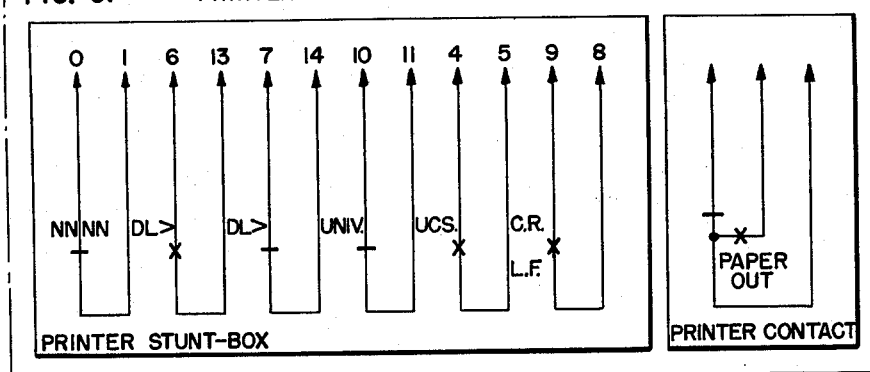
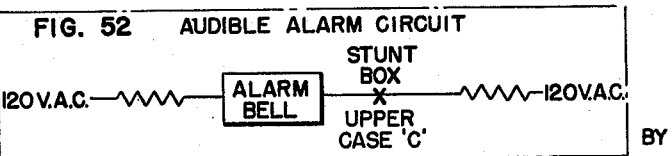
INVENTORS
DONALD E. HUFFMAN
PETER P. PETROS
WALTER J. ZENNER
BY
ATTORNEY

TRANSLATOR CIRCUIT

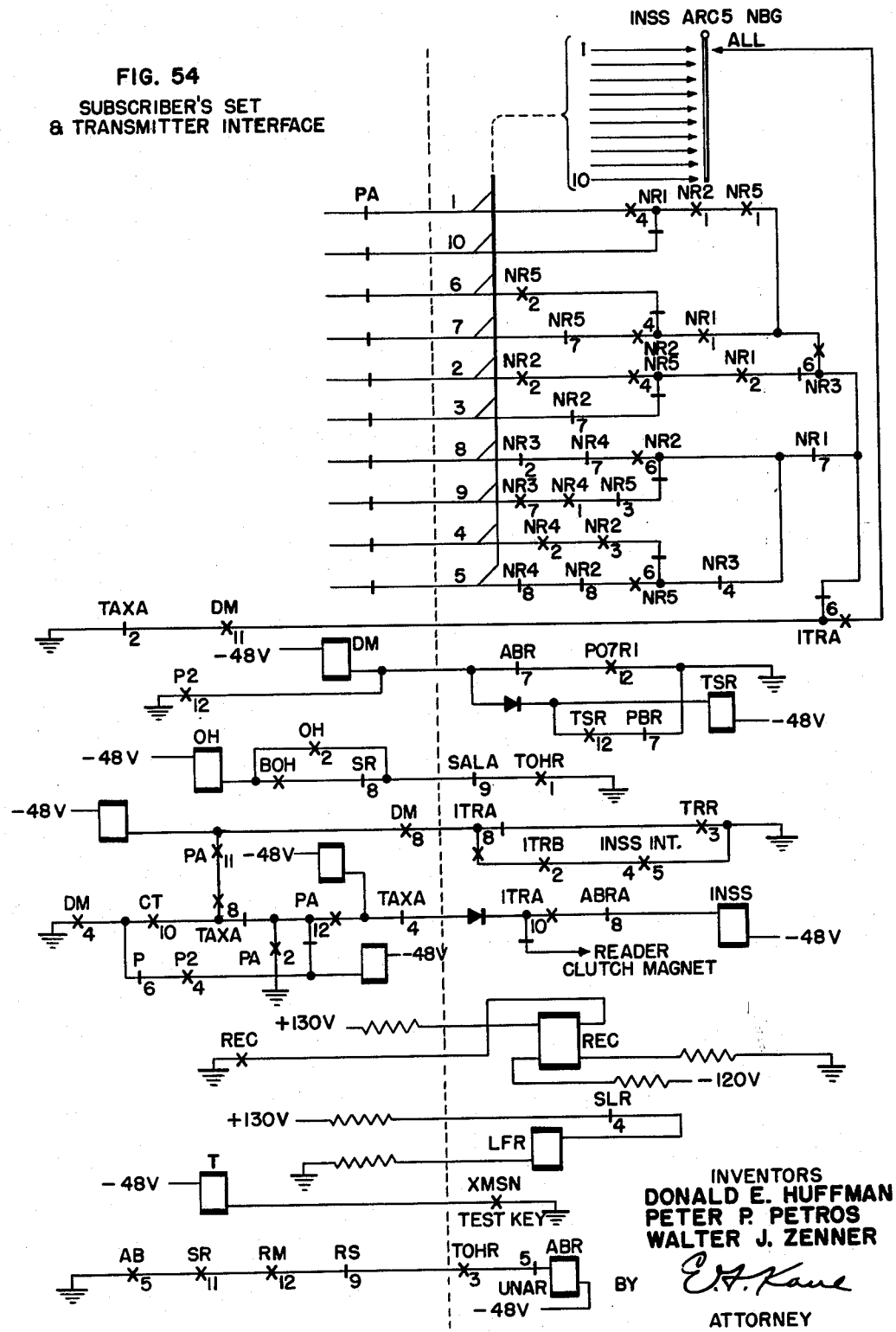

United States Patent Office 3,124,643
Patented Mar. 10, 1964

3,124,643
APPARATUS FOR AUTOMATICALLY EFFECTING LINE SWITCHING OF TELEGRAPH MESSAGES
Donald E. Huffman and Peter P. Petros, Chicago, and Walter J. Zenner, Des Plaines, Ill., assignors to Teletype Corporation, Skokie, Ill., a corporation of Delaware
Filed Sept. 5, 1961, Ser. No. 135,857
27 Claims. (Cl. 178—3)

This invention relates to improvements in automatic telegraph switching systems and more particularly to apparatus for automatically effecting line switching of telegraph messages.

In the past, many switching systems have gone into use which automatically control the selection of a distant station in accordance with information set up at a transmitting station. These systems, however, have comprised private line "message switching" systems wherein the messages are individually relayed from switching point to switching point with some form of message storage mechanism at each switching point and retransmitted at each intermediate switching point. Other systems have been devised, but have very seldom gone into use, wherein the transmission has been over telephone switching lines and in these types of systems proposed hereinbefore a connection from a transmitting station to a receiving station has been sent out by manually dialing a telephone number with an operator waiting to determine whether the connection to the called distant station has been completed and upon completion of the connection through to the called distant station the operator then would enable mechanism for automatically transmitting a telegraph message over the telephone lines.

It is an object of the present invention to provide facilities for automatically selecting distant stations in line switching systems.

Another object of the invention is to provide apparatus for automatically attempting repeatedly to make a connection to a distant station over a line switching system in the event the connection is not made on the original attempt to make it.

Yet another object of the invention is to relieve an operator of as much responsibility for manipulation of the keys of a teletypewriter as possible.

A still further object of the invention is to relieve an operator of the responsibility of manually keying in addresses of called subscribers wherein a multiplicity of codes are necessary for each address of a called subscriber, thus, reducing the possibility of error in perforating a message tape which is to be used in transmission of the messages to one or more addressees.

In accordance with one embodiment of the invention, particularly adapted for use in communications systems for air lines, facilities are provided for completely preparing a control tape, including one or more addresses and a message for automatically controlling transmission over a line switching communications system. Since there is an international agreement among air lines under which mnemonic codes have been adopted by them as addresses and can be any combination of seven letters that the particular air line prefers, for example, the mnemonic code "ATLOODL" indicates "Atlantic Operations Office Delta." This code indicates that the message is addressed to Delta Air Lines Operation Office at Atlanta, Georgia. In order that the messages transmitted over the system to which the present invention applies may also be transmitted over other types of systems, it is necessary that the mnemonic code of the addressed party or station be included in any message transmitted by the system to which the present invention applies.

The first step to be taken in the operation of the system to which the present invention applies consists in preparing a tape for controlling the transmission of messages to one or more stations on the system or to a receiving station connected into a private line message switching system.

According to the present invention a tape is prepared by a tape perforator capable of receiving a parallel input from a directory device such as that disclosed in the copending application of W. J. Zenner, Serial No. 840,938, filed September 18, 1959, now Patent No. 3,014,093, or from keyboard controlled circuitry. The directions controlled or keyboard controlled circuitry in conjunction with the keys on the keyboard control the preparation of the tape which then fed to a reader that will control the entire handling of the message insofar as the transmitting station is concerned. In preparing the tape an eight level tape perforator is provided which may be selectively operated to perforate in the tape a five unit code for the significant characters to be used in transmitting a message in accordance with the well known Baudot code and to perforate three additional perforations for control purposes. These levels of perforations are designated 0 and 1 to 7, the levels 1 to 5 being assigned to the Baudot code.

The tape reader which reads the tape and completely controls the transmission of the message, after the tape has been prepared, has in it a pair of piercing punches which are utilized in controlling the completion of a connection to a called station from the originating station. This reader is placed in close proximity to the tape perforator and is operable to feed the tape forward to read the intelligence and the control perforations in the tape and is also operable to pull the tape back to re-sense or re-read portions of it in completing the transmission of a message from the originating station to a called station.

In preparing the tape a leader must be fed out of the tape perforator a sufficient distance to properly position it with respect to the tape reader. A feed-out key is provided on the keyboard of the transmitting apparatus for controlling the feeding of tape without any code perforations being perforated in it. Operation of the feed-out key on the keyboard of the transmitting apparatus will cause tape to be fed out as long as the key is held operated. Approximately six or seven inches is fed out of the reperforator thereby to provide sufficient tape to bridge the gap between the reperforator and the transmitter and to bridge a pair of tape feed wheels in the transmitter or reader.

When the apparatus is to be used to transmit a message to one or more called stations the leader of tape is thus sent out of the perforator under control of the operator and the operator at the originating station then operates a start-of-message key which initiates the operation of a stepper switch at the originating station. This stepper switch will cause the perforator to punch the permutation code combination for "LETTERS, CARRIAGE RETURN, LINE FEED, LETTERS" in the five-unit Baudot code in the tape and also cause the perforator to punch a control hole in the seventh level associated with the first letters code symbol. Thus, upon the operation of the start-of-message key the stepper switch will control the reperforator to cause the start-of-message code to be perforated in the tape.

The keyboard may be of any suitable type wherein keys permutatively control the actuation of code bars to permutatively effect the closure of contact springs for in turn controlling the operation of the perforator. A suitable type of keyboard controlled contact operating mechanism which would be suitable for use in this apparatus is illustrated in the book by H. H. Harrison entitled, Printing Telegraph Systems and the Mechanism, published in 1923, where on page 134 a keyboard is illustrated for permutatively controlling the closure of contacts. The keyboard in addition to containing keys for the transmission of intelligence code signals, is provided with a plurality of control keys such as the start-of-message key described hereinbefore, an end-of-address key, an end-of-message key and other control keys for effecting control functions of the apparatus. Depression of these keys will cause the automatic perforation of the format sequence indicated on the key by the tape perforator. The operator at the transmitting station may utilize the keyboard manually to control the perforation of addresses in the tape by operating suitable keys on the keyboard provided for this purpose or the operator may insert the station addresses in the tape by utilizing the directory device of the copending application of W. J. Zener referred to hereinbefore, and hereinafter termed the Codomat.

As pointed out hereinbefore, at the initiation of an operation directing a message to one or more addresses, the operator operates the start-of-message key which will cause the perforator to perforate the start-of-message code in the tape. After this operation has been effected, the address or telephone number of the called station may be punched in the tape either on the control of the Codomat or, if the station to be called is not listed on the Codomat cards, the operator at the originating station may cause this coded information to be perforated in the tape under manual control of the keyboard.

The operator may, by the use of four special keys known as "local area, distant area, pseudomnemonic and call directing code" keys, select a particular area to which a message is to be directed and may thereafter operate the keys on the keyboard to cause the perforator to perforate the number of the called subscriber in the tape, thus, putting into the tape under operator control and manipulation of the keys, addresses similar to those which may be put into the tape under control of the Codomat. This information must include the telephone number of the called station or stations which will comprise ten digits, if the called stations are available in the system, plus the mnemonic code for the called station which will comprise seven characters in the case of all those stations connected directly into the system. If it is desired to transmit the message to other air lines not on the system, the telephone number and a pseudo-mnemonic code may be set up properly to identify the called air lines and these addresses will connect the present system into an interchange station where the address and message will be properly perforated in a reperforator for translation and transmission over another system to the desired station.

A telephone number and address in mnemonic code for each of the receiving printers which are to receive the message to be transmitted from the originating station, are perforated in the tape in succession. In other words, the procedure just outlined may be repeated to perforate multiple addresses in the tape prior to the operation of the keyboard to perforate in the tape the text of the message which is to be sent to these addresses.

If it is desired to broadcast messages, such for example as weather reports, from an originating station of this system to a large plurality of receiving printers it may be advisable to use a different system for this broadcasting where the message may be transmitted simultaneously to the plurality of stations. No broadcasting of a message simultaneously to a number of stations can be effected within the line switching system under consideration herein.

After all of the addresses of the receiving printers, to which a given message is to be directed, have been perforated in the tape, the operator operates an end-of-address (EOA) key. Operation of the end-of-address key, through suitable circuitry, calls into use a stepper switch which will insert the end-of-address code "CARRIAGE RETURN, LINE FEED, FIGURES, M, LETTERS" in the tape. The stepper switch has coded on it the mnemonic code for the originating station and has access to a 24-hour clock which will cause the tape to be perforated with the time at which end-of-address code was inserted in the tape. After the time has been perforated in the tape, the mnemonic code identifying the originating station is perforated in the tape. After the originating station has been identified and the time of initiation of the message has been perforated by the reperforator, the message may be perforated in the tape either under control of the keyboard of the originating printer or, if short enough, under control of a Codomat card. After the text of the message has thus been perforated in the tape, the operator will operate the end-of-message ((EOM) key on the keyboard. This EOM key initiates the operation of a stepper switch which feeds to the perforator, the end-of-message code comprising "CARRIAGE RETURN, LINE FEED, FIGURES V, LETTERS, CARRIAGE RETURN," six line feed signals in succession and then four letters N in succession, the third letter "N" having "0" and "6" control holes also perforated. This will complete the preparation of the tape for the transmission of the message to all of the stations whose addresses have been perforated in the tape.

TRANSMISSION

After the tape has been prepared in this manner, the operator places the tape in the transmitter distributor and moves the control lever of the transmitter distributor to run position. The transmitter distributor will feed tape past the sensing pins of the transmitter until the start-of-message code sequence is read, at which point the feeding of tape past the sensing pins is stopped. The tape between the sensing pins and a second tape feed wheel will now be run out by the second feed wheel until a taut tape lever operates, at which time the second or tape feed wheel will be blocked to clamp the tape at that point. As soon as the tape is clamped, the transmitter distributor will again start to operate to search for an address in the tape which is indicated by a perforation in both the 0 and 7th level of the tape. As soon as the transmitter distributor finds an address as indicated by perforations in the 0 and 7th levels of the tape, it will, through suitable circuitry, initiate the operation of the originating subscribers set and this subset will go "off hook." This is effected by the energization of a relay in the originating Teletypewriter equipment which in turn energizes a relay in the originating subscribers set. As soon as the originating subset goes "off hook," it will transmit back to the transmitter distributor, a pulse indicating that it is "off hook." This will cause the transmitter distributor to transmit step-by-step and present the digits of the telephone number to the originating subset in succession. Through a flip-flop arrangement, the transmission of the digits of the telephone number will thus continue until the ten digits have been transmitted. Transmission of the ten digits of the telephone number will connect the telephone circuits of the calling and the called subscriber's set. The called subscriber set will then respond by going "off hook" and upon going "off hook" will transmit back to the originating transmitter distributor the information that it is now "off hook" whereupon the mnemonic code for the called subscriber will be transmitted by the originating transmitter distributor. As soon as the mnemonic code for the address of a called subscriber has been transmitted, the originating transmitter distributor stops and the receiving printer on receiving the end of its address in mnemonic code that is, "D, L," "SPACE" sends a confirmation pulse back to the originating transmitter distributor.

Upon receipt of the confirmation pulse in the originating transmitter distributor this pulse will cause the operation of the tape pull back to the point where the tape is clamped. This will present the first character after the start-of-message code sequence to the sensing pins of the transmitter distributor.

In perforating the tape with the addresses, the code for the ten figures of the telephone number, as perforated in the tape, have control perforations associated with them in the tape for each digit of the telephone number. These control perforations are in the zero and seventh levels of the tape. However, the mnemonic code for the addresses do not have control perforations associated with each letter and when the confirmation pulse indicating that the first addressed receiving printer has been connected through the switching system to the originating station, the tape will be fed forward and will control the receiving printer to print the mnemonic code for all of the called or addressed stations. Thus, the originating teletypewriter equipment will send to the first and to all succeeding receiving printers all of the characters for the addresses of all of the called stations plus the text of the message and the end-of-message (EOM) code.

The originating printer is arranged to monitor the first complete message including the mnemonic codes for all addressed stations on the first passage of the tape through the transmitter distributor. On succeeding passages of the tape through the transmitter distributor at the originating station, the originating station will print only the list of the called stations as attempts are made to reach them and will operate in such a manner as to show on the record at the transmitting station the success or failure to reach a called station.

On the first attempt to complete a connection from a calling station to a called station a pierced hole is made in the tape in the eighth level at the point where the figures shift character preceding the DDD code is perforated in the tape. In the event that the connection through to the called party is completed on the first attempt a hole will be pierced in the tape at the sixth level in line with the figures code preceding the DDD number. In the event that the first attempt to complete a connection through to a called subscriber's subset is not successful an attempt is made to complete a connection to succeeding addressed subscribers' sets. When a connection is established to anyone of the addressed subscribers or the end-of-address code is read, the tape will be pulled back and fed past the reader a second time in an attempt to complete the connection to the called subscriber or subscribers. At this time another hole will be pierced in the eighth level of the tape in line with the letters code at the end of the start of message group of code signals. If on a second attempt to complete a connection to the desired subscriber no connection is completed a third hole will be pierced in the tape at the eighth level. If after the third attempt, as indicated by the holes pierced in the tape at the eighth level and the repeated feeding of the tape under the sensing or reading head, no hole is pierced in the tape at the sixth level, control circuits will become effective to transmit or attempt to transmit the message to an intercept station.

Thus, after the sending station has failed on three attempts to receive an answer-back or confirmation from the called station, the tape will contain three pierced holes in the eighth level. Then when the tape is read after being pulled back the number of attempts will be counted and the reader upon detecting the absence of a pierced hole in the sixth level of the tape will call in circuitry for dialing the DDD telephone number of the intercept station. This dialing operation is substantially the same as that for calling any receiving station. If, in response to the dialing of the intercept number, an answer-back signal is received from the switching or intercept center, the monitor at the originating station will record the mnemonic code for the intercept station. The transmitter distributor will start and the monitor will record the trouble number and its mnemonic code. The sixth level control hole will be pierced in the tape at the proper time to record the receipt of the confirmation from the intercept station and the message will be transferred to the intercept station to transmit the message to the desired receiving station.

In the event that, on an attempted call to the intercept station, no transmission circuit is completed from the originating station to the intercept station, the sending station will wait for about 15 seconds for an answer-back from the receiving station. If it fails to get it at this time, it will try again, and after six trials an alarm will be operated to indicate to the transmitting operator the failure of the dialing to the called station and to the intercept station. There will be six dialing attempts made to reach the intercept station before an alarm.

Other objects and advantages of the invention will be apparent from the following detailed description when considered in conjunction with the accompanying drawings wherein:

FIG. 1A is a block diagram showing the relative arrangement of the components of a transmitting station, within the system shown in FIG. 1;

FIG. 3 is a side elevational view of a perforator used for preparing the tape shown in FIG. 2;

FIG. 4 is a longitudinal sectional view taken through the perforator and showing, on an enlarged scale, the mechanisms for selecting and operating punches in the perforator, the supporting portions for the various mechanisms being omitted;

FIG. 5 is a fragmentary detail view showing one of the punches and the die block with which it cooperates;

FIG. 6 is a detail view showing a portion of a mechanism for feeding tape in a reverse direction through the perforator;

FIG. 7 is a fragmentary longitudinal sectional view showing part of the driving mechanism for actuating the punches;

FIG. 8 is a fragmentary plan view of some of the apparatus shown in FIG. 7;

Figure 10:
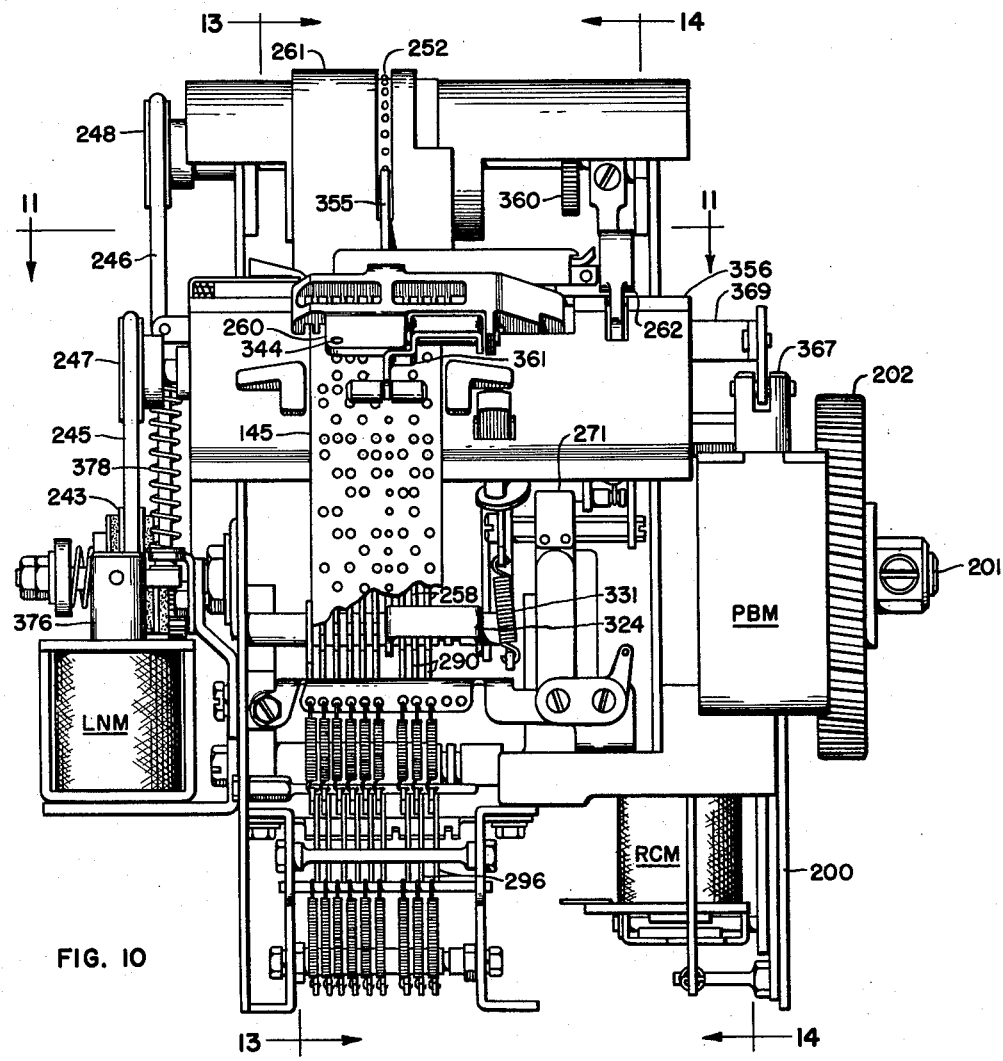
FIG. 10 is an end elevational view of the apparatus shown in FIG. 9 looking in the direction of the arrows along the line 10—10.
Figure 13:
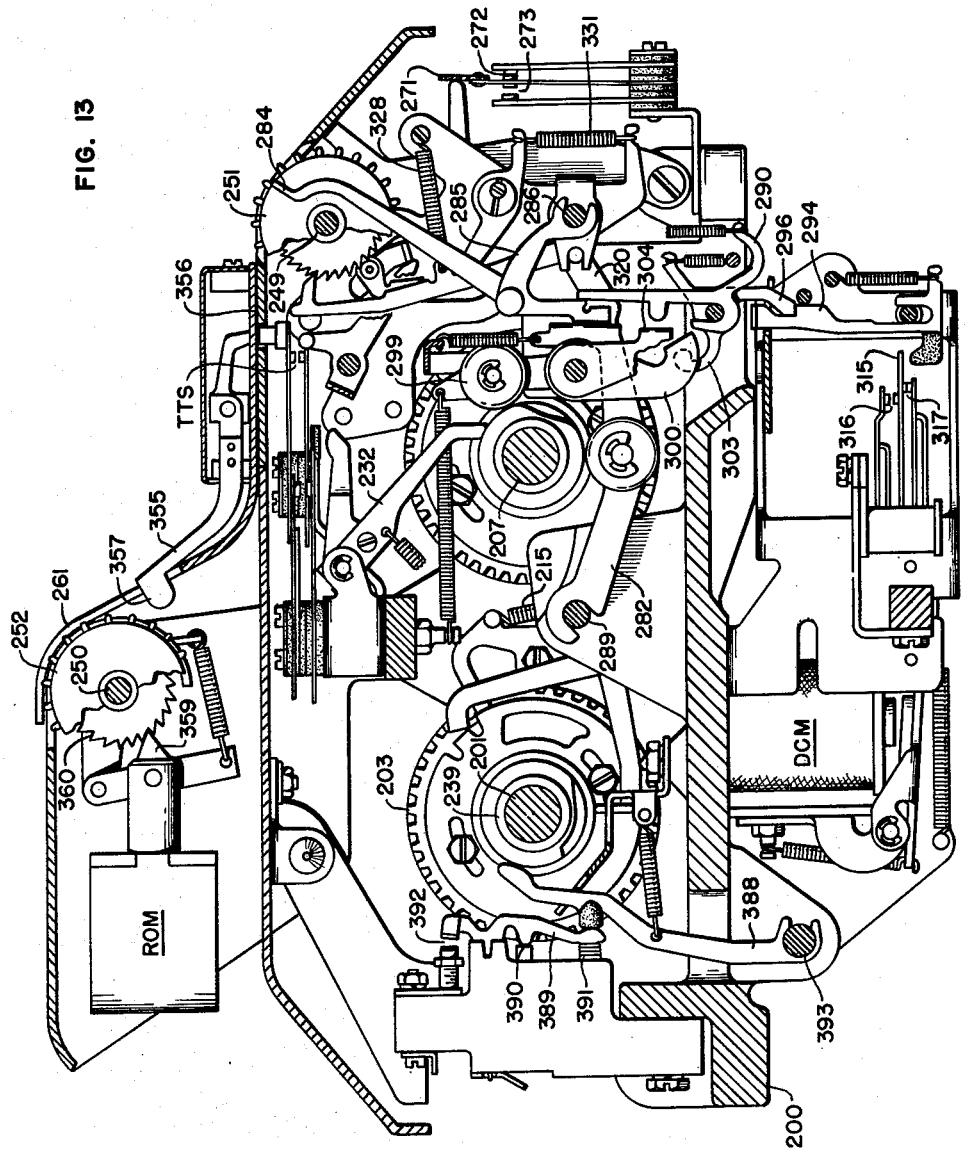

FIGS. 13 and 14 are vertical sectional views taken along the lines 13—13 and 14—14, respectively, of FIG. 10 in the direction of the arrows;

FIGS. 15 and 16 are fragmentary sectional views taken adjacent to the sections shown in FIG. 14, and in the same direction as FIG. 14 showing details of apparatus located in front of and in back of that shown in FIG. 14, respectively;

FIGS. 17 and 18 are fragmentary perspective views showing details of construction of the punch selecting mechanism and the perforator control mechanism, respectively;

FIGS. 19 through 53 are detached circuit schematic views showing, insofar as possible, a complete separate function of the circuitry in each separate figure, which function is described adjacent to the figure number, and FIG. 54 is a circuit schematic view showing in an abbreviated form, the interface connections between the reader and the subscribers set at an originating station.

Figure 19:
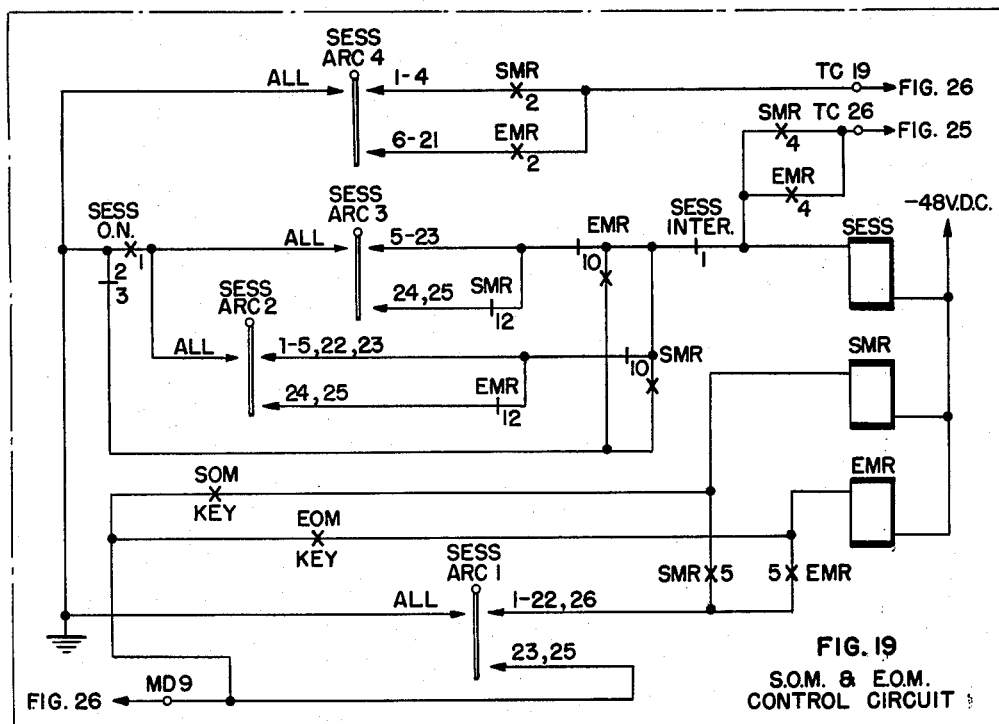

Since the present invention involves not only novel mechanical apparatus for use in the system but also rather involved circuitry for controlling the use of this apparatus, two different forms of disclosure are combined in the one application. Consequently, in the description of the mechanical devices utilized in controlling the line switching operations to be performed in the system to which the present invention pertains, various component parts will be designated by reference numerals applied substantially in sequence whereas in the description of the circuitry the "detached contact" method of exposition used in Patent No. 2,722,675, granted to J. Michal et al. November 1, 1955, has been adopted for use. The method of exposition to be used in describing the detailed construction of the mechanical apparatus is the usual method and need not be mentioned further. However, in the "detached contact" method, relay contacts generally are not adjacent to their magnetic cores and windings but are separated or detached therefrom. For example, a core such as the core of a start of message relay shown on FIG. 19 is represented by a small rectangle and given a functional designation such as "SMR." In the specification, the relay is referred to as "19–SMR," where "19" indicates the figure number of the drawing on which the core is located and "SMR" signifies the start of message relay as the functional designation of the relay. On the drawing, each of the contacts controlled by the relay, and shown on the same figure with the winding, is given a designation such for example as "SMR-2" placed in proximity to the contacts, where the "SMR" indicates that the contacts are controlled by the winding of relay "SMR" located on the same figure. When the relay also has contacts located on another figure of the drawings, the contacts are given a compound designation such for example as "19–SMR–2." In the specification the contacts may be referred to as "38–19–SMR–2" where "38" indicates the figure number on the drawing on which the contacts are located, "19" indicates the figure number of the drawing on which the core is located, "SMR" is the functional designation, and this reference signal may have its maximum positive "2" is the contact number.

Contacts which are closed when the relay is de-energized, known as "break" contacts, are represented by a short line perpendicular to the line representing the conductor, while contacts which are closed when the relay is energized, known as "make contacts," are represented by two short crossed lines diagonally intersecting the conductor line. A "break" and "make" contact connected together on one side, in close proximity to each other and with the designation "C," indicate a set of "continuity" or "make-before-break" contacts. The contacts in the reader are designated in a manner similar to that used in designating relay contacts. Rotary selectors are shown with their operating coils and core illustrated in the same manner as the coils of relays and with interrupter and off normal switches shown in the manner similar to that used in connection with the relays, whereas, the common brush or rotor of the switches is in each case designated "all" whereas the various contacts with which the rotor or brush will engage in stepping across the row of contacts associated with it are given reference numbers indicating that certain of the separate contacts in the particular row or arc are interconnected one to another, for example, in FIG. 20 the switch CCSS–ARC–1 has its contacts 1 to 8 and 11 interconnected or strapped together. These stepper switches are of the type which step their wipers or brushes when the operating magnet is released or de-energized. These switches open their interrupter contacts each time they are energized and close their off-normal contacts in all except the home or normal position. Similarly the normally open and normally closed contacts of keys or push buttons are shown in a manner similar to that used in designating relay contacts. The other circuit elements are shown in the conventional manner employed heretofore.

In some instances where the complete function of a circuit cannot be shown in a single figure due to the fact that there is an interaction between its functional operation and the functional operation of other portions of the apparatus a terminal may be shown by a very small circle with a reference numeral indicating the figure on which the continuation of this circuit may be presented.

Since in many instances, the detached contact method of exposition results in a drawing where the circuit elements have no apparent physical connection one with the other, it is to be assumed that all of the subject matter appearing within the confines of a single sheet of patent drawing constitutes a single patent figure unless otherwise indicated. When the subject matter on a sheet of patent drawing includes more than one figure, the subject matter of each figure will be enclosed within light broken lines and will be identified by a separate figure number.

GENERAL DESCRIPTION

An understanding of the present invention will be facilitated by the following brief description of the system to which the present invention pertains.

Figure 1:
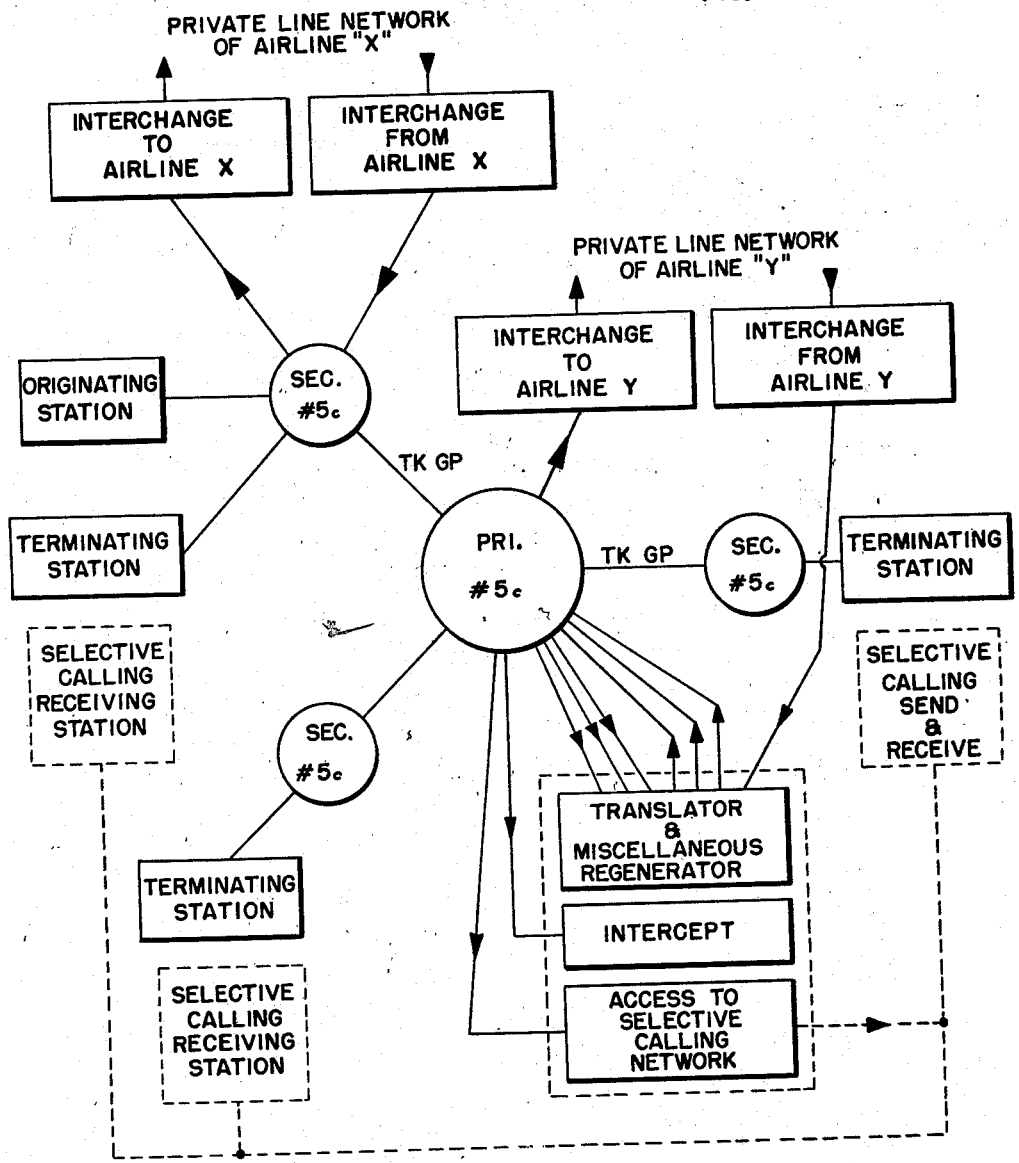
FIG. 1 is a diagrammatic view of a system to which the present invention pertains.

The system to which the invention pertains utilizes what is known as "line" switching, that is the type of switching that completes a connection through one or more exchanges to a called station from an originating station and then transmits the message to the called station designated on FIG. 1 as "Terminating Station." Thus the system is to be distinguished from the type of telegraph switching network wherein "message" is transmitted from an originating station to a central exchange or communication center where it is recorded and retransmitted to a called or terminating station. The system is also designed to use the telephone switching network by so converting the message to be transmitted that it can be sent over a telephone switching network.

The block designated "Originating Station," on FIG. 1 of the drawings, is also shown in the block diagram on FIG. 1A where the details of it are disclosed. This originating station is connected directly into a telephone exchange known as a secondary No. 5 crossbar switching exchange. If the message to be transmitted by the originating station is one which is to be directed to a distant area the connection to the terminating station will be completed through another telephone exchange designated "PRI No. 5" or "SEC No. 5" which is a primary or secondary exchange connected by trunk groups with other primary or secondary exchanges in the telephone system, in a direct dialing network.

If the message to be transmitted by the originating station is directed to a terminating station within the same telephone exchange then the message will be transmitted only through the secondary No. 5 telephone switching exchange office indicated by the circle at the upper left portion of the figure and designated "SEC No. 5C." This message will then be directed through the single secondary exchange to the terminating station connected into the same exchange. However, if the message to be transmitted by the originating station is directed to a terminating station such as that shown toward the lower left portion of FIG. 1, which terminating station is in the same local area as the originating station, the connection may be made through the first No. 5 secondary exchange to the second described No. 5 secondary exchange and to the terminating station without the necessity of going through one of the primary exchanges of the No. 5 type for transmission over a direct distance dialing type of network.

In the event that the originating station desires to transmit a message to a terminating station such as that shown at the right-hand side of the drawing, which is in a distant area, then the message will be transmitted from the originating station through the first No. 5 secondary switching exchange into the primary No. 5 switching exchange and over a trunk group to the secondary No. 5 switching exchange shown adjacent the terminating station at the right-hand side of the drawing.

In the event that it is desired to transmit messages to air lines having their own private line networks, such as the air line shown schematically at the upper portion of the drawing and designated air line X or to the air line having a private line network of a different type and shown at a private line network of air line Y, two different types of procedures must be followed. If the message is to go to a private line network such as the one shown for air line X, wherein there is provided a terminating station of the type used on this system but the network does not utilize the present system except to receive and transmit to the present system, then the message may go through one or more secondary and one or more primary No. 5 telephone switching exchanges to an interchange of the air line X where a terminating station will be provided of the type used on this system. Since the private line network of air line X, is not a network of the type being discussed herein, it could not place calls directly to terminating stations on the system being described herein and it would have no Codomat in its originating station and would always call the same direct distance dialing telephone number whenever it wanted to reach the system being described herein. A message originating at the interchange from air line X would thus be directed through one or more secondary and primary telephone exchange to a communication center such as that indicated within the dash lines in the lower portion of FIG. 1 and the mnemonic code for the called station on the present system would be translated in the mechanism designated "Translator and Miscellaneous Regenerator" to enter an address into the present system which address would include the direct distance dialing telephone number of the terminating station on this system. This address would then be directed back through the primary telephone exchange for transmission to the called terminating station.

Some of the private line networks such as the private line network of air line Y could receive messages from the present system if its interchange to its private line were equipped with a terminating station of the type used on the present system and it could, over a direct wire connection, transmit a message wherein the address of the desired called station on the present network would appear only in the form of the mnemonic code. This message could be sent over the private wire to the translator and miscellaneous regenerator where the translation of the mnemonic code into both direct distance dialing and mnemonic code perforations could be effected.

The group of three leads from the primary No. 5 switching telephone exchange to the translator and the group of three leads directed from the translator back to the primary exchange are indicative of a plurality of connections which may be utilized where, for example, air line X transmits from its interchange either directly or through a secondary switching exchange and utilizes a single telephone direct distance dialing number which is assigned to the translator to send messages to the translator which bear one DDD number but which may bear any one of a number of mnemonic codes indicating the particular terminating stations which it is desired to transmit to. On the contrary, since interchange from air line Y does not have such mechanism, it may send its mnemonic code into the translator over a private line for translation into the type message address code that the present system will handle.

At the communication center indicated within the dash lines in the lower right-hand corner of FIG. 1 there is also provided an intercept apparatus which is designed to receive messages that could not be made by an originating station due to the failure of the originating station in three attempts to make a direct connection with a called terminating station. This intercept apparatus is equipped with devices for receiving such messages and attempting a number of times to complete a connection to the desired called terminating station and upon failure to make such a connection to alarm so that an operator may take other steps to transmit the message to the terminating station. At the communication center there is also provided apparatus having access to a selective calling network which may be utilized when it is desired to send a broadcast message to any or all of the stations on the present system. This network does not form an integral part of the present system but is a separate network and is capable of receiving messages which might be broadcast messages directly from any one of the originating stations through the switching exchanges and to put this message on a selective calling network as indicated by the dash lines.

In FIG. 1A the diagrammatic showing of the originating station is divided into two halves, one half relating to the tape preparation section of the originating station and the other half relating to the message processing equipment at the originating station. In the tape preparation portion of FIG. 1A the Codomat, which has been described herein before, is indicated as being interconnected through an 8-level parallel arrangement to logic circuitry which will in turn send the coded information to the perforator on an 8-level parallel basis. The logic circuitry is operable under control of keys in the keyboard, for example, such keys as start-of-message key, SOM; end-of-address, EOA; end-of-message, EOM; feed-out key, FO; and rub-out key, RO. These keys control the logic circuitry and inform it what particular codes should be sent to the perforator. The logic circuitry in addition to this control by the special keys on the keyboard is also controlled by a timer which is called into operation at the time that the end-of-address code is perforated in the tape and this timer will cause the logic circuitry to insert the time of day into the tape automatically.

In addition to being controlled by the logic circuitry which operates in conjunction with the Codomat, timer and special keys the perforator may be controlled on a five-level basis from the standard keys of the keyboard or may be controlled by push buttons and standard keys for inserting local address, LA; distant address, DA; pseudo-mnemonic, PSMN; or call direction codes in the tape, CDC. These keys on the keyboard will inform the logic circuitry associated with them that these particular types of codes are to be entered into the perforator under control of the standard keys on the keyboard and the logic circuitry will furnish the necessary information to the perforator through the group of three leads which control the perforation of the control levels of the tape, that is, the levels other than the five levels assigned to the Baudot code.

After the tape has been perforated it is sent to the message processing portion of the apparatus to control the transmission of the messages to the stations which have been selected to receive it. The 0, 6, 7, 8 levels of the tape as read by the reader are fed into logic circuitry which analyzes the coding of these levels and controls the setting up of circuitry for telling the transmitter distributor to perform certain functions such as to pierce the tape at either of two selected levels, to pull the tape back, etc. This logic circuitry also analyzes the coding perforated in the tape to determine whether the message should be sent to the intercept station and enters the direct distance dialing number of the intercept station and its mnemonic code and then controls the distributor portion of the transmitter distributor to transmit this information to the intercept station. The reader also transmits the direct-distance-dialing (DDD) number in five-wire parallel circuitry to a translator which translates the DDD number from the five-unit code into a one out of ten code for sending it to a Data-type telephone set which will then transmit this information to the telephone facilities. The distributor will also feed the printer at the originating station to monitor the message being transmitted. It is to be understood that the details of all of the circuitry logic described generally herein will be described in detail hereinafter.

THE TAPE

Figure 2:
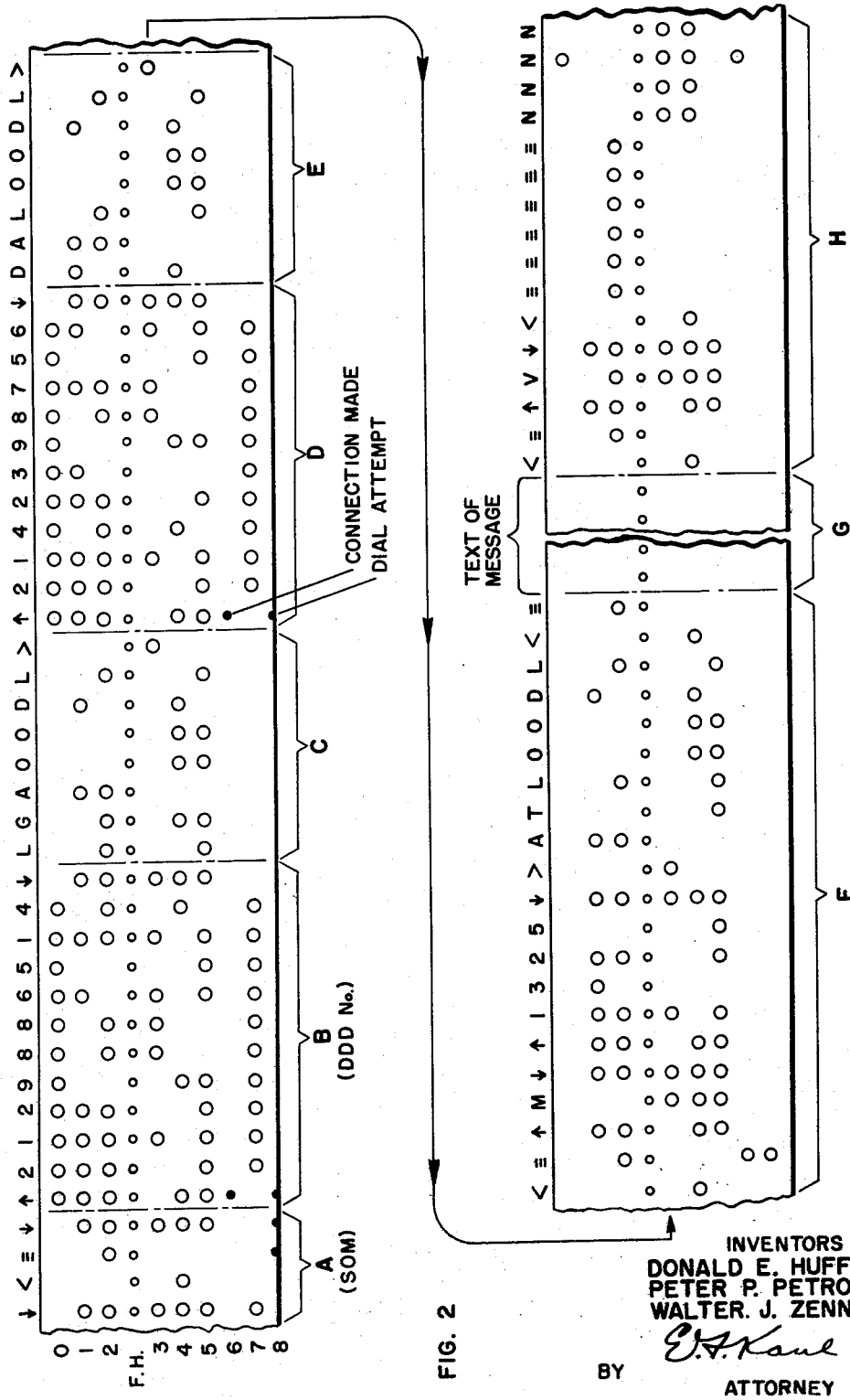
FIG. 2 is a view showing the type of perforated tape used in the transmission of messages.

A sample tape is shown in FIG. 2 where, in the bracketed area designated by the Letter A there is shown the code of characters for a start-of-message combination. This combination comprises "LETTERS, CARRIAGE RETURN, LINE FEED, LETTERS." This start-of-message combination is followed by an address of a terminating station on the present system which address comprises the Baudot code for "Figures," the ten digits representing the direct-distance-dialing telephone number assigned in the telephone system to the called terminating station plus control holes in the "0" and 7th levels, and the code for "Letters" also in Baudot code enclosed in bracket B. This is followed by the mnemonic code, enclosed in bracket C, for the called terminating station. In the example shown the tape is perforated in the area B with the figures code followed by the digits 2, 1, 2, 9, 8, 8, 6, 5, 1, 4, which may be assumed to be the direct-distance-dialing telephone number for the terminating station on Delta Air Lines at La Guardia Field Operations Office as indicated by the mnemonic code of characters comprising L G A O O D L which in he memory system reads "La Guardia Operations Office Delta Air Lines."

If the message is to be transmitted to a number of stations, for example five stations, the addresses of the other terminating stations that are to receive the message may follow in succession as illustrated by the codes bracketed under D and E which codes again follow the same pattern as the codes bracketed under B and C with the exception that the direct-distance-dialing telephone number is different and the mnemonic code for the second called station is D A L O O D L, indicating that telephone number is associated with the Dallas, Texas, Operations Office Delta Air Lines.

In the event that it is desired to send a broadcast message to a large number of stations, the present system will not be used but this message will be transmitted over a message switching system which is particularly adapted for handling broadcast messages. In that event the direct-distance-dialing telephone number of an access station having access to a broadcast circuit of the message switching system type, will be perforated in the tape and will be followed by the pseudo-mnemonic code for a broadcast circuit, and comprises the direct-distance-dialing telephone number of the access station preceded by a "Figures" code, and ending with a "Letters" code, and the Baudot code for Q C A S T D L "Space." This pseudo-mnemonic code indicates that a broadcast over stations in the message switching system of Delta Air Lines is to be transmitted. This information in the tape would then be followed by a call directing code A B "Letters" followed by the mnemonic code for the called terminating stations on the broadcast circuit, such as C H I O O D L "SPACE," indicating that the station of the Chicago Operations Office Delta Air Lines is to be included in the terminating stations receiving the broadcast message. This would then be followed by the call directing code and mnemonic code of other terminating stations to receive the broadcast. The addresses including call directing codes and mnemonic codes of other stations to receive this list of perforated addresses may then be followed by the text of the message followed by a code representing the end of the message.

In the event that the message is to be sent to subscribers not on the present system the tape may be perforated with the address of station having access to the present system and to a message switching system and also perforated with the mnemonic code for the stations on the message switching system.

As soon as the addresses of all of the stations to which the message is to be sent have thus been perforated in the tape, a combination indicating the end of addresses is perforated in the tape. This sequence is illustrated in FIG. 2 in the portion bracketed at "F" and comprises the code for "Carriage Return, Line Feed, Figures, M. Letters, Figures, Time of day, Letters and Mnemonic code for originating station, Carriage Return, and Line Feed."

The text of the message may then be perforated in the tape, either under control of the keyboard or under control of a Codomat card as indicated at "G."

After the text of the message has been punched in the tape, a code sequence combination is perforated to indicate that the message is complete. This code is indicated, as bracketed, at "H" and comprises the code combinations for "Carriage Return" six codes for "Line Feed" and the code for "N" four times.

PERFORATOR

The perforator, used in the system to which the present invention pertains, is an eight-level multimagnet reperforator of basic the same construction as that manufactured by the Teletype Corporation of Skokie, Illinois, and described in their Bulletin 244B, entitled General Description and Theory of Operation, Modern 28 Multimagnet Reperforator, copyrighted in 1957. The disclosure of this bulletin is incorporated herein by reference for details of construction not fully illustrated herein.

The reperforator comprises a base 100 having extending upwardly from it a plurality of standards such for example, as the standard 101 in which there is journaled a continuously driven shaft 102 driven by a motor (not shown). Fixed to the shaft, as shown in FIG. 4 is a driving member or clutch drum 103, which upon the tripping of the clutch will be connected to a sleeve 104 to drive the sleeve and initiate a perforating operation of the perforator. The clutch is of the construction shown in the Patent to A. N. Nielsen, No. 2,568,249, issued September 18, 1951, which patent is incorporated herein by reference and made a part hereof.

The clutch includes a stop lug 105 which, in the normal unoperated condition of the clutch is blocked from moving in a counterclockwise direction (FIG. 4), by a clutch trip lever 106. The clutch trip lever 106 is fixed to an oscillatable clutch tripping shaft 107 which is freely oscillatable in the standard 101 and has fixed to it a clutch trip latch lever 108. The clutch trip latch lever 108 is urged to rotate in a counterclockwise direction (FIG. 4) by a contractile spring 109 but normally is blocked from so moving by one arm of a four-armed main function lever 110. Also, mounted on the clutch trip shaft 107, but freely rotatably thereon, is a latch lever 111 that is urged to rock in a clockwise direction (FIG. 4) by a contractile spring 112 as described in detail in the aforementioned patent to A. N. Nielsen. This latch lever 111 serves to hold the clutch shoes (not shown in detail herein) out of engagement with the clutch drum 103. The shaft 107 has fixed to it a clutch lever reset arm 113 having a camming projection 114 thereon for engagement by a cam 115 carried by the sleeve 104. The cam 115 has two cam lever engaging portions since the cycle of operation of the apparatus is accomplished in one half a revolution of the shaft 102 and the clutch tripping lever 106 cooperates with two stop lugs 105 which are diametrically opposed. Only one of the lugs 105 is shown, but another one exactly like it is disposed directly opposite it.

The clutch trip lever 108 is designed to be momentarily operated upon the operation of a function magnet 120 which has a function magnet armature 121 operatively associated with it whereby upon energization of the function magnet 120 the function magnet armature 121 will be attracted toward the function magnet and will move a shoulder 122 on it out of the path of a projection 123 on a function trip lever 124. The function trip lever 124 is normally urged to rock in a clockwise direction (FIG. 4), by a contractile spring 125, about the axis of a rock shaft 126 to which the function trip lever 124 is fixed.

The rock shaft 126 is suitably journaled in upwardly extending portions of the base 100 (not shown) and also has fixed to it a lower function trip lever 127 and a lower reset lever 128.

When the function magnet 120 is energized and consequently attracts its armature 121 it will permit the function trip lever 124 to rock in a clockwise direction (FIG. 4) thereby to rock the rock shaft 126 in clockwise direction. The lower function trip lever 127 projects into the path of an arm 129 of the main function trip lever 110 and when the shaft 126 is rocked clockwise (FIG. 4), the lower function trip lever 127 will rock the main function trip lever about a stationary shaft 131 on which the lever 110 is pivotally mounted. The lever 110 also has an arm 130 to which is attached one end of a contractile spring 132 which urges the main function trip lever 110 to rock in a clockwise direction (FIG. 4) to hold the arm 129 of it in engagement with the lower function trip lever 127. An upwardly extending arm 133 of the main function trip lever 110 normally carries its end in the path of the clutch trip lever latch 108 to prevent the clutch trip lever latch 108 from rocking in a counterclockwise direction (FIG. 4) under the influence of its spring 109. However, when the function trip lever 124 is permitted to rock in a clockwise direction (FIG. 4) the lower function trip lever 127 will, due to its engagement with its arm 129 of lever 110, rock the lever 110 in a counterclockwise direction to move the end of the upwardly extending arm 133 out of the path of the clutch trip lever latch 108 thereby to initiate the operation of the clutch mechanism which will cause the sleeve 104 to be driven through one half revolution and then be stopped due to the fact that the cam 115 will engage the camming surface 114 on the clutch lever reset arm 113 and a portion of the cam 115 will engage the lower reset lever 128 to cause the clutch trip shaft 107 to be rocked in a clockwise direction (FIG. 4) and cause the rock shaft 126 to be rocked in a counter clockwise direction. This coaction of the cam 115 with the levers 113 and 128 will result in the clutch trip latch 108 being moved clockwise (FIG. 4) and the main function trip lever will be rocked clockwise by its spring 132 to return to the position shown in the drawing shere the clutch will be de-activated and the apparatus will be in condition to go through another cycle upon a subsequent energization of the function magnet 120.

In the operation of the apparatus, prior to the energization of the function magnet 120, any one of eight perforating pins or punches 140, only one of which is shown in the drawings, may be selected for operation as a consequence of selective energization of a plurality of code magnets 141. These code magnets 141 are mounted in staggered relation on a suitable bracket attached to the standard 101 and each magnet comprises a pair of coils 142 (FIG. 3), mounted in operative relation to an armature 143 individual to the pair of coils. Each armature 143 has individual to it an armature rod 144 which will be moved upwardly and to the left (FIGS. 3 and 4), upon the energization of its associated code magnet 141. The armature rods 144 are of different lengths since the code magnets 141 are mounted in staggered relation in order to properly space the armature rods for controlling the perforation of a tape 145. The armature rods 144 are slidable in suitable brackets 146 and 147 and each of them has individual to it a punch slide latch 148. As best seen in FIG. 3, the punch slide latches 148 are pivotally mounted on the stationary shaft 131 and are urged to rock in a clockwise direction about the shaft 131 by contractile springs 149 individual to them. When the code magnets 141 are de-energized, as they are shown in the drawing, the punch slide latches 148 will be in the position shown where a latching shoulder 150 on each of them will be in the path of a cooperating shoulder 151 on a punch slide 152.

The punch slides 152 are eight in number and control the selective actuation of the punches 140. The punch slides 152 are individually urged to the left by contractile springs 153 individual to them. These contractile springs 153 also urge the punch slides 152 to rock in a counterclockwise direction (FIG. 4) about a pivot shaft 154 and into engagement with a guide member 155 (FIG. 5). The slides 152 are bifurcated shown at 156 to engage with punches 140 which are individual to them. The punches 140 are slidable in a punch block 157 and when moved upwardly by their respective punch slides 152 will cooperate with a die block 158 to perforate holes in the tape 145 fed through the slot between the punch block 157 and the die block 158. A chad guide 159 (FIG. 3) is provided for receiving the chad punched out of the tape by the punches 140, the chad guide being connected to a suitable suction source (not shown).

When any one or more of the code magnets 141 are energized they will trip the punch slide latches 148 associated with them to move the latching shoulder 150 on the punch slide latch 148 out of the path of its associated punch slide 152. After selected ones of the code magnets 141 have been energized, the energization of the function magnet 120 will cause the four-armed main function trip lever 110 to be rocked counterclockwise (FIG. 4), as described hereinbefore. In rocking counterclockwise (FIG. 4) the main function trip lever 110 will rock a reset bail trip lever arm 166 counterclockwise with it. A recess 167 in the reset bail trip lever arm 166 receives the right-hand edge of a punch slide reset bail 168. Thus, upon energization of the function magnet 120 and the consequent rocking counterclockwise (FIG. 4) of the main function trip lever 110, the bail 168 will be rocked downwardly to carry its rightwardly extending edge out of engagement with shoulders 169 on all of the punch slides 152, thus releasing the punch slides 152, and permitting of those slides, the latches 148 of which have been rocked counterclockwise, to move to the left to carry shoulders 170 on them into position over a punch slide post 171.

The punch slide post 171 extends across all of the punch slides 152 and is carried at the ends of pivoted levers 172 oscillatable about the pivot shaft 154. Toggle links 173 are pivotally attached to the punch slide post 171 at its opposite ends, one of these toggle links being shown in FIG. 4. The toggle links 173 are substantially V-shaped and pivotally support the punch slide reset bail 168, suitable pivot pins 174 being provided for pivotally connecting the toggle links 173 to the reset bail 168. Intermediate the pivot pins 174 and the punch slide post 171, the toggle links 173 are pivoted on a toggle bail 175 which is fixed to a toggle bail shaft 176. The shaft 176 (FIGS. 3 and 7) is mounted for oscillation in suitable support plates 177 extending upwardly from the base 100. The shaft 176 fixed to a rocker arm 178 which is interconnected by means of a drive link 179 to a rocker lever 180. The rocker lever 180 is mounted on a rocker shaft 181 which is supported for oscillation in this framework of the apparatus and carried, at a point adjacent the rear end thereof (the upper end as viewed in FIG. 8), a rocker bail 182 that has mounted on it a pair of cam rollers 183 and 184 in operative engagement with the pair of cams 185 and 186, respectively, on the cam sleeve 104.

The forward end of the shaft 102 has mounted on it an eccentric 190 which drives a drive arm 191 continuously. The drive arm 191 is the actuator for a tape pullback mechanism of the type disclosed in detail and claimed in the copending application of G. Sim, Serial No. 743,850, filed June 23, 1958, which application is incorporated herein by reference. Since in the present apparatus the tape is fully perforated, a portion of the apparatus shown in the Sim application referred to above is not necessary for use in this device. The drive arm 191 becomes effective to actuate the tape pull-back mechanism upon the energization of a tape pull-back magnet 192. The left end of the drive arm 191 is slidable and oscillatable on a pin 193 which is the equivalent of the stud 44 described in the aforementioned copending application of G. Sim.

The toggle bail 175 has pivotally attached to it a feed pawl 185 which is urged to rock counterclockwise (FIG. 3) into engagement with a tape feed ratchet 186, by a contractile spring 187. Thus, in the normal operation of the apparatus, the tape 145 will be fed toward the left (FIG. 3), and each time the toggle bail 175 is oscillated to drive the selected punches 140 through the tape. The operation of the backspace mechanism under control of the tape pull-back magnet 192 is the same as that disclosed in the aforementioned copending application of G. Sim wherein the backspace eccentric 190, the tap feed pawl 185, a drive sleeve 194, the tape feed ratchet 186, operating arm 191, and tape pull-back magnet 192 are the same as the elements designated 17, 24, 12, 15, 47 and 81 in the copending application of G. Sim identified hereinbefore. The only distinction between the tape pull back apparatus disclosed herein and that disclosed and described in detail in the copending application of G. Sim identified above, is that in the Sim application the tape is partially perforated to form so called "chadless" tape whereas in the present invention the tape is fully perforated and as a consequence thereof the chad guide 159 is provided in the present apparatus whereas means were provided in the Sim apparatus to smooth down the lids of chadless tape when it is to be fed in a reverse direction.

TRANSMITTER

The tape controlled transmitter of the present invention is positioned closely adjacent to the tape preparing mechanism described hereinbefore. The tape 145 fed out of the perforator will thus control the operation of the transmitter in seeking to establish a connection from the calling station or originating station to called station or called subscriber. The transmitter includes a framework 200 which is of irregular configuration for supporting the various components of the apparatus. Journaled in the framework 200 is a main power shaft 201 to which is fixed a drive gear 202 that may be connected to any suitable power source through gearing provided therefore (not shown). The main power shaft 201 also serves as a distributor shaft and has on it a gear wheel 203 (FIG. 14) which meshes with a pinion 204 freely rotatable on a shaft, 205. The pinion 204 drives a gear wheel 206 fixed to a reader shaft 207 suitably journaled in the framework 200.

Also, fixed to the shaft 207 is a clutch drum 208 comprising a component of a clutch of the type disclosed in detail and claimed in the patent to A. N. Nielsen et al., No. 2,568,249, issued September 18, 1951. As fully described in the aforementioned patent to Nielsen et al. this clutch may be tripped to connect a sleeve 209 to the clutch drum 208 upon the actuation of a clutch trip lever 210. In the unoperated condition of the clutch, the clutch trip lever 210 will be disposed as shown in FIG. 14 where a projection 211 on it will be in blocking engagement with a stop lug 212 which in cooperation with a clutch latch lever 213 completely disengages the clutch drum 208 from a cam disk 214 that is fixed to the sleeve 209 and serves as the driving connection between the sleeve 209 and the clutch drum 208. The clutch latch lever 213 is urged to follow the movement of the clutch trip lever 210 by a contractile spring 215 attached to clutch trip lever 210 and to a projecting portion 216 of the clutch latch lever 213. An arm 217 of the clutch trip lever 210 has a cam engaging portion 218 on it for cooperation with a cam 219 on the sleeve 209 and when the high portion of the cam 219 engages the cam engaging portion 218 it will serve to reset the clutch trip lever 210 by rocking it clockwise (FIG. 14) about a pivot shaft 220 on which the clutch trip lever 210 and the clutch latch lever 213 are pivotally mounted. The clutch trip lever 210 is urged to rock in a counterclockwise direction (FIG. 14), about the pivot shaft 220, by a contractile spring 221 but is normally blocked from so moving by an armature lever 222 on which there is mounted an armature 223 of an electromagnet 224 which is the reader clutch electromagnet.

Any time the reader clutch electromagnet 224 is energized it will attract its armature 223 to move its armature lever 222 out of blocking engagement with the clutch trip lever 210 thus, to permit the spring 221 to rock the clutch trip lever 210 in a counterclockwise direction about the pivot shaft 220 and thereby release the stop lug 212. This will result the clutch drum 208 being interconnected with the cam disc 214 for one complete cycle of revolution and at the end of one cycle of revolution the cam engaging portion 218 having been engaged by the high portion of the cam 219 will restore the clutch trip lever 210 to the position shown in the drawing where it will be latched by the armature lever 222 unless the electromagnet 224 has in the meantime been re-energized. In this manner every time the electromagnet 224 is energized the sleeve 209 will be driven through one complete cycle of revolution and then stopped.

There are a number of cams on the cam sleeve 209 and one of these cams, that is, cam 231 (FIG. 9) will, at a predetermined time in the cycle or rotation of the sleeve 209, rock a cam lever 232 counterclockwise (FIG. 9) about a pivot stud 233. The cam lever 232 is a bell crank lever and has one arm of it in position to engage the movable contact spring of a distributor clutch switch contact pair DCS, thus, to effect the closure of this contact and energize a distributor clutch magnet 235 thereby to initiate a cycle of operation of the distributor forming a part of this apparatus. The distributor clutch magnet has an armature lever 236 (FIG. 16) which, in the de-energized condition of the electromagnet 235, blocks the counterclockwise movement of a distributor clutch trip lever 237. The distributor clutch trip lever 237 is exactly the same as the clutch lever 210 and performs the same type of operation for the distributor as the clutch trip lever 210 performed for the initiation of a reader cycle. When the distributor clutch trip lever 237 is permitted to rock counterclockwise about its pivot stud 238 it will initiate a single cycle of rotation of a distributor cam sleeve 239 in exactly the same manner as was done in connection with the operation of the clutch trip lever 210 initiating a cycle of the reader cam sleeve 209.

The main power shaft 201 (FIG. 9) has fixed to it a gear 240 which meshes with a gear 241 on a stud shaft 242. The gears 240 and 241 mesh with each other and gear 240 is interconnected by friction clutches (not shown) to a driving pulley 243 and thus, the pulleys 243 and 244 are continually urged to rotate with the gears 240 and 241 thus to tend to drive a pair of belts 245 and 246, respectively. The belts 245 and 246, when they are driven by their respective pulleys 243 and 244 will drive two pulleys 247 and 248, respectively. The pulleys 247 and 248 are fixed to shafts 249 and 250, respectively, suitably journaled in the framework 200 on which there are mounted a pair of sprocket feed wheels 251 and 252, respectively. These sprocket feed wheels 251 and 252 are continuously urged to rotate in a clockwise and counterclockwise direction, respectively (FIG. 13). Thus, the sprocket wheel 251 tends to retract a tape 145 in engagement with it, back toward the perforator whereas the sprocket wheel 252 tends to feed the tape out of the apparatus.

Figure 9:
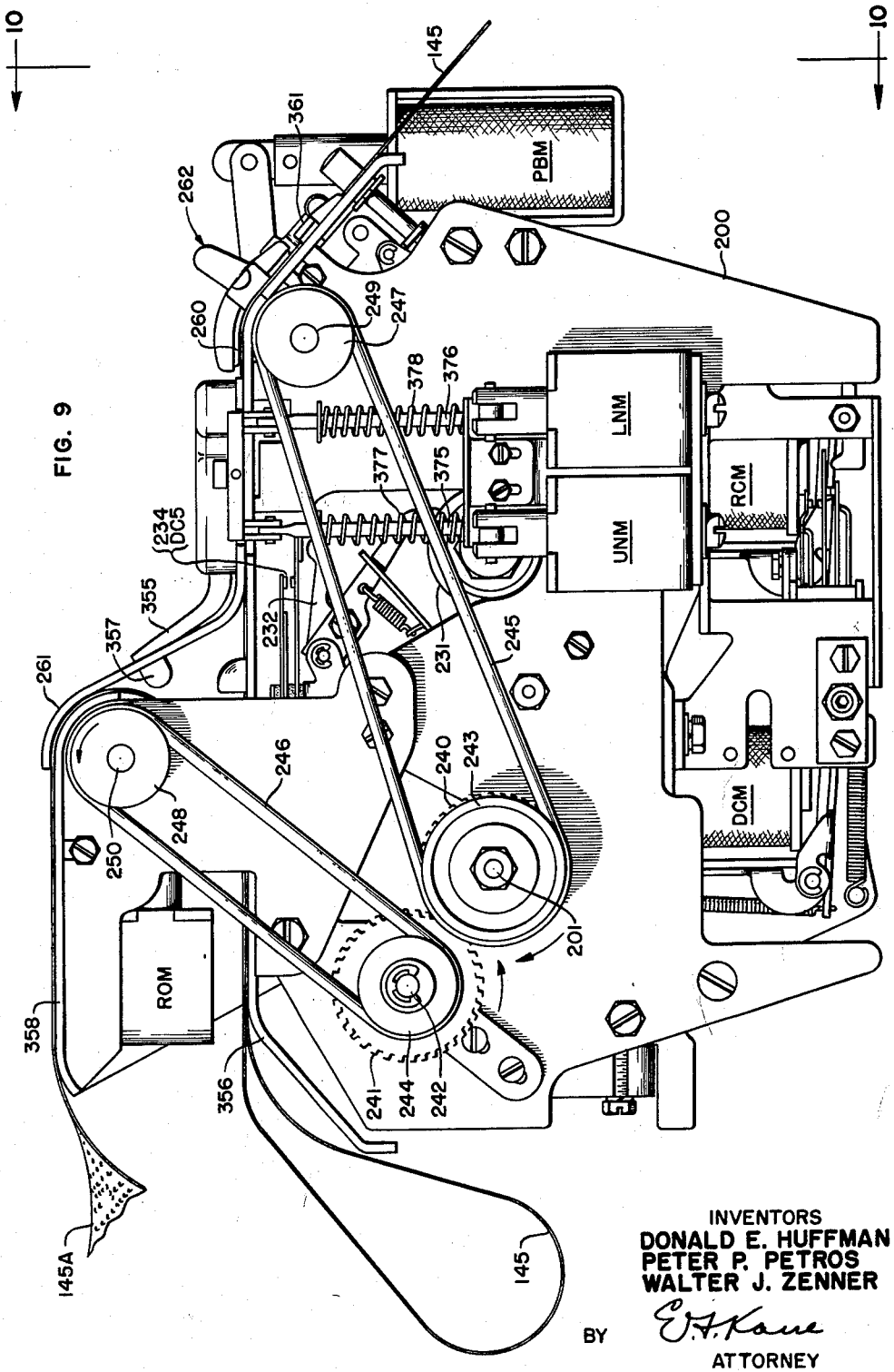
FIG. 9 is a side elevational of the reader or transmitter distributor to which tape is directed by the perforator.

In order to initiate a transmitting cycle, the tape 145 must be engaged with the teeth of the sprocket feed wheel 252 and with the teeth of the sprocket feed wheel 251 and a pair of tape lids 260 and 261 must be moved to the position shown in FIG. 9 to hold the tape in engagement with the feed sprockets 251 and 252, respectively. With the tape 145 thus positioned a stop-run switch 262 may be moved from the position shown in FIGS. 9 and 18 in a clockwise direction about a pivot stud 263 suitably mounted in the framework 200. When the stop-run switch 262 is thus rocked in a clockwise direction as indicated in FIG. 18, it will permit a control bail 264 to rock counterclockwise about its pivot shaft 265. As may be seen most clearly in FIG. 14, the control bail 264 is urged to rock in a counterclockwise direction, as viewed in that figure, by a multiarmed bail 266 which is urged to rock in a clockwise direction (FIG. 14), about its pivot stud 267 by a contractile spring 268. An arm of the bail 264 extends in a rightward direction (FIG. 14) into the path of a leftwardly extending arm of the bail 266. Consequently, when the bail 266 is permitted to rock clockwise (FIG. 14) under the influence of its spring 268 because it has been released for limited movement by the bail 264, it will, through a downwardly extending arm 268, pull a contact actuator slide 269 to the right. The contact actuator slide 269 is pivotally connected to the arm 268 and rides on a guide pin 270 so that its left end (FIG. 14) normally holds a movable contact assemblage 271 in a position to close a contact pair 272 and open a contact pair 273. Closure of the contact pair 273 as the result of the movement of the stop-run switch 262 to the run position will result in the energization of the reader clutch magnet 224.

When the reader clutch magnet 224 is energized rotation will be imparted to the reader cam sleeve 209 and this cam sleeve will go through one complete rotation each time the reader clutch magnet 224 is energized.

The cam sleeve 209 (FIG. 17) has on it a pair of cams 280 which cooperate with a pair of cam rollers 281 that are mounted on the arms of a sensing bail 282. The sensing bail is normally urged upwardly by a contractile spring 283 so that when an indent in the cams 280 rotates into alignment with the cam rollers 281, the bail 282 will be moved upwardly and will permit a plurality of sensing pins 284 to move upwardly to determine the location of perforations in the tape 145. In the present embodiment of the invention there are nine of these sensing pins 284, all of identical construction, and the pins 284 are pivotally connected to sensing pin levers 285 individual to them. The sensing pin levers are individually urged upwardly and clockwise about a pivot shaft 286 by contractile springs 287 which normally tend to hold shoulders 288 on each of the levers 285 in engagement with the cross member of the bail 282. Thus, any one of the sensing pins 284 that finds a hole in the tape 145 will be permitted to move upwardly through the tape when the bail 282 is rocked upwardly about its pivot shaft 289. When the reader cam sleeve 209 rotates to a position where the cam rollers 281 engage the high portion of the cams 280, the sensing pin levers 285 will be rocked counterclockwise (FIG. 17) to return the sensing pins 284 from engagement with the tape 145.

There is a push lever 290 individual to each of the sensing pin levers 285 and these push levers are oscillatable about and reciprocatable with respect to a pivot shaft 291 by contractile springs 292 individual to them. The springs 292 urge the left edge (FIG. 17) of the push levers 290 into engagement with the sensing pin levers 285 in such manner that when a sensing pin 284 is permitted to move upwardly and, as a consequence thereof, its sensing pin lever 285 is permitted to rock in a clockwise direction, (FIG. 17), the upper end of the push lever 290 will fall under a shoulder 293 on the sensing pin lever 285. Any of the push levers 290 that are permitted to rock in a counterclockwise direction (FIG. 17), about the pivot shaft 291, will thus bring its upper end under the shoulder 293 and when the bail 282 is rocked clockwise (FIG. 17) about its pivot shaft 289, the push lever 290 which has thus been selected will be pushed downwardly to move a contact lever slide 294 downwardly against the action of a spring 275 individual to it, to a position where a latching shoulder 295 on slide 294 will move under the lip of a latch lever 296. The latch levers 296 are individually urged to rock in a clockwise direction about the pivot shaft 291 by contractile springs 297 individual to them. Suitable guide means (not shown) are provided for guiding the contact lever slides 294, latch levers 296, and push levers 290 to hold them in alignment one with the other.

The cam sleeve 209 has on it a latch bail actuating cam 298 which at a predetermined time in the rotation of the reader cam sleeve 209 will engage its high portion with a cam roller 299 mounted on an upwardly extending arm of a latch bail 300 that is urged to rock in a counterclockwise direction (FIG. 17), about a pivot shaft 301 by a contractile spring 302. At a predetermined time in the rotation of the sleeve 209 the high portion of the cam 298 will engage the cam roller 299 and rock the bail 300 clockwise (FIG. 17). Each of the latch levers 296 has an arm 303, the left end of which, as viewed in FIG. 17, is in the path of the bail 300. Thus at the proper time in the cycle of rotation of the reader cam sleeve 209 all the latch levers 296 will be rocked counterclockwise to disengage them from any latching shoulders 295 with which they may have been engaged in a previous cycle of the reader cam sleeve 209. Also mounted for oscillation about the pivot shaft 301 is a push lever restoring bail 304 which has an arm in engagement with a cam 305 on the cam sleeve 209. At a predetermined time in the cycle of rotation the cam sleeve 209, the cam 305 will rock the push lever restoring bail 304 in a counterclockwise direction (FIG. 17), to move any one of the push levers 290, that had been engaged under the shoulder 293 of the sensing pin lever 285 associated with it, out from under the shoulder 293 thus to permit the spring 292 associated with that particular push lever 290 to move the push lever upwardly.

The contact lever slides 294 have aligned with them transfer contacts 315 which, in their normal unoperated position, close a contact pair 316 but which, when held in their lower position as shown in FIGS. 13 and 17 permit a contact pair 317 to close. There is one transfer contact 315 associated with each contact lever slide 294. Consequently, at the completion of each cycle of rotation of the sensing cam sleeve 209, any one of the sensing pins 284 which has found a hole in the tape in the area associated with it will have driven its associated push lever 290 downwardly and the push lever 290 will have pushed its associated contact lever slide 294 downwardly to a position where it will have been latched by its associated latch lever 296. This will permit the closure of the contact pair 317 and the opening of the contact pair 316. Thus the transfer contact 315 whose associated sensing pins 284 have found perforations in the tape in the area associated with them will have closed the aligned contact pair 317 whereas those sensing pins 284 which have not found holes in the tape will have failed to actuate their associated push levers 290 and as a consequence will have effected the closure of their associated contacts 316.

Near the end of the cycle of rotation of the sensing cam sleeve 209, the cam 231 on the cam sleeve will effect the closure of contact pair 234 (DCS) (FIG. 9) thus to energize the distributor clutch magnet 235 (DCM). When this occurs the distributor will effect the transmission of a permutation code signal in accordance with the setting of the contact pairs 316 and 317. At the beginning of its cycle of rotation the sensing cam sleeve 209 will first actuate the bail 304 to strip off the push levers 290 from engagement with the shoulders 293 with which they may have been engaged. After the push levers 290 have been stripped from engagement with the sensing pin levers 285, the sensing bail 282 will permit these sensing pins 284 to rise into engagement with the tape 145 to permit those push levers 290 which have been selected by their associated sensing pin levers 285 to rock counterclockwise as viewed in FIG. 17. Those push levers which are selected for actuation will then be moved downwardly by the bail 282 acting on the sensing pin levers 285.

After those push levers 290 which have been selected for actuation by their associated sensing pins 284 and sensing pin levers 285 have thus been pushed down, the bail 304 will actuate the latch levers 296 to release them for a short time and then restore them to the position shown in FIG. 17. In operating in this sequence, the latch levers 296 will release and then relatch any of the contact lever slides 294 that had been pushed downwardly on a previous cycle of operation of the sensing cam sleeve 209 and will also latch and hold down any of the contact lever slides 294 not selected on the previous cycle but selected on the then occurring cycle of rotation of the cam sleeve 209.

In addition to the cams previously described, the cam sleeve 209 has on it a pawl driving cam 318 (FIG. 18) with which there is associated a cam roller 319 that is mounted on the upwardly extending arm of a bell crank lever 320. The bell crank lever 320 is pivotally mounted on a stationary shaft 321 and has on its horizontally extending end a pin 322 that extends into a slot 323 in the end of a bail shaped lever 324 that is pivoted on the pivot shaft 286. The other end of the bail shaped lever 324 has pivotally connected to it a feed wheel driving pawl 326 for engagement with the teeth of a ratchet wheel 327. The pawl 326 is normally urged to rock in a clockwise direction (FIG. 18) by a contractile spring 328. Thus, once in each cycle of rotation of the cam sleeve 209, the cam 318 will cause the bell crank lever 320 to be rocked or oscillated about its shaft 321 to impart oscillation to the bail shaped lever 324 and consequently to reciprocate the driving pawl 326. A detent 329, mounted on the end of a detent arm 330, is spring urged into the teeth of the ratchet wheel 327 by a spring 331. This detent pawl 329 when in engagement with the teeth of the ratchet 327 will prevent reverse movement of the ratchet while the pawl 326 is being moved upwardly, but will permit the pawl to drive the ratchet when the pawl 326 is moved downwardly in its oscillation thus, to impart a single step of revolution to the sprocket feed wheel 251 once in each cycle of rotation of the sensing cam sleeve 209.

When the stop-run switch 262 is in either the stop or the run position, the control bail 264 will be urged to rock counterclockwise (FIG. 18) about its shaft 265 to engagement with the switch 262 by the combined action of the feed pawl 326 which is urged to rock against a pawl release arm 332 by its spring 338 and by the detent arm 330 under the action of its spring 331. A torn-tape bail 333 has an arm 334 which is also urged into engagement with the pawl release arm 332 by a spring 335 which urges the bail 335 about a shaft 336. These levers and arms normally hold an arm 337 of the control bail against the cam portion 338 of the stop-run switch 262. A multi-armed lever 339 mounted on a shaft 336 is urged by its spring 340 to follow the movement of the torn-tape bail 333. This multi-armed lever 339 has a transversely extending arm 341 which extends over a cooperating arm on a torn-tape detector pin 342 that is normally urged upwardly, as viewed in FIG. 18, by a spring 343. The torn-tape detector pin 342 is in alignment with an aperture 344 (FIG. 10) in the tape lid 260 and if the tape lid 260 is in its closed position as shown in the drawings, the absence of tape 145 at this point will be detected any time the stop-run switch 262 is in the run position. When the stop-run switch 262 is in the stop position, the torn-tape detector pin 342 will be held downwardly through the cooperative action of the control bail 264, torn-tape bail 333 multi-armed lever 339 which last named lever will hold the torn-tape detector pin in its downward position where it will hold a torn-tape switch TOTS closed.

A taut-tape detector lever 355 is pivotally mounted on a main top plate 356 and is so constructed that its left end, as viewed in FIG. 13, is heavier than its right end, whereby a tape engaging projection 357 on it will rest on a tape 145. When the tape 145 is drawn taut between the sprocket feed wheels 251 and 252 the lever 355 will be rocked by the taut-tape in a clockwise direction (FIG. 13) to close a taut-tape switch TTS. If the tape 145 is fed toward the left (FIGS. 9 and 13) by the sprocket feed wheel 251 while the sprocket feed wheel 252 is stationary a loop of tape such as that shown if FIG. 9 will be formed. Under this condition the free end of the tape, as indicated at 145A, will extend out beyond an auxiliary top plate 358 and the loop will form between the auxiliary top plate 358 and the main top plate 356. As described hereinbefore the belt 246 will, through the driving pulley 248, tend to drive the feed wheel 252 in the direction indicated by the arrows on FIG. 9. The feed wheel 252 may be blocked against rotation however, by the run-out magnet ROM which, as indicated most clearly in FIG. 13, will, in its de-energized condition, hold a blocking pawl 359 in the teeth of a ratchet wheel 360 fixed to the shaft 250. Energization of the run-out magnet ROM, however, will retract the pawl 359 from engagement with the ratchet wheel 360 and thus permit the feed wheel 352 to feed the tape to the left (FIGS. 9 and 13).

In addition to the taut-tape detector lever 355 there is another taut-tape detector lever 361 (FIG. 9) which will detect a taut-tape condition between the perforator and the reader. This taut-tape detector 361, which as seen most clearly in FIG. 10, rides the tape being fed from the perforator to the reader, will be lifted when a taut-tape condition exists between the perforator and the reader and will be caused to rock clockwise (FIG. 16) about its pivot 362 to rock a bail 363 (FIGS. 14 and 16) counterclockwise about the pivot shaft 265 on which the bail 363 is mounted. The bail 363, in rocking counterclockwise (FIG. 16) about the pivot shaft 265, tends to rock a multi-armed lever 364 about the pivot stud 267 since the bail 363 and lever 364 are interconnected by a spring 365. The lever 364 is mounted directly in back of the lever 266, shown in FIG. 14, and is pivotally connected to a contact actuator arm 366 similar to the slidable contact actuator arm 269 to open the stop-run switch SRS thereby to stop the reader.

Suitably mounted adjacent the left end of the reader, as viewed in FIG. 14 is a pull back magnet PBM having a plunger 367 that is pivotally connected to an arm 368 of a bail 369 that, as shown most clearly in FIG. 15, has a camming portion 370 for engagement with the arm 337 of control bail 264. Upon energization of pull back magnet PBM the bail 369 will be rocked counterclockwise about a pivot 371 and consequently as viewed in FIG. 15 will rock the control bail 264 in a counterclockwise direction.

Referring now to FIG. 18, the control bail 264 will be rocked in clockwise direction, as viewed in this figure, upon the energization of the pull back magnet PBM and will move through a relatively large arc, thereby to rock the driving pawl 326 out of engagement with the ratchet wheel 327 and also to rock the detent 329 out of engagement with ratchet wheel 327. This will result in the release of the ratchet wheel 327 and consequently will permit the belt 245 to drive the pulley 247 in a clockwise direction as viewed in FIG. 9. The pulley 247 will thus drive the shaft 249 clockwise as viewed in FIGS. 9 and 13 and counterclockwise as viewed in FIG. 14. This will cause the sprocket feed wheel 251 to be driven in a direction such that the loop of tape, as shown in FIG. 9, will be drawn back past the sensing pins 284 at a high rate of speed until the tape is drawn taut between the feed wheel 251 and the feed wheel 252, at which time the taut-tape lever 355 will be operated to close the taut-tape switch TTS.

Mechanism is also provided in the reader for piercing control holes in the tape 145 under control of the circuitry to be described hereinafter. The mechanism for piercing holes in the tape comprises an upper notching magnet UNM and a lower notching magnet LNM which are mounted on the front side of the reader as shown in FIG. 9. The upper notching magnet UNM and lower notching magnet LNM upon energization will attract their respective plungers 375 and 376 respectively, to draw them downwardly against the action of return springs 377 and 378, respectively. At their upper ends the plungers are pivotally connected to piercing levers 379 and 380, respectively (FIGS. 11 and 12), that are suitably pivoted on a combined guide and die bracket 381. The bracket 381 is mounted on the main top plate 356 in which there are provided clearance holes 382 through which piercing pins 383 on the ends of the levers 379 and 380 may freely pass for cooperation with die extensions 384 and 385 on the bracket 381. The piercing pin on the lever 379 is located so that when its associated magnet UNM is energized, it will pierce a hole in the sixth level of the tape whereas the piercing pin 383 on the lever 380 is so located that it will pierce a hole or notch at the eight level of the tape which is the lower edge of the tape.

When, in the sequence of the operation of the reader or sensing cam sleeve 209, the distributor clutch magnet DCM is energized to initiate a cycle of operation of the distributor cam sleeve 239, the cam sleeve 239 will be driven through a single cycle of rotation. As may be seen most clearly from FIG. 13, the distributor cam sleeve 239 has associated with it a plurality of cam levers 388 one of which is shown in FIG. 13. Each of these cam levers 388 is associated with a contact closing lever 389 and each of the contact closing levers 389 is normally urged to rock in a counterclockwise direction about a pivot point 390 by a spring 391 individual to it. In the position shown in FIG. 13 the contact closing lever 389 is in a position where the contact 392 which it controls is in the open condition. When the cam lever 388 is permitted to rock in a clockwise direction about its shaft 393, due to the engagement of the cam levers 388 with the low point on the cam portion associated with it, the spring 391 will be permitted to close the contacts 392. Five contacts 392, out of the group of contacts 392, are directly associated through suitable circuitry with the reader contacts 317 to generate signals under control of the contacts 317.

TAPE PREPARATION CIRCUITS

(1) Tape Feed-Out Operation

The first step in the preparation of a tape 145 for use in the present system is the feeding out of the perforator of a sufficient length of tape, ahead of the significant perforations in the tape, to span the space between the perforator and the reader with the leading end of the tape 145 having its feed holes in engagement with the tape feed wheels 251 and 252 in the reader. Consequently, the operator operates a feed-out key 26–FO to close a circuit from ground (FIG. 26) through the now closed break contacts 26–22–EAR–7 of an end-of-address relay 22–EAR, now closed break contacts 26–19–SMR–8 of a start-of-message relay 19–SMR, now closed break contacts 26–19–EMR–8 of an end-of-message relay 19–EMR, now closed break contact of transfer contacts COD in the Codomat and through the now closed break contacts of a distant area relay 26–25–DAR–8, a call direction code relay 26–25–CDR–8, a local area relay 26–25–LAR–8, a pseudomnemonic relay 26–25–PMR–8 relay, now closed make contacts of feed-out key 26–FO, a resistor 26–R1, the winding of the perforator clutch magnet 26–PU–MAG, auxiliary contacts 26–PU–AUX–II in the perforator, to —48 v. D.C. source in FIG. 26. Closure of this circuit will result in energization of the perforator clutch magnet 26–PU–MAG which is also shown in FIG. 4 of the mechanical portion of the drawings. The magnet 26–PU–MAG will remain energized as long as the key 26–FO is held closed and will result in the perforator going through repeated cycles to feed-out tape 145 without making any perforations. After the operator has fed out a sufficient length of tape she may release the key 26–FO and place the lead portion of the tape in proper position in the reader as shown in FIG. 3 in the drawings.

(2) Start of Message Operations

The tape 145 is now ready to receive the format sequence of codes for "Start-of-Message." The automatic perforation of this sequence of codes is initiated by the operator momentarily closing the contacts of a start-of-message key 19–SOM to energize a start-of-message relay 19–SMR. In closing the contacts of the key 19–SOM a circuit will be completed from ground in FIG. 26, through the previously described chain of break contacts, 26–22–EAR–7, 26–19–SMR–8, 26–19–EMR–8, 26–COD, 26–25–DAR–8, 26–25–CDR–8, 26–25–LAR–8, 26–25–PMR–8, terminal MD–9 in FIGS. 19 and 26, now closed contacts of key 19–SOM and the winding of a start-of-message relay 19–SMR to —48 v. D.C. source in FIG. 19. This will cause the energization of relay 19–SMR which will thereupon lock up to ground over its now closed break contacts 19–SMR–5, contact in normal position i.e., position 26, and wiper of a start and end-of-message stepper switch SESS–ARC–1 to ground in FIG. 19. In becoming energized, the start-of-message relay 19–SMR–10 to connect ground (FIG. 19) through the now closed break contact 19–SESS–ON–3 of the set of off-normal transfer contacts of start- and end-of-message stepper switch 19–SESS, thence through now closed make contact 19–SMR–10, now closed interrupter break contact 19–SESS–INTER–1 and the winding of the start- and end-of-message stepper switch magnet 19–SESS–MAG to —48 v. D.C. source in FIG. 19. This will energize the magnet 19–SESS–MAG and since the stepper switches used in this apparatus are of the type which step forward when they are released, this energization of magnet 19–SESS–MAG will prepare the start- and end-of-message stepper switch to step one step forward when its interrupter contact 19–SESS–INTER–1 is opened as a consequence of the energization of the magnet 19–SESS. This contact 19–SESS–INTER–1 is normally closed and opens any time the magnet 19–SESS is energized. Thus, the start- and end-of-message stepper switch 19–SESS will move all of its brushes to position No. 1 on the various arcs of the switch. Energization of the start- and end-of-message stepper switch magnet 19–SESS–MAG will also operate its off-normal contact 19–SESS–ON–1 to close this contact and to open its contact 19–SESS–3.

Figure 20:
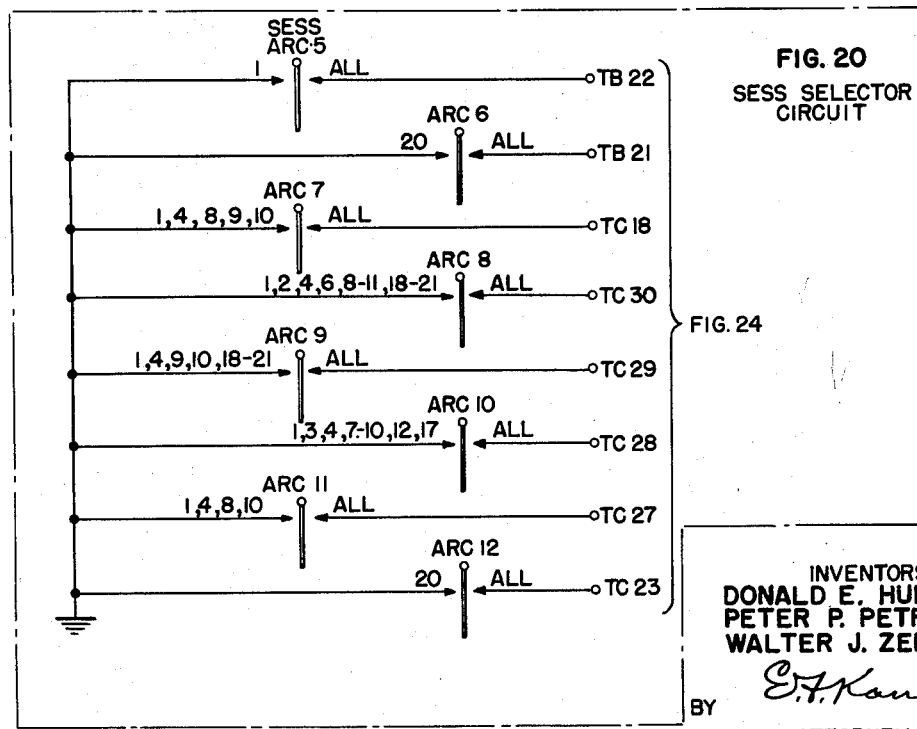

When the start- and end-of-message stepper switch 19–SESS moves its brushes or wipers from the normal No. 26 position, to the No. 1 position, the punch will be started and the first character of the start-of-message format sequence will be perforated in the tape. Since this involves the initiation of a cycle of operation of the perforator a circuit will be completed from ground FIG. 19 through contact and wiper of ARC–4 of stepper switch 19–SESS in position 1, now closed make contact 19–SMR–2, terminal TC–19 on FIGS. 19 and 26, resistance R–1, winding of perforator clutch magnet 26–PU–MAG, break contact 26–PU–AUX–II to —48 v. D.C. source in FIG. 26. Simultaneously with the completion of this circuit to the magnet 26–PU, the physical embodiment of which is shown in FIG. 7, the wipers of the switch 19–SESS will also complete the following circuits:

From ground, FIG. 20, through the contacts and wipers of the start- and end-of-message stepper switch 20–SESS in position 1 of 20–SESS–ARC–11, 20–SESS–ARC–10, 20–SESS–ARC–9, 20–SESS–ARC–8, 20–SESS–ARC–7 and 20–SESS–ARC–5, to terminals TC–27, TC–28, TC–29, TC–30, TC–18, and TB–22, respectively, on FIGS. 20 and 24 and to one side of each of the selector magnet coils 142 which control the perforation of the first, second, third, four, fifth and seventh levels, respectively, of the tape. Since the other sides of the selector magnet coils 142 are all connected to terminal TB–25 (FIGS. 24 and 26) this circuit will continue through break contact 26–PU–AUX–II to −48 v. D.C. source in FIG. 26 and the coils 142 for the first, second, third, fourth, fifth and seventh levels will be energized. When the perforator clutch magnet 26–PU is operated, it will initiate a single cycle of rotation of the shaft 102 of the perforator, and due to the energization of the coils 142 as just mentioned will cause a letters combination, with a seventh level control hole, to be perforated in the tape 145. When the shaft 102 goes through one cycle it will, later in the cycle, close an auxiliary contact in the perforator 25–26–PU–AUX–I to connect ground (FIG. 25) through make contact 25–26–PU–AUX–I, terminal TC–26 (FIGS. 19 and 25), and contact 19–SMR–4 and through the winding of the magnet 19–SESS to −48 volts D.C. source shown in FIG. 19. When this occurs the start- and end-of-message stepper switch magnet 19–SESS will again be energized and will be released through its interrupter contact 19–SESS–INTER–1 to step to position No. 2.

When the start- and end-of-message stepper switch 19–SESS is in position No. 2 its ARC–8 wipers, 20–ARC–8, will complete a circuit from ground in FIG. 20, through ARC–8, terminal TC–30 (FIGS. 20 and 24) the fourth level selector magnet coils 142, terminal TB–25 (FIGS. 24 and 26) break contacts 26–PU–AUX–II now closed to the −48 v. D.C. source in FIG. 26, thus to energize the fourth level selector magnet in the perforator. Simultaneously the wipers on ARC–4 of the stepper switch 19–SESS will complete a circuit from ground (FIG. 19) through 19–SESS–ARC–4 in position 2, the now closed make contact 19–SMR–2 terminal TC–19, resistor R–1 and the magnet 26–PU–MAG and now closed break contacts 26–PU–AUX–II to the −48 v. D.C. source. This will cause the perforator to go through a cycle of operation and to perforate the tape 145 with the second character of the start-of-message format sequence (that is, with the code for "CARRIAGE RETURN").

The start- and end-of-message stepper switch 19–SESS will, in similar manner, be stepped through its No. 3 and No. 4 positions to cause the perforation in the tape 145 of the "LINE FEED" and "LETTERS" code combinations and then will automatically step onto position 5 in the same manner as described in connection with the perforation of the "LETTERS" plus the seventh level hole and the "CARRIAGE RETURN" codes in the tape. When the perforator completes the perforation of the start-of-message format sequence in the tape, it will close its contact 25–PU–AUX–I to complete a circuit from ground (FIG. 25) through terminal TC–26, now closed make contact 19–SMR–4 through magnet 19–SESS to the −48 v. D.C. current source in FIG. 19 to step the wipers of the stepper switch 19–SESS to the No. 5 position thereby to open the operating path for the perforator clutch magnet 26–PU–MAG at ARC–4 of stepper switch 19–SESS. Simultaneously the start- and end-of-message stepper switch 19–SESS will, through ARC–3 in FIG. 19 complete a circuit from ground (FIG. 10) through now closed make contacts 19–SESS–ON, the wiper of 19–SESS–ARC–3 in position 5, now closed make contact 19–EMR–10, break contact 19–SESS–INTER–1, winding of magnet 19–SESS–MAG to the −48 v. D.C. source (FIG. 19). Since, as indicated in FIG. 19, positions 5 to 23 of ARC–3 of the start- and end-of-message switch 19–SESS are connected through the now closed make contact 19–SESS–ON and now closed break contacts 19–EMR–10 and the contacts 19–SESS–INTER–1 to the 19–SESS magnet and thence to the −48 v. D.C. source in FIG. 19, the start- and end-of-message stepper switch 19–SESS will step through the position 24 under control of its interrupter contact 19–SESS–INTER–1 which will open each time the magnet 19–SESS–MAG is energized thereby to break the circuit to the magnet 19–SESS–MAG each time the magnet is energized. This will result in the start- and end-of- message stepper switch 19–SESS stepping around rapidly to position 24.

Since the contacts in positions 1 to 22 of ARC–1 of start- and end-of-message stepper switch 19–SESS–ARC–1 have at this time been holding the start-of-message relay 19–SMR energized, ARC–1 of start- and end-of-message switch 19–SESS in passing through position 23 will break the circuit to the start- and end-of-message relay 19–SMR which will thus be de-energized. If the key 19–SOM has been held operated at this time, the start- and end-of-message stepper switch 19–SESS will remain in position 24. However, if the start-of-message key 19–SOM has been released either prior to or at the time that the switch 19–SESS is in position 24, the start-of-message relay 19–SMR in being released or de-energized will close its normally closed contact 19–SMR–12 and thereupon ground in FIG. 19 will be fed through the now closed make contacts 19–SESS–ON, the wipers of ARC–3 of stepper switch 19–SESS in position 24, through the now closed break contact 19–SMR–12, the now closed break contact 19–EMR–10 of the end-of-message relay 19–EMR and through the interrupter switch 19–SESS–INTER–1, and the magnet 19–SESS to −48 v. D.C. source in FIG. 19. When this occurs the start- and end-of-message stepper switch 19–SESS will step onto its normal position, which is position No. 26, under control of the interrupter contact 19–SESS–INTER–1. This will complete the entering into the tape of the start-of-message format sequence.

(3) *Address Entering Operations*

After completion of the entering, into the tape, of the start-of-message format sequence of code perforations, the address of the stations to which the message is to be directed may be entered into the tape under control of either the Codomat or under control of the operator operating keys on the keyboard. The first, and the preferable method, is to enter the addresses of the called stations by utilization of the Codomat which as pointed out hereinbefore is described in detail and claimed in the copending application of W. J. Zenner, Serial No. 840,-938 filed September 18, 1959. When the operator selects a card and pulls the card into the Codomat, a circuit will be completed from ground source (FIG. 26) through, the now closed break contacts 26–22–EAR–7, 26–19–SMR–8, 26–19–EMR–8, now closed make contacts 26–COD in the Codomat which was closed by inserting a card in the Codomat sensing head (this contact being designated 115 in the application of W. J. Zenner mentioned hereinbefore), thence through now closed break contacts 26–25–DAR–1, 26–25–CDR–1, 26–25–LAR–1, 26–25–PMR–1, 26–RSR–5, 26–PU, AUX–III resistance R2, winding of magnet 26–COD–MAG to the −48 v. D.C. source in FIG. 26. This will energize the sensing magnet 26–COD–MAG of the Codomat which is designated 117 in the Zenner application referred to hereinbefore. The magnet 26–COD of the Codomat has a contact COAU associated with it which is closed when the magnet 26–COD–MAG is energized. Thus, when the magnet 26–COD–MAG is energized a Codomat relay 26–CMR. This relay 26–CMR will be held energized as long as the Codomat magnet 26–COD–MAG is held energized. Simultaneously with the energization of the relay 26–CMR the sensing pins of the Codomat will be released by the mechanism in the Codomat to read the first row of perforations in the Codomat card.

Figure 26:
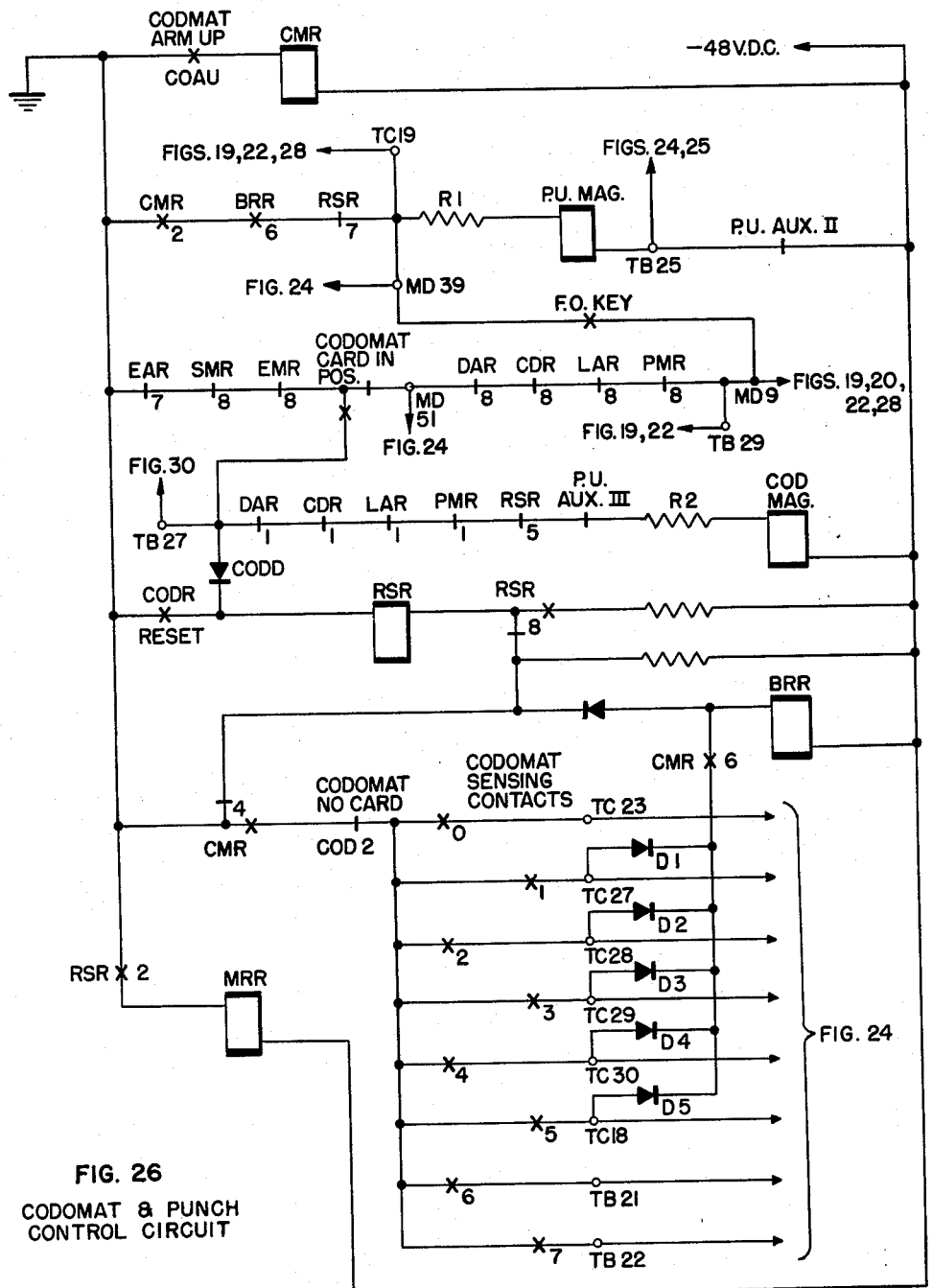

All of the Codomat cards are perforated, in the first row to be sensed, with a code combination for the Figures function plus a perforation in the "0" level. Consequently, when relay 26–CMR operates a circuit will be completed to energize a break relay 26–BRR from ground (FIG. 26) through the now closed make contacts 26–CMR–4, break contacts 26–COD–2 which is opened when there is no card in the Codomat through any one of the Codomat sensing contacts 1, 2, 4, or 5, all of which are closed upon sensing the "FIGURES" combination, the diodes D1, D2, D4, or D5, now closed make contact 26–CMR–6, winding of relay 26–BRR to −48 v. D.C. source (FIG. 26). The diodes associated with the sensing contacts in the Codomat will permit current to flow to effect this operation. Any of the sensing contacts in the Codomat which have been closed by their associated sensing pins will complete circuits to their associated code magnet coils 142 (FIG. 24) in the perforator, in this instance, the 0, 1, 2, 4 and 5 magnets in the perforator, over a circuit from ground, FIG. 26, make contact 26–CMR–4, break contact 26–COD–2, closed sensing contacts 0, 1, 2, 4 and 5, terminals TC–23, TC–27, TC–28, TC–30, and TC–18, respectively, to the coils 142 and terminal TB–25, in FIGS. 24 and 26, break contact 26–PU–AUX–II to −48 v. D.C. source in FIG. 26.

The energization of break relay 26–BRR will operate the punch magnet 26–PU in a circuit from ground (FIG. 26) through the now closed make contacts 26–CMR–2 and 26–BRR–6 and break contact 26–RSR–7, the winding of punch magnet 26–PU–MAG, punch auxiliary contact 26–PU–AUX–II to the −48 v. D.C. source in FIG. 26. This will initiate a cycle of operation of the perforator which will perforate the tape with the code for "Figures" plus a "0" level control hole in the same manner as was described in connection with the perforating of the start-of-message code sequence.

When the punch magnet 26–PU–MAG thus initiates a cycle of operation of the perforator, the shaft 102 will, through cams on its cam sleeve, open the break contacts 26–PU–AUX–III and 26–PU–AUX–II. The opening of break contact 26–PU–AUX–III will break the circuit to the Codomat magnet 26–COD and the opening of the break contact 26–PU–AUX–II will release the perforator magnet 26–PU–MAG and any of the code magnets whose coils 142 (FIG. 24) had been energized. Upon becoming deenergized, the Codomat magnet 26–COD–MAG will permit its armature to drop down thereby to open the contacts 26–COAU which will then release the Codomat relay 26–CMR. Codomat relay 26–CMR in being released will reopen its make contact 26–CMR–4 to break the circuit from ground (FIG. 26) to the winding of break relay 26–BRR causing it to be deenergized.

Since the contacts 26–PU–AUX–II and 26–PU–AUX–III are reclosed by their associated cams before the cam sleeve on cam shaft 102 in the perforator completes its cycle of rotation a new cycle of the Codomat will be initiated if the Codomat card is still in position to be sensed. This is accomplished by the reclosing of the contacts 26–PU–AUX–III which will close the circuit to reenergize the Codomat magnet 26–COD–MAG which was closed on the first cycle by the closing of make contact 26–COD. The cycle described in connection with the first sensing operation by the Codomat will be repeated for the next combination perforated in the Codomat card and this cycling will continue until the Codomat sensing pins find no holes in the Codomat card or until the sensing carriage of the Codomat reaches the end of its travel and closes its reset make contact 26–CODR.

In the event that all the available rows of perforations in the Codomat card are perforated with code combinations and as a consequence the Codomat sensing carriage moves through its maximum travel, the carriage will close the contact 26–CODR to complete a circuit to energize a reset relay 26–RSR in a circuit from ground in FIG. 26 through make contact 26–CODR the winding of relay RSR break contact 26–RSR–8 and through the resistor to the −48 v. D.C. source (FIG. 26). The reset relay 26–RSR may also be energized when the Codomat sensing contacts find no perforations in the card at any level of the card, over circuit from ground (FIG. 26) through break contact 26–22–EAR–7, 26–19–SMR–8, 26–19–EMR–8 make contact 26–COD, through diode CODD, the winding of release relay 26–RSR, break contact 26–RSR–8 and the resistor to the −48 v. D.C. source (FIG. 26). This relay will be energized since the shunting path through the diodes associated with the Codomat sensing contacts will now be broken and as a consequence the ground potential which had been applied to the winding of the relay 26–RSR will be removed from it. Energization of the relay 26–RSR will open its break contacts 26–RSR–7 to open the path from ground (FIG. 26) through now closed make contacts 26–CMR–2, 26–BRR–6, now open break contacts 26–RSR–7 to the punch magnet 26–PU–MAG. Relay 26–RSR in being energized will also operate its make contact 26–RSR–2 to energize a motor relay 26–MRR in the Codomat which will render the motor of the Codomat effective to eject the card, which had been placed in the Codomat sensing head, back into the card file. In addition the energization of relay 26–RSR will open its break contacts 26–RSR–5 to release the Codomat magnet 26–COD–MAG.

When the Codomat magnet 26–COD–MAG is released its armature in being released will open the contact 26–COAU thereby to release the circuit to the Codomat relay 26–CMR. In releasing the Codomat relay 26–CMR will open its make contacts and close its break contacts 26–CMR–4 to disconnect the Codomat sensing contacts from the ground potential on FIG. 26.

When the Codomat motor relay 26–MRR renders the Codomat motor operative to eject a card mechanically from the Codomat, a cam on a shaft driven by the Codomat motor will close a make contact 26–CODR to supply ground potential through that contact to the winding of the relay 26–RSR make contact 26–RSR–8 and resistor to the −48 v. D.C. source at FIG. 26, thus to hold the reset relay 26–RSR energized until the card is completely ejected from the reading portion of the Codomat apparatus. When the card, which has been read by the Codomat, is completely ejected from its sensing or reading portion, contacts 26–CODR will be restored to their normal open condition thereby to release relay 26–RSR which in returning to its deenergized condition will open its make contacts 26–RSR–2 thereby to release the motor relay 26–MRR. At this point in the operation of tape preparation the direct distance dialing number and the mnemonic code of one receiving station, to which a message is to be directed, has now been perforated in the tape. If it is desired to utilize the Codomat cards to enter a plurality of addresses in the tape, other cards in the file of the Codomat may be moved into position to effect an operation similar to that effected by the first card and cause perforation in the tape of the direct distance dialing numbers and mnemonic codes of any cards which are sensed by the Codomat, in succession.

(4) *End-of-Address Sequence Operation*

After the direct distance dialing number and mnemonic code of stations to whom the message is to be transmitted have thus been entered or perforated in the tape, the operator may operate an end-of-address key 22–EOA to complete a circuit from ground (FIG. 26) through break contacts 26–22–EAR–7, 26–19–SMR–8, 26–19–EMR–8, 26–COD, 26–25–DAR–8, 26–25–CDR–8, 26–25–LAR–8, 26–25–PMR–8, terminal MD–9 on FIGS. 22 and 26, through the closed end-of-address key 26–EOA and through the winding of the end-of-address relay 22–EAR to −48 v. D.C. source in FIG. 22 thus, to momentarily energize the relay 22–EAR which will lock up through the end-of-address stepper switch 22–EASS–ARC–1 in a path from ground (FIG. 22) through the common brush or wiper of the stepper switch 22–EAS–ARC–1, in position 26 (normal position), through now closed make contacts 22–25–EAR–5 through the winding of the relay to the −48 v. D.C. source in FIG. 22. This will initiate the perforating into the tape 145 of the end-of-address code sequence and also will initiate the perforation in the tape of the time of day which is obtained from a timer as illustrated diagrammatically in FIG. 21. The timer is of the type wherein a synchronous motor continuously drives a cam that in turn operates a pawl once a minute to step a cam drum one increment each minute and the cam drum has coded on its camming projections for closing switches in accordance with the Baudot code for the digits 1 to 9 and 0. This group of switches are designated No. 1 punch-units-minutes, No. 2 punch-units-minutes etc. in FIG. 21. In being driven from its 9 to its 0 position the first cam drum will drive a second cam drum for controlling the switches designated No. 1 punch-tens-minutes etc. This drum has on its periphery camming projections, which will close its switches to set up codes for the digits 0 to 5 and at the end of one cycle will step a third drum bearing camming projections for the numbers 00 to 23 to close switches units-hours and tens-hours. It will be noted that there are only two switches No. 1 and No. 2 for the tens-hours because only the codes for 0, 1 and 2 need be punched in the tape for the tens-hours and the Baudot code for each of these digits is "marking" or current for the two and five levels and "spacing" or no current for the four level. Consequently the codes vary or distinguish from each other only in the one and three levels thus when the code for the 0, 1 or 2 is to be punched in the tape for the tens digit of the hour, the two and five levels are marking and the four level is spacing. In order to avoid reading the condition of the punch controlling switches in the timer when they might be moving, the driving pawl which activates the first drum and through it actuates the succeeding drums, is blocked from operation by a clock blocking magnet 21–CBM, which is energized under control of end-of-address relay 22–EAR. This relay upon energization, will close its make contact 21–22–EAR–8 to complete a circuit from ground (FIG. 21) through the contacts 21–22–EAR–8 and the winding of magnet 21–CBM to —48 v. D.C. in FIG. 21 to hold the magnet energized as long as the end-of-address relay 22–EAR is held energized.

When relay 22–EAR is energized it will lock up over a path from —48 v. D.C., FIG. 22, winding of relay 22–EAR, through its own contacts 22–EAR–5, ARC–1 of 22–EASS in position 1 to 21 and 26, to ground (FIG. 22). End-of-address relay 22–EAR in being energized closes an operating path from ground (FIG. 22) through break contact 22–EASS–ON–2, make contacts 22–EAR–10, 22–EASS–INTER–1, winding of end-of-address magnet 22–EASS to —48 v. D.C. (FIG. 22). As soon as magnet 22–EASS is pulled up it will open its interrupter contacts 22–EASS–INTER–1 to break its operating path and the wipers on all of its arcs will move to position 1 on their respective arcs.

The end-of-address stepper switch 22–EASS in position 1 will complete a circuit to the punch magnet 26–PU–MAG from ground in FIG. 22, through ARC–4 to 22–EASS, make contact 22–EAR–2, terminal TC–19, (FIGS. 22 and 26) the resistor in series with winding of punch clutch magnet 26–PU–MAG, contacts 26–PU–AUX–II to the —48 v. D.C. source in FIG. 26. This will initiate a punching cycle and since the end-of-address stepper switch 23–22–EASS–ARC–8 is now in position 1, a circuit will be completed from ground (FIG. 23) through the wiper of 23–22–EASS–ARC–8, terminal TC–30 in FIGS. 23 and 24, coils 142 of the selector magnet 4 in FIG. 24, terminal TB–25, in FIGS. 24 and 26, contacts 26–PU–AUX–II to —48 v. D.C. source (FIG. 26). The perforator will thus perforate the fourth level of the tape 145 to encode in the tape the code for carriage return ("CR").

Energization of relay 22–EAR also opens the path to the magnet 22–EASS–MAG at its break contact 22–EAR–10 and in closing its make contact 22–EAR–4 transfers control of the end-of-address stepper switch magnet 22–EASS–MAG to the auxiliary contact of the perforator, make contact 25–26–PU–AUX–I. The shaft 102 in driving the perforator through one cycle of operation to perforate the "carriage return" combination in the tape closes its make contact 25–26–PU–AUX–I to complete a circuit from ground (FIG. 25) through this contact, terminal TC–26 (FIGS. 22 and 25) and now closed make contact 22–EAR–4 to reenergize the end-of-address stepper switch magnet 22–EASS–MAG. As soon as make contact 25–26–PU–AUX–I reopens in the cycle of the perforator, the end-of-address stepper switch 22–EASS will be stepped to position 2 due to the opening of the circuit to its magnet 22–EASS–MAG at the contact 25–26–PU–AUX–I. When the end-of-address stepper switch 22–EASS–MAG is in position 2 it will complete a circuit through its ARC–10, shown on FIG. 23, from ground (FIG. 23) through 23–EASS–ARC–10 in position 2, terminal TC–28 (FIGS. 23 and 24), through the No. 2 magnet 142, terminal TB–25 (FIGS. 24 and 26), through contact 26–PU–AUX–II to the —48 v. D.C. source in FIG. 26. As a consequence of the completion of this circuit the No. 2 level of the tape 145 will be perforated, this being the code for "LINE FEED." The magnet 26–PU in the perforator will be energized over the previously described circuit through the end-of-address stepper switch 22–EASS–ARC–4 through make contact 22–EAR–2, terminal TC–19 (FIGS. 22 and 26) and through the winding of the perforator clutch magnet 26–PU–MAG, break contact 26–PU–AUX–II to the —48 v. D.C. source in FIG. 26.

The end-of-address stepper switch will be stepped in this manner until its wipers on 22–EASS–ARC–1 reach position 22. In the No. 3 position of the end-of-address stepper switch 22–EASS, the code for "FIGURES" will be perforated in the tape as indicated in FIG. 2, followed the codes for the "LETTERS" and "M" and then the code for "LETTERS." When the end-of-address stepper switch 22–EASS arrives in position 7, the code reading contacts and selector magnets shown in FIG. 24 will be selected and operated under control of 23–EASS–ARC–7 through 11 to cause the tens hours, units hours, tens minutes, and units minutes to be perforated in the tape under control of the timer contacts shown in FIG. 21. This circuit extends from ground (FIG. 21), through the selectively controlled punch contacts for units, minutes, tens-minutes, units-hours and tens-hours through 23–EASS–ARC–7, 8, 9, 10 and 11 terminals TC–18, TC–30, TC–29, TC–28 and TC–27, respectively in FIGS. 23 and 24, to selectively energize the selector magnets 1–5 shown in FIG. 24, through the coils of the selected selector magnets 142, terminal TB–25 (FIGS. 24 and 26) and through the break contact 26–PU–AUX–II to the —48 v. D.C. source in FIG. 26. When the end-of-address stepper switch 22–EASS moves into position 11, it will, through its wipers in this position complete circuits from 23–EASS–ARC–7, 8, 9, 10 and 11 from ground in FIG. 23 through the various arcs 7, 8, 9, 10 and 11 terminals TC–18, TC–30, TC–29, TC–28 and TC–27 (FIGS. 23 and 24), respectively, to the coils 142 of magnets 5, 4, 3, 2 and 1 in selector magnet circuit shown in FIG. 24, to energize these magnets and as in the previously described circuits in preforator will be driven one complete cycle to perforate the code, which in this instance, is "LETTERS." When the end-of-address stepper switch 23–EASS–ARCS–7 through 11 are stepped into the 12th position the code for "Spacing" function will be perforated in the tape, that is, the tape will be perforated at the three level only, over circuits substantially the same as those just described in connections with the perforation of the "LETTERS" code.

Upon arriving at the 13th position the end-of-address stepper switch 22–EASS–MAG will start to cause the mnemonic code, for the sending or the transmitting station, to be perforated in the tape. Thus, since the code for each transmitting or sending station is different, no particular code has been shown, but it will be understood that this code sequence will be perforated in the tape under control of the wipers in the end-of-address stepper switch 23–EASS–ARCS–7 through 11. The encoding of the mnemonic code representative of the transmitting station is effected as the stepper switch 23-22-EASS steps through positions 13 to 21 by connecting selected ones of the terminals TA-1 to TA-34, inclusive, to ground so that as the end-of-address stepper switch steps through the 13th to 21th position, a mnemonic code such, for example, as the code ATLOODL, and "CARRIAGE RETURN," "LINE FEED" will be set up from ground at the grounded ones of the terminals TA-1 to TA-34 then through the wipers in stepping from positions 13 to 21, through terminals TC-18, 30, 29, 28 and 27, to the coils 142 of the selector magnets 1-5 shown in FIG. 24. In this manner the identification of the transmitting station is perforated, in Baudot code, in the tape 145. When the end-of-address stepper switch 22-EASS-MAG arrives at position 22, ground in FIG. 22 will be disconnected from the end-of-address relay 22-EAR at 22-EASS-ARC-1 in position 22. This will result in the de-energization of the end-of-address relay 22-EAR and consequently, the end-of-address stepper switch 26-EASS-MAG will step to its home position, that is, position 26 through the making and breaking of its own interrupter contact 22-EASS-INTER-1, in a circuit from ground in FIG. 22, through the now closed make contact 22-EASS-ON-1, now closed break contact 22-EAR-10 and the interrupter contact 20-EASS-INTER-1, through the winding of the magnet 22-EASS-MAG to the −48 v. D.C. source in FIG. 22. In the event that the end-of-address key 22-EAO is held closed when the end-of-address stepper switch 22-EASS-MAG is in position No. 22, which would hold end-of-address relay 22-EAR energized, the end-of-address stepper switch would not step due to the fact that the normally closed contact 22-EAR-10 would thus be held open and the end-of-address stepper switch 22-EASS-MAG would only return to its home or 26th position upon release of the end-of-address key 22-EOA.

After the end-of-address sequence including the time of day and the mnemonic code for the transmitting station has been perforated in the tape, the operator may operate the standard keys in the keyboard to put the text of the message to be transmitted to the various receiving stations in the tape, in Baudot code, the standard keys controlling the perforator in the usual manner. Upon the completion of the perforation in the tape 145, of the text of the message to be transmitted to the various addressed receiving or terminating stations, the tape may be perforated with a code sequence indicating that the message is complete, thereby to restore the apparatus to position to perforate a tape addressed to other terminating stations and having a different message.

(5) *End-of-Message Sequence Operation*

After the operator has completed the operation of the standard keys on the keyboard to control the perforation of the text of the message in the tape, the operator may operate an end-of-message key 19-EOM to complete a circuit from ground in FIG. 26 through the now closed, break contacts 26-22-EAR-7, 26-19-SMR-8, 26-19-EMR-8, 26-COD, 26-25-DAR-8, 26-25-CDR-8, 26-25-LAR-8, 26-25-PMR-8, terminal MD-9 (FIGS. 19 and 26) now closed make contacts of key 19-EOM, end-of-message relay 19-EMR to the −48 v. D.C. source in FIG. 19. Relay 19-EMR upon being energized will lock over its locking contact 19-EMR-5 and ARC-1 of start- and end-of-message stepper switch 19-SESS in position 26 and positions 1-22 to ground (FIG. 19). When end-of-message relay 19-EMR is energized it will complete a circuit from ground (FIG. 19) through the now closed break contact 19-SESS-ON-3 since the start- and end-of-message stepper switch 19-SESS is in its normal position, through now closed make contact 19-EMR-10 and interrupter contact 19-SESS-INTER-1 through the winding of the start- and end-of-message stepper switch magnet 19-SESS-MAG to −48 v. D.C. source in FIG. 19 thereby to energize the magnet of the start- and end-of-message stepper switch 19-SESS. The energization of the end-of-message relay 19-EMR also partially closes an operating path to the perforator magnet 26-PU-MAG to prepare it for operation when start- and end-of-message stepper switch 19-SESS arrives in position 6.

When the start- and end-of-message stepper switch 19-SESS is energized, it will open its break contact 19-SESS-INTER-1 to break the circuit to the magnet 19-SESS thereby to cause the start- and end-of-message stepper switch to move to position 1. In position 1 the magnet 19-SESS will again be energized in a path from ground (FIG. 19) through the now closed make contact SESS-ON-1, ARC-2 of start- and end-of-message stepper switch 19-SESS, now closed break contact 19-SMR-10 and the interrupter contact 19-SESS-INTER-1 to the magnet 19-SESS and thence to −48 v. D.C. source in FIG. 19. Since brushes 1-5 of ARC-2 of stepper switch 19-SESS are all connected over the circuit just described, the start- and end-of-message stepper switch 19-SESS will step through positions 1-5 and into position 6. Upon arriving at position 6 the start- and end-of-message stepper switch 19-SESS will complete a circuit from ground (FIG. 19) through ARC-4 of 19-SESS in position 6 through the now closed make contacts 19-EMR-2, terminal TC-19 (FIGS. 19 and 26) and thence through resistance 26-R-1 and the perforator magnet 26-PU and auxiliary contacts 26-PU-AUX-II to −48 v. D.C. source in FIG. 26 thereby to energize the perforator magnet 26-PU-MAG and initiate a cycle of operation of the perforator. When the start- and end-of-message stepper switch 19-SESS reaches position 6, it will complete a circuit through its wipers on ARC-8 (FIG. 20) from ground in FIG. 20 through ARC-8 of stepper switch 19-SESS, terminal TC-30 (FIGS. 20 and 24) to the No. 4 selector magnet whose coils 142 are connected to terminal TC-30 and thence through terminal TB-25 (FIGS. 24 and 26) to now closed break contacts 26-PU-AUX-II to the −48 v. D.C. source in FIG. 26. Thus, in the cycle of operation of the perforator initiated by the completion of the circuit to perforator control magnet 26-PU-MAG just described, the "carriage return" code combination will be perforated in the tape.

In the cycle of operation of the perforator during which the carriage return combination is perforated in the tape 145 the auxiliary contacts in the perforator 25-PU-AUX-1 will be closed and then opened to supply ground on FIG. 25 momentarily through the contacts 25-PU-AUX-I now closed, terminal TC-26 (FIGS. 19 and 25) now closed make contact 19-EMR-4 and through the winding of the start- and end-of-message switch magnet 19-SESS to −48 v. D.C. source (FIG. 19), to step the start- and end-of-message stepper switch to position 7 and through the various arcs of the start- and end-of-message stepper switch shown in FIG. 20 to perforate the "LINE FEED" code in the tape. This operation will be repeated until the start- and end-of-message stepper switch 19-SESS arrives on position 22 and the arrangement of the contacts on the ARC-7 through ARC-11 of the stepper switch will cause the perforation in the tape 145 of the "FIGS," "V," "LETTERS," "CARRIAGE RETURN" followed by six "LINE FEED" codes and the code for "N" four times with perforations in the "0" and "6" levels associated with the third "N," thus to perforate in the tape the end-of-message code sequence.

When the start- and end-of-message stepper switch 19-SESS arrives on position 22, ARC-2 of it will complete a circuit from ground (FIG. 19) through the now closed make contact 19-SESS-ON-1, through ARC-2, now closed break contacts of the start-of-message relay 19-SMR-10 and the now closed break contacts 19-SESS-INTER-1, through the winding of the magnet 19-SESS to −48 v. D.C. source (FIG. 19) to step the start- and end-of-message stepper switch to its 23rd position at which position ARC-1 of the start- and end-of-message stepper switch 19-SESS will open the path from ground (FIG. 19) through ARC–1 and the locking contact 19–EMR–5 to the coil of the end-of-message relay 19–EMR. When the end-of-message relay 19–EMR is thus de-energized, it will re-establish a path through break contact 19–EMR–10 which will now be closed, from ground (FIG. 19) through the now closed make contact 19–SESS–ON–1 through ARC–3 wiper in positions 23, 24 and 25, through break contact 19–SMR–12 in positions 24 and 25 now closed break contact 19–EMR–10, the interrupter contact 19–SESS–INTER–1 to the magnet 19–SESS and thence to the —48 v. D.C. source in FIG. 19. This will cause the magnet 19–SESS to operate repeatedly under control of its interrupter contact 19–SESS–INTER–1 to drive the start- and end-of-message stepper switch 19–SESS to its normal or 26th position. This will complete the end-of-message code sequence and the tape may then be fed into the reader or transmitter to transmit the message to the selected stations.

(6) *Local Area Dialing Operation*

In the event that it is desired to transmit a message to a receiving or terminating station which is in the same local area as the originating or transmitting station, the operator may operate a local area key 25–LA on the keyboard to close a circuit from ground in FIG. 26 through the now closed break contacts 26–22–EAR–7, 26–19–SMR–8, 26–19–EMR–8, 26–COD, 26–25–DAR–8, 26–25–CDR–8, 26–25–LAR–8, 26–25–PMR–8, terminal MD–9 key (FIGS. 26 and 25), now closed key 25–LA, winding of local area relay 25–LAR to —48 v. D.C. source in FIG. 25, thus, to energize the local area relay 25–LAR. This operation may take place at any time after the start-of-message code sequence has been perforated in the tape and before the end-of-address code sequence has been perforated in the tape provided addresses are not being perforated under control of the Codomat. Energization of the relay 25–LAR will through contact 25–LAR–2 complete a circuit to light a signal lamp 25–LAR, the circuit extending from ground (FIG. 25) through the now closed make contact 25–LAR–2 then through the lamp 25–LAR to —48 v. D.C. source (FIG. 25). When the relay 25–LAR is energized, it will lock operated in a path from ground (FIG. 25) through the break contacts of the letters key 25–LTRS and make contacts 25–LAR–7 through the winding of relay 25–LAR to the —48 v. D.C. source (FIG. 25). The energization of this relay 25–LAR will also open the operate path to the Codomat magnet 26–COD by opening the break contact 26–25–LAR–1. The operation of relay 25–LAR prepares the perforator to perforate the code sequences under control of the keyboard and other of the circuitry to be described for also perforating control holes in the zero and seventh level of the tape. In operating, the relay 25–LAR prepares an operating path from ground (FIG. 25) through the not yet closed figures key 25–FGS, make contacts 25–LAR–10 to the winding of the relay 25–FGR and thence to —48 v. D.C. source (FIG. 25) so that upon operation of the "FIGURES" key in the keyboard, the relay 25–FGR will be pulled up. Furthermore, in order to control the perforation of the tape when a local area address is to be entered in tape manually under control of the keyboard, relay 25–LAR, in operating, prepares a path to operate the control circuit stepper switch 25–CCSS in a path, from ground (FIG. 25) through make contact 25–LAR–12, make contact FGR–12 (which will be closed on the operation of relay 25–FGR), through the break contacts 25–CCSS off normal, thence through the interrupter contact 25–CCSS–INTER–1 and the winding of the control circuit magnet 25–CCSS to the —48 v. D.C. source (FIG. 25). Relay 25–LAR in operating also prepares a path to the zero level selector magnet coils 142 shown in FIG. 24 in a path from ground (FIG. 25) through the not yet operated make contact of the key 25–FGS and through a diode 25–D–36 and the now closed make contact 25–LAR–10 and winding of the relay 25–FGR to —48 v. D.C. source (FIG. 25).

Upon the operation of the "FIGURES" key 25–FGS, relay 25–FGR will be energized and in closing its contacts will compete the above-described circuit to the control circuit stepper switch 25–CCSS through now closed make contacts 25–FGR–12 and 25–LAR–12. Operation of the "FIGURES" key 25–FGS will also complete a circuit from ground through diode 25–D–36, now closed make contacts 25–LAR–10, diode 25–D–38, terminal TC–23 on FIGS. 24 and 25, and the coils 142 of the "0" magnet shown in FIG. 24, terminal TB–25 (FIGS. 24 and 26) and break contact 26–PU–AUX–II to the —48 v. D.C. source in FIG. 26. This will energize the "0" selector magnet in the perforator. The keyboard is arranged in such a manner that the operation of any one of the keys on the keyboard will also close the keyboard auxiliary contact 24–KEYBD–AUX, and in this instance, since the "FIGURES" key is in the keyboard, the keyboard code reading contacts in FIG. 24 will close the circuit from the 1, 2, 4, and 5 selector magnets to operate these selector magnets. This circuit path extends from ground (FIG. 26) through the now closed contacts 26–22–EAR–7, 26–19–SMR–8, 26–19–EMR–8, 26–COD, terminal MD–51 (FIGS. 24 and 26), now closed keyboard auxiliary contact 24–KEYBD–AUX, the closed keyboard code reading contacts 5, 4, 2, and 1 through the coils 142, terminal TB–25 (FIGS. 24 and 26), now closed break contact 26–PU–AUX–II to the —48 v. D.C. source in FIG. 26. The control circuit stepper switch magnet 25–CCSS will also be operated upon energization of the relay 25–FGR, over the prepared path previously described, upon the closure of make contact 25–FGR–12. The magnet 25–CCSS in being energized will open its interrupter contact 25–CCSS–INTER–1 and step to position 1. The closure of the make contact 25–KEYBD–AUX will complete a circuit from ground (FIG. 26) through the now closed break contacts 26–22–EAR–7, 26–19–SMR–8, 26–19–EMR–8, 26–COD, terminal MD–51 (FIGS. 24 and 26), through the now closed make contact 24–KEYBD–AUX, terminal MD–39 (FIGS. 24 and 26), the resistance R1 associated with magnet 26–PU–MAG and through the winding of the magnet 26–PU–MAG and now closed break contact 26–PU–AUX–II to the —48 v. D.C. source thereby to initiate a cycle of operation of the perforator and due to the setup of the selector magnets in FIG. 24 the "FIGURES" combination will be perforated in the tape 145 together with a perforation in the zero level of the tape.

When the perforator clutch magnets 26–PU–MAG operates and initiates a cycle of rotation of the perforator to close make contacts 25–PU–AUX–I, relay 25–FGR will be held energized in a path from ground (FIG. 25) through make contact 25–PU–AUX–I, make contacts 25–FGR–4, closed make contact 25–LAR–10 to the winding of the relay 25–FGR and thence to —48 v. D.C. source (FIG. 25). As the shaft of the perforator rotates contact 26–PU–AUX–II will be opened to release the selector magnets, in FIG. 24, by breaking the circuit to them through terminal TB–25 shown on both FIGS. 24 and 26. This will also open the circuit to the perforator clutch magnet 26–PU–MAG. Upon continued rotation of the cam sleeve in the perforator contacts 26–PU–AUX–II will be reclosed. The reclosing of contact 26–PU–AUX–II will reclose the energizing circuit for the "0" level selector magnet, shown in FIG. 24 in a circuit from ground (FIG. 25) through the now closed break contact 25–FGS key, ARC–4 of the control circuit stepper switch 25–CCSS in position 1 and through now closed make contact 25–LAR–6 and through diode 25–D–39, terminal TC–23 (FIGS. 25 and 24), the zero magnet coils 142, terminal TB–25 on FIGS. 26 and 24, through the break contact 26–PU–AUX–II to —48 v. D.C. source in FIG. 26. When the cam sleeve in the perforator returns to its normal condition make contact 25–PU–AUX–I will be opened and the holding path for relay 25–FGR will be broken thereby to de-energize relay 25–FGR. When relay 25–FGR is de-energized its break contacts 25–FGR–4 will close to transfer the control of the control circuit stepper switch 25–CCSS to the make contacts 25–PU–AUX–I. Thus, when the next digit key, in the keyboard, is operated to control the perforation, in the tape, of the telephone number of the local area terminal station to which the message is to be addressed, the keyboard code reading contacts shown in FIG. 24 are closed by the operation of the keys in the keyboard, they will first partially close the operating path for the selector magnets in FIG. 24 and upon the closure of the keyboard auxiliary contact 24–KEYBD–AUX as a consequence of the operation of the regular keys in the keyboard the selector magnets will be operated under control of the keyboard code reading contacts. Also, the operation of any digit key in the keyboard, through its consequent operation of make contact 24–KEYBD–AUX, will complete a circuit to energize the perforator control magnet 26–PU–MAG in a circuit from ground in FIG. 26 through the now closed break contacts 26–22–EAR–7, 26–19–SMR–8, 26–19–EMR–8, 26–COD, terminal MD–51 (FIGS. 24 and 26) make contact 24–KEYBD–AUX, terminal MD–39 (FIGS. 24 and 26) through resistor 26–R1 associated with the magnet 26–PU–MAG through break contact 26–PU–AUX–II to the —48 v. D.C. source in FIG. 26. This will initiate a cycle of operation of the perforator. Thus, the perforator will go through a cycle to perforate a code combination representative of the digit key operated in the keyboard plus a "0" level control hole in the tape. The perforator cam sleeve in going through its cycle of rotation will close the make contact 25–PU–AUX–I to complete a circuit from ground (FIG. 25) through the closed make contact 25–PU–AUX–I, now closed break contact 25–FGR–4, closed make contact 25–LAR–4, to the winding of the control circuit stepper switch magnet 25–CCSS and thence to the —48 v. D.C. source in FIG. 25 to energize this magnet. As described in connection with the perforating, in the tape, of the code for "FIGURES," the rotation of the cam sleeve in the perforator mechanism will open contacts 26–PU–AUX–II to release the selector magnets shown in FIG. 24 which had been energized and also to release the perforator clutch magnet 26–PU–MAG and reopen make contact 25–PU–AUX–I. The opening of make contact 25–PU–AUX–I will break the circuit to the control circuit stepper switch magnet 25–CCSS and the brushes or wipers on all of the arcs of the control circuit stepper switch 25–CCSS will then step to position No. 2. When in the cycle of rotation of the perforator, cam shaft break contact 26–PU–AUX–II is again closed the zero selector magnet shown in FIG. 24 will again be operated in the manner described hereinbefore in connection with the perforating in the tape of the code combination for "FIGURES" function.

The circuit operation just described will be repeated when the second digit key in the keyboard of the local area address is operated and when the third digit key of the local area address is operated, the previously described operations will be repeated until the wipers associated with the control circuit magnet 25–CCSS have stepped to the fourth position. The code combinations for the first three digits of the local area address will thus be perforated in the tape with control holes in the "0" level.

Upon the arrival of the movable brushes of the control circuit stepper switch 25–CCSS at their fourth position the wipers in ARC–3 will complete a circuit from ground (FIG. 25) through break contacts 25–FGS–KEY through 25–CCSS–ARC–3, terminal TP–32 (FIGS. 24 and 25), through the coils 142 of the seventh level selector magnet and also from ground (FIG. 25) through the break contact FGS–KEY, 25–CCSS–ARC–4, now closed make contact LAR–6, and the diode 25–D–39 to terminal TC–23. Since all of the coils 142 of the selector magnets 0 to 7 on FIG. 24 are connected terminal TB–25, the zero and seven selector magnets, in FIG. 24, will be energized, the circuit continuing through terminal TB–25 on FIG. 26 and the contacts 26–PU–AUX–II to the —48 v. D.C. source in FIG. 26. The "0" and seventh level selector magnets shown on FIG. 24 will thus be energized to perforate control holes in the tape when the fourth through the tenth digit keys in the keyboard are operated to perforate these control holes together with the Baudot code for the digit key operated in the tape.

Since the stepping of the control circuit stepper switch 25–CCSS had been under control of the make contact 25–PU–AUX–I and the initiation of a cycle of the perforator cam sleeve to control the operation of contact 25–PU–AUX–I had been initiated by starting a cycle of the perforator through the closure of the keyboard auxiliary contact 24–KEYBD–AUX, the stepping of the control circuit stepper switch 25–CCSS was in effect under control of the keys in the keyboard being operated to setup the selector magnets shown in FIG. 24 for the perforation digits of the telephone number. The ten digits of the telephone number having now been perforated in the tape, the operator must operate the letters key in order to control the perforation of the letters for the mnemonic code of the local area addressees to whom the message is to be transmitted. Operation of the "LETTERS" key 25–LTRS will break the locking circuit to the relay 25–LAR which will therefore be released and the code for the "LETTERS" function will be fed to the selector magnets shown in FIG. 24 by the operation of the "LETTERS" key through the closure of the keyboard reading contacts 1 to 5 in FIG. 24. As is true of any other key on the keyboard the operation of the "LETTERS" key will also cause the keyboard auxiliary contact KEYBD–AUX shown in FIG. 24 to cause the "LETTERS" code combination to be perforated in the tape. The release of the relay 25–LAR will extinguish lamp 25–LAR by reopening its make contact 25–LAR–2 and will also open the operating path which had been established from ground through the make contact 25–PU–AUX–I and contacts 25–LAR–4 now reopened to the magnet 25–CCSS. The release of the relay 25–LAR will also reclose its break contact 25–LAR–5. In stepping into its normal or eleventh position under control of its interrupter contacts 25–CCSS–INTER–1, and now closed break contacts 25–LAR–5 the control circuit stepper switch 25–CCSS will reopen its make contacts 25–CCSS–ON and will stop. With the apparatus in this condition each time a key in the keyboard is operated to select a letter of the mnemonic code, the tape will be perforated directly under keyboard control without perforating any control hole in it and the operator will operate the keyboard to put in the seven letters of the mnemonic code of the called local area station followed by the code for the space function.

After a local area address has thus been perforated in the tape, the opeartor may put other local area addresses in the tape or may put in a distant area address either manually or under control of the Codomat. If it is desired to transmit the message to a distant area addressee for whom there is no Codomat card in the Codomat, the operator may operate a key 25–DA to close a circuit from ground in FIG. 26 through now closed break contacts 26–22–EAR–7, 26–19–SMR–8, 26–19–EMR–8, 26–COD, 26–25–DAR–8, 26–25–CDR–8, 26–25–LAR–8, 26–25–PMR–8, terminal MD–9 (FIGS. 26 and 25), through make contact 25–DA of the operated key and the winding of relay 25–DAR to the —48 v. D.C. source in FIG. 25 to energize relay 25–DAR. Operation of relay 25–DAR will complete a circuit from ground (FIG. 25) through make contact 25–DAR–2 to light a lamp 25–DAR, the other side of which lamp is connected to —48 v. D.C. soure in FIG. 25. When the distant area relay 25–DAR is energized, it will lock operate through its own make contacts 25–DAR–7, break contacts of letters key 25–LTRS to ground (FIG. 25). The energization of the relay 25–DAR will also open the operating path to the Codomat magnet 26–COD–MAG by opening its break contact 26–DAR–1. Upon energization the relay 25–DAR will prepare a path to operate the relay 25–FGR by closing its contacts 25–DAR–10 and will also partially close an operating path to the control circuit stepper switch 25–CCSS by closing its contacts 25–DAR–12. Energization of the relay 25–DAR also partially closes operating paths to the "0" level selector magnet and the seven level selector magnets shown in FIG. 24. The path to the zero level selector magnet shown in FIG. 24 will be completed upon the operation of the "FIGURES" key 25–FGS from ground (FIG. 25), through the key 25–FGS and the diode 25–D–36, through make contact 25–DAR–10 and the diode 25–D–38 to terminal TC–23 (FIGS. 24 and 25) then through the windings 142 of the zero selector magnets in FIG. 24 terminal TB–25 (FIGS. 24 and 26) through the break contact 26–PU–AUX–II to the −48 v. D.C. source in FIG. 26.

The "FIGURES" key is operated to initiate the entering into the tape of the code perforations representative of the digits of the station to be called under control of the keyboard. The circuit to the control stepper switch magnet 25–CCSS will also be operated upon operation of the "FIGURES" key in the keyboard due to the closure of make contacts 25–FGR–12 which close when the "FIGURES" key is operated and the relay 25–FGR is operated. The No. 7 magnet in the selector magnet group shown in FIG. 24 will not be energized at this time since the operation of the "FIGURES" key opened its break contact 25–FGS. When the control circuit stepper switch magnet 25–CCSS is operated it will operate its break contact 25–CCSS–INTER–1 and will step its brushes to position 1. The closure of the "FIGURES" key in the keyboard will close the keyboard code reading contacts as shown in FIG. 24 to set up the code combination in them of the "FIGURES" function and they will also close the keyboard auxiliary contact 24–KEYBD–AUX to trip the perforator clutch magnet 26–PU–MAG in the same manner as in the previously described circuit, through terminals MD–51 and MD–39 to initiate the same type of circuit operation as was described under the local area dialing operation under manual control. In the present case the control circuit stepper switch 25–CCSS in the No. 1 position of its wipers will close circuits through 25–CCSS ARC–4 and 25–CCSS ARC–6, now closed make contacts 25–DAR–9 and 25–DAR–6, respectively, to terminals TC–23 and TP–22 (FIGS. 24 and 25) to supply energizing current to the "0," and "7" selector magnets shown in FIG. 24. Thus, the ten digits representing the address of the distant area receiving terminal station may be setup on the keyboard as described in connection with the setting up manually of a local area telephone number but in this instance in addition to the code perforations representative of the digit setup on the keyboard the "0" and "7" level control holes will be perforated in the tape 145.

The mnemonic address of the called party whose telephone number was setup under control of the keyboard may also be perforated in the tape under control of keyboard in the same manner as was described in connection with the perforating of the mnemonic address to the called subscriber or terminal station in connection with the local area dialing operation described hereinbefore. After all of the addresses of this type have been entered in the tape the end-of-address key may be operated as was described in connection with the entering of addresses into the tape under the Codomat control.

*(7) Manual Punching of Pseudomnemonic Code*

In the event that the message from the originating station on the system under discussion herein, is to be transmitted to an airline not on this network but on a private wire network or is to be sent to stations on this network which are also on selective calling networks using message switching rather than line switching, the message must be transmitted to an interchange station which may not be a station having an assigned mnemonic code but simply a station prepared to interchange the message from the line switching system of the present invention to a message switching private line network which uses call direction codes. When this occurs it is necessary to perforate in the tape, not only the telephone address of the interchange station, but also to perforate in the tape something resembling the mnemonic code, which herein is called the pseudomnemonic code, so that assurance may be had that the connection to the called interchange station has been completed. This may be effected by first perforating the tape with the code sequence for the called station's telephone number which may be either a local area or a distant area telephone number and then perforating the tape with the pseudomnemonic code of the called station.

In order to effect this operation the operator after causing the telephone number of the called station to be perforated in the tape, operates a pseudomnemonic key 25–PMN on the keyboard. Closure of the make contact 25–PMN will complete a circuit from ground (FIG. 26) through now closed break contacts 26–22–EAR–7, 26–19–SMR–8, 26–19–EMR–8, 26–COD, 26–25–DAR–8, 26–25–CDR–8, 26–25–LAR–8, 26–25–PMR–8, terminal MD–9 on FIGS. 26 and 25, through the now closed key 25–PMN and winding of relay 25–PMR to −48 v. D.C. source in FIG. 25. This will energize the relay 25–PMR which in closing its contacts 25–PMR–2 will light lamp 25–PMR to indicate to the operator that the operation of putting in the pseudomnemonic code is in progress. Relay 25–PMR on becoming energized will lock operated through its make-contact 25–PMR–7 and ARC–1 of the control circuit stepper switch 25–CCSS in position 11 which is the home position of this stepper switch and then through break contacts of the "LETTERS" key 25–LTRS to ground in FIG. 25. This relay will also energize the control circuit stepper switch magnet 25–CCSS in a path from ground (FIG. 25) through make contact PMR–12, the make contact 25–CCSS–ON and the interrupter contact 25–CCSS–INTER–1 through the magnet 25–CCSS–MAG to the −48 v. D.C. source in FIG. 25. Energization of this magnet 25–CCSS–MAG will open the homing path for the control circuit stepper switch 25–CCSS by opening its break contact 25–PMR–5. Upon operation of the control circuit stepper switch magnet 25–CCSS this magnet will open its interrupter contact 25–CCSS–INTER–1 to cause the control circuit stepper switch to step to its No. 1 position.

With the control circuit stepper switch 25–CCSS in position 1, a circuit will be completed from ground (FIG. 25) through the break contact 25–FGS and ARC–6 of stepper switch 25–CCSS through the now closed make contact 25–PMR–9 to terminal TP–22, which is shown in FIGS. 24 and 25, and is connected to the selector magnet for the seventh level in FIG. 24. With the selector magnet for the seventh level in FIG. 24 thus energized the operation of a character key on the keyboard will not only cause circuit to be completed through the code reading contacts of the keyboard but will also cause the closure of contacts 23–KEYBD–AUX to complete the circuit to the level selector magnets and operate the perforator clutch control magnet 26–PU–MAG thus, to cause a character to be perforated in the tape in the same manner as described hereinbefore in connection with perforation of other characters and also to cause the perforation in the tape 145 of a control hole in the seventh level. As the perforator goes through a perforating cycle it will close its contact 25–PU–AUX–I to complete a circuit from ground (FIG. 25) through the closed make contact 25–PU–AUX–I, now closed break contact 25–FGR–4 and make contact 25–PMR–4 of the pseudomnemonic relay 25–PMR through the winding of the control circuit stepper switch 25–CCSS to −48 v. D.C. source in FIG. 25, thus, causing the stepper switch to step to position 2 when contact 25–PU–AUX–I reopens. The circuit path through the selector magnets shown in FIG. 24 and through the clutch magnet 26–PU–MAG will be broken when contact 26–PU–AUX–II is opened as a consequence of the cycle of operation of the perforator. The reclosing of the break contact 26–PU–AUX–II will reoperate the selector magnet shown in FIG. 24 for the seventh level over the previously described circuit through ARC–6 of control circuit selector switch 25–CCSS in position 2. This operation will be repeated for the next seven keys operated, to cause the perforation in the tape of the code combination representative of the seven letters of the pseudomnemonic code plus a perforation in the seventh level associated with each of the seven characters of the pseudomnemonic code. This will also drive the control circuit stepper switch 25–CCSS around to position 9 at which position the circuit to the relay 25–PMR will be broken at ARC–1 of the control circuit stepper switch 25–CCSS whereupon the control circuit stepper switch 25–CCSS will be stepped back to its eleventh or home position due to the reclosing of break contacts 25–PMR–5 which will complete a circuit from ground (FIG. 25) through now closed break contacts 25–PMR–5, 25–LAR–5, 25–DAR–5, 25–CDR–5, 25–CRR–5, the now closed make contact 25–CCSS–ON and the interrupter contact 25–CCSS–INTER–1 through the winding of the magnet 25–CCSS to –48 v. D.C. source (FIG. 25).

The tape will thus have been perforated with the telephone address and the pseudomnemonic code of the interchange station, such as the interchange to airline X shown in FIG. 1 or the access to selective calling network shown in FIG. 1. If the message is to be sent out over a selective calling network or message switching network such as those illustrated in FIG. 1, the call directing codes of the stations on the network must be perforated in the tape in order to transmit the message to the proper stations on those networks. In order to effect this operation the operator operates the call directing code key 25–CDC in the keyboard. Operation of the call directing code key in the keyboard will close its make contact 25–CDC to energize relay 25–CDR in a manner similar to the manner in which the pseudomnemonic relay 25–PMR was energized and consequently will light the call direction code lamp 25–CDC upon the closure of make contact 25–CDR–2 by the call direction code relay 25–CDR. When relay 25–CDR is operated it will close a circuit to operate call direction code reset relay 25–CRR in a circuit from ground (FIG. 25) through now closed make contact 25–CDR–10, the winding of relay 25–CRR, terminal TB–25 (FIGS. 25 and 26), the now closed break contact 26–PU–AUX–II, to the –48 v. D.C. source in FIG. 26. The call direction code relay 25–CDR upon being energized will lock energized through its make contact 25–CDR–7 and the break contact of the "LETTERS" key 25–LTRS to ground in FIG. 25. The energization of the call directing code relay 25–CDR also opens the homing path to the control circuit stepper switch magnet 25–CCSS–MAG by opening its break contacts 25–CDR–5 and prepares a path to the sixth level selector magnet shown in FIG. 24 in a circuit from ground (FIG. 25) break contact of "FIGURES" key 25–FGS; ARC–5 of control circuit stepper switch 25–CCSS, in position 1, and through make contact 25–CDR–9, terminal TB–21 (FIGS. 24 and 25), "6" level selector magnet coils 142, terminal TB–25 (FIGS. 24 and 26) to –48 v. D.C. source in FIG. 26 through break contact 26–PU–AUX–II. Since the control circuit stepper switch 25–CCSS is now in position 11 which is its home position, this circuit will be prepared but will not be completed until the stepper switch 25–CCSS steps from its normal or 11 position to its No. 1 position. When relay 25–CDR was energized it also completed a path through its make contact 25–CDR–12 from ground through the now closed contact 25–CDR–12, break contacts of the off-normal switch 25–CCSS–ON and the interrupter contact 25–CCSS–INTER–1 to energize magnet 25–CCSS. When the magnet of the control circuit stepper switch 25–CCSS operates it will open its break contact 25–CCSS–INTER–1 and will step the stepper switch to the No. 1 position. When relay 25–CRR is operated it will lock operated over its own contacts 25–CRR–2 from ground FIG. 25 through contacts 25–CRR–2 the winding of the relay 25–CRR, terminal TB–25 (FIGS. 25 and 26) and the break contact 26–PU–AUX–II to the –48 v. D.C. source (FIG. 26). The locking circuit for the relay 25–CRR will remain closed until near the extreme end of the cycle of the perforator when the break contact 26–PU–AUX–II opens to insure that the path from ground (FIG. 25) through the break contact of the "FIGURES" key 25–FGS, ARC–5 of control circuit stepper switch 25–CCSS in position 1, through the make contact 25–CRR–8, to terminal TB–21 is maintained, even if the "LETTERS" key 25–LTRS is operated at the end of any call direction codes which may be entered into the tape, thus to insure that the sixth level of the tape will be perforated in the code sequence for the call direction codes. The keys in the keyboard, for the characters of the call direction code sequences, may now be operated to keyboard into the perforator the addresses in call direction code form, of those stations on the message switching systems or networks to whom it is desired to transmit the message. As soon as the control circuit stepper switch 25–CCSS moves off of its normal or home position the operating circuit to it through 25–CDR–12 will be broken at the off-normal switch 25–CCSS–ON–3 and the stepping of the control circuit stepper switch 25–CCSS will thus be controlled through the auxiliary contact 25–PU–AUX–I, now closed break contact 25–FGR–4, now closed make contact 25–CDR–4, magnet 25–CCSS–MAG to the –48 v. D.C. source in FIG. 25 thereby to transfer the control of the control circuit stepper 25–CCSS to the auxiliary contact 25–PU–AUX–I in the perforator in the same manner that the contact 25–PU–AUX–I controlled the stepper switch 25–CCSS under local address or distant address control. The perforating in the tape of the call direction code combinations together with a perforation in the sixth level will be continued as long as the keys on the keyboard are operated and since this code sequence is terminated by the operation of the "LETTERS" key and the consequent perforation in the tape of the "LETTERS" combination the operator will, after all of the characters of the call direction code have been perforated in the tape, operate the "LETTERS" key. Operation of the "LETTERS" key 25–LTRS will break the locking circuit to relay 25–CDR in the same manner that it broke the locking circuit to the relays 25–LAR and 25–DAR by opening the break contact 25–LTRS. Since the relay 25–CRR does not have its circuit broken immediately upon the operation of the "LETTERS" key but rather has its holding circuit broken when the auxiliary contact in the perforator 26–PU–AUX–II opens, the "LETTERS" code plus the sixth level control hole will be perforated in the tape. The release of relay 25–CRR and relay CDR due to the operation of the Letters key 25–LTRS will restore the homing circuit for the control circuit stepper switch magnet 25–CCSS which will step to its home position over the circuit from ground (FIG. 25) through break contacts 25–PMR–5, 25–LAR–5, 25–DAR–5, 25–CDR–5 and 25–CRR–5 all of which will be closed at this time, and through make contact 25–CCSS–ON–1 and then through the interrupter switch 25–CCSS–INTER–1 which will be opened and closed repeatedly by the magnet 25–CCSS until the off normal contact 25–CCSS–ON–1 make contact is opened by the return of the stepper switch to its normal or No. 11 position.

TAPE PREPARATION SUMMARY

From the foregoing, it is believed to be apparent that the perforator under control of the tape preparation circuits just described will function to prepare a message tape of proper format for use in the transmission of messages over an automatic line switching system. This tape preparation operation will, as described specifically hereinbefore cause the perforator to feed out sufficient length of tape to bridge the feed wheels in the transmitter or reader and thereupon the operator in operating the start-of-message key 19–SOM will cause the code sequence representative of start-of-message code to be perforated in the tape, that is, the code for "LETTERS," "CARRIAGE RETURN," "LINE FEED," "LETTERS," together with appropriate control holes for controlling the message processing portion of the transmitting apparatus.

After entering the start-of-message code sequence into the tape, the operator either manually keyboards, into the tape, the address to which the message is to be transmitted or operates the Codomat for the automatic insertion in the tape of the address or addresses to which the message is to be transmitted. These addresses will consist of the code for "Figures" ten digits "LETTERS" and the mnemonic code of the addressed stations with the appropriate control code holes which are inserted automatically under control of the keyboard circuitry or to the Codomat card. In the event that the message is to be addressed to a network not of the line switching type or to a broadcast network, a pseudo-mnemonic code will be substituted for the regular mnemonics and will be followed by one or several broadcast addresses composed of call direction code sequences which are a series of letters and a mnemonic. If a message is to be directed to a plurality of terminal stations, the addresses of the stations to which the message is to be transmitted, may be perforated in the tape successively and thereafter the end-of-address key 22–EOA may be operated to cause the automatic punching in the tape of proper control code levels and the code sequence for the end-of-address code which is "CARRIAGE RETURN," "LINE FEED," "FIGURES," "M," "LETTERS," the time of day and the mnemonic code of the originating station. After having entered this end-of-address code sequence into the tape, the operator will keyboard into the tape the text of the message under a normal keyboarding operation. Each text will have the code for "CARRIAGE RETURN" and "LINE FEED" as its first two characters. After the operator has thus, in operating the apparatus described hereinbefore, prepared the tape with the text in it, the operator may operate the end-of-message key 19–EOM to cause control circuitry to control the perforator and effect the punching in the tape of the end-of-message code sequence which is: "CARRIAGE RETURN," "LINE FEED," "FIGURES," "V," "LETTERS," "CARRIAGE RETURN," six "LINE FEEDS," and four "N's" with appropriate control code holes. The tape may then be fed to the message processing portion of the apparatus which operates under control of the circuitry now to be described.

MESSAGE PROCESSING

(1) Start-of-Message Processing Operation

Figure 11:
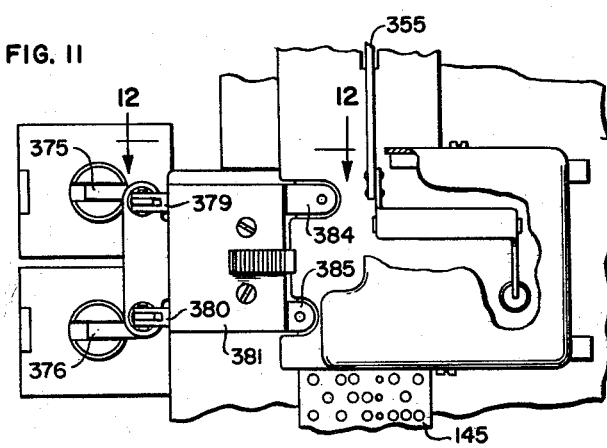
FIG. 11 is a fragmentary plan view looking in the direction of the arrows along the line 11—11 on FIGS. 9 and 10.
Figure 12:
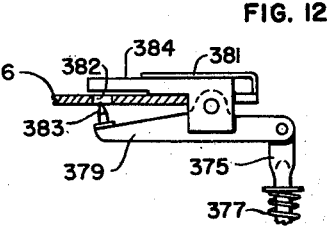
FIG. 12 is a fragmentary sectional view taken along the line 12—12 of FIG. 11 in the direction of the arrows.
Figure 32:

The leader of tape which has been fed out of the perforator, as described in connection with the feed-out operation, is placed under the tape lid 260 (FIG. 9) and also under the die extensions 384 and 385 (FIG. 11). A transmitter control switch 27–TRANS–SW is now manually set in position 1, which is the position for normal operation of the message processing apparatus. With the tape thus positioned in the apparatus, the stop-run switch 262 (FIG. 18) is moved to the run position thereby to close the contact pair 263 which constitutes the stop-run-tight-tape switch 32–SRTTS. Closure of this circuit will complete a path from ground (FIG. 32) through the closed make contact of switch 32–SRTTS through the winding of relay 32–SRR to —48 v. D.C. source (FIG. 32). Upon the energization of relay 32–SRR a circuit will be completed to initiate a cycle of operation of the reader by energizing the reader clutch magnet 27–RCM in a path from ground (FIG. 27) through the now closed break contacts 27–33–P07R1–8, now closed make contact 27–32–SRR–12, the interrupter contact of a lower notch stepper switch 27–37–LNSS–INT, now closed break contacts 27–48–TOTR–9 of a torn tape relay, the now closed break contacts of permutative relays 27–36–P06R–5, 27–33–P67R–5, 27–45–P3R–5, 27–33–P7R–8, 27–33–P07R2–5, now closed break contacts of recognition relay 27–28–R8B–2, intercept distributor relay contacts 27–36–IDSR–7, intercept transfer relay A contacts 27–36–ITRA–5, circuit assurance relay contacts 27–38–CAR–4 reset relay 27–50–RES–6, sending alarm relay A contacts 27–50–SALA–7 and sending alarm relay B contacts 27–50–SALB–5, pull forward relay contacts 27–42–PFR–4, intercept transfer relay A contacts 27–36–1TRA–4, contacts 27 through PSR–10 in the receiving set which are opened whenever the printer at the originating station is receiving a message from another originating station, the winding of the reader clutch magnet 27–RCM to the —48 v. D.C. source in FIG. 27. Upon being energized the reader clutch magnet 27–RCM will cause the reader to go through successive cycles to feed out a length of tape until the reader, in going through successive cycles, reads the control hole in the seventh level of the tape at the beginning of the start-of-message code sequence.

As soon as the number seven level control hole is sensed, the recognition relay for the seventh hole 28–R7 will be energized over a path from ground (FIG. 28) through terminal MD–147 (FIGS. 28 and 35) through the closed reader contact 7, terminal MD–188 (FIGS. 35 and 28), through the windings of the recognition relay for the seventh hole 28–R7 to —48 v. D.C. source (FIG. 28). Simultaneously with the energization of relay 28–R7, relay 28–LUR, which serves as a line un-blinding relay, will be energized in a path from the terminal MD–188 through diode D–14 and winding of the relay 28–LUR to —48 v. D.C. source in FIG. 28. When relay 28–R7 is energized it will release a relay 33–PNR which is a relay that recognizes the absence of any control holes of the tape and which has been energized in a circuit from ground at FIG. 33 through contacts 33–50–RES–7 which are break contacts of a reset relay 50–RES and through the closed break contact 33–27–AUX–B, diode D–17, closed break contact of recognition relay for the zero hole 33–28–R0–6, closed contacts 33–28–R6–10, through the winding of the relay 33–PNR to —48 v. D.C. source in FIG. 33. This permutation none relay 33–PNR had been energized and was locked energized over its own contacts 33–PNR–3 and the break contacts of recognition relays 33–28–R8A–8, 33–28–R0–8, 33–28–R7–7, and 33–28–R6–7. The energization of relay 28–R7 will thus open its contacts 33–28–R7–7 to break the circuit to the permutation none relay 33–PNR. When the line un-blinding relay 28–LUR is energized it will close its contacts 37–28–LUR–3 to shunt the line un-blinding relay B–37–LURB.

Figure 30:
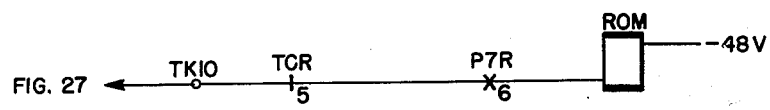
Figure 31:
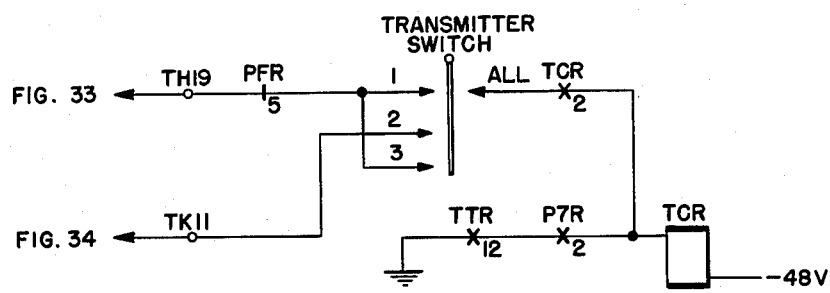
Figure 33:
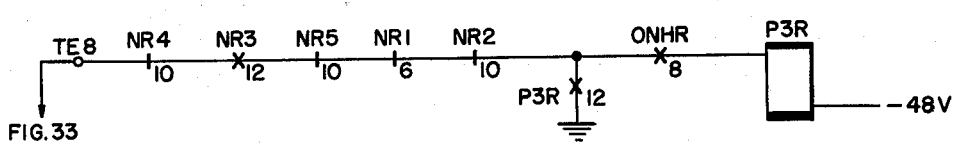

As the reader returns to its normal position at the end of its cycle, it closes its contacts 33–AUXB to complete a path for the energization of permutation relay 7–33–P7R in a circuit from ground (FIG. 33) through now closed break contact 33–50–RES–7, reader contacts 33–AUX–B, diode D–17, now closed contacts 33–28–R7–4, break contacts 33–28–R0–4, break contact 33–28–R6–6 and through the winding of relay 33–P7R to —48 v. D.C. source in FIG. 33. As soon as permutation relay 33–P7R is energized it will lock energized in a path from ground (FIG. 33) through reset relay break contacts 33–50–RES–7, break contacts of the pull back and permutation relays 33–42–PBRB–10, 33–P07R1–4, 33–P0R–4. 33–P67R–4, 33–P068R–10, and its own locking contact 33–P7R–10 now closed, through the winding of the relay 33–P7R to —48 v. D.C. source (FIG. 33). The operation of relay 33–P7R will opens its break contacts 27–33–P7R–8 thus to open the previously established energizing path for the reader clutch magnet 27–RCM. The energization of the permutation relay 33–P7R will close a circuit through its make contacts 30–33–P7R–6 to energize the run-out magnet 30–ROM in a path from ground (FIG. 27) through now closed break contacts 27–33–P07R1–8, the now closed make contacts 27–32–SRR–12, 27–37–LNSS–INT, break contacts of torn tape relay 27–48–TOTR–9, diode D–10, terminal TK–10 (FIGS. 30 and 27) through now closed break contact 27–31–TCR–5 of a tape clamp relay and now closed contact 30–33–P7R–6 through the winding of the run-out magnet 30–ROM to the −48 v. D.C. source (FIG. 30).

(2) *Tape Pull Forward Operation*

From the foregoing it is believed to be apparent that, through the circuitry just described, the run-out magnet 30–ROM will be energized to pull the tape forward at the start of message sequence when the seventh control hole in tape is sensed and the tape will be pulled forward until it becomes taut between the reader feed wheel 251 and the pull forward feed wheel 252 (FIGS. 13). This will cause the closing of the tight tape contact 40–TTS to energize the tight tape relay 40–TTR from ground through the switch 40–TTS and winding of winding of relay 40–TTR to the −48 v. D.C. source in FIG. 40. When relay 40–TTR is thus operated with the permutation relay 33–P7R operated, a circuit will be completed from ground FIG. 31 through now closed make contacts 31–40–TTR–12 and 31–33–P7R–2 through the winding of relay 31–TCR to −48 v. D.C. source in FIG. 31 to operate tape clamp relay 31–TCR which will lock through its own contacts 31–TCR–2 and the transmitter switch in normal or No. 1 position and the now closed break contacts of the pull forward relay 31–42–PFR–5, terminal TH–19 in FIGS. 31 and 33 and break contacts 33–50–RES–7 which are now closed, to ground (FIG. 33).

When the tape clamp relay 31–TCR is energized, it will complete a circuit to operate the reader clutch magnet 27–RCM from ground in FIG. 27 over the same path as was described in connection with the establishment of the original circuit to the reader clutch magnet 27–RCM that was opened upon the energization of relay 33–P7R since the contacts 27–31–TCR–10 bridge the now opened contacts 27–33–P7R–8. This will cause the reader clutch magnet 27–RCM to be energized to initiate a reading cycle of the reader. The energization of the tape clamp relay 31–TCR will also break the circuit to the run-out magnet 30–ROM by opening its break contacts 30–31–TCR–5. As was described in connection with mechanical features of the present application, the release of magnet ROM will clamp the tape at the run-out a pull forward tape feed wheel 252 (FIG. 13).

(3) *Dialing Operation*

With the reader clutch magnet 27–RCM held energized, the reader will go through repeated cycles of operation, without transmitting any of the information perforated in the tape as the start-of-message code format, until the reader detects the presence of a perforation in the "0" level of the tape. As the reader goes through its repeated cycle, its auxiliary contacts 37–AUX–A and 33–AUX–B are operated on every revolution of the reader shaft. As soon as the reader feeds the tape forward one step the tight-tape switch 40–TTS will re-open to de-energize the relay 40–TTR. On the first sensing cycle of the reader, the absence of the perforation at the seventh level will prevent the re-energization of relays 28–R7 and 28–LUR since the reader contact 7 in FIG. 35 will not be closed. As soon as the tape has advanced far enough for the first digit of the direct distance dialing number, as enclosed in the bracket B on FIG. 2 to reach a point where the sensing pins in the reader detect the presence of a perforation in the zero control holes, which precedes the start of the direct distance dialing numbers and is aligned with the "FIGURES" code, a circuit will be completed from ground in FIG. 27 through the now closed break contact of the manual resend key 27–MR terminal MD–146 on FIGS. 27 and 35 through the closed reader contact for "0," terminal MD–190 on FIGS. 28 and 35 through the winding of recognition relay for the "0" hole 28–RO, to the −48 v. D.C. source in FIG. 28. The circuit will also be completed from the terminal MD–190 through diode 28–D–13 and winding of relay 28–LUR to the −48 v. D.C. source in FIG. 28 thereby simultaneously to pull up the relays 28–RO and 28–LUR. Relay 28–RO in operating will open its break contacts 33–28–R0–8 to release the permutation none relay 33–PNR. When the reader, in its cycle of operation wherein it senses the "FIGURES" code plus the "0" control hole in the tape, arrives at the point where it closes its contacts 33–AUX–B a circuit will be completed from ground in FIG. 33 through now closed break contact 33–50–RES–7, now closed contact 33–AUX–B, diode 33–D–17 now closed break contacts 33–28–R7–4, now closed make contact 33–28–R0–6, now closed break contacts 33–28–R6–8, diode 33–D–23, now closed break contact 33–P068R–5 the winding of the relay 33–P0R to −48 v. D.C. source in FIG. 33. A circuit will also be completed over the path through the now closed break contacts 33–P068R–5 and through diode 33–D–27, and now closed break contacts 33–36–ITRB–5 of the intercept transfer relay B; and through the winding of the line shunt relay 33–LSR to −48 v. D.C. source (FIG. 33) thus to energize the relay 33–LSR simultaneously with the relay 33–P0R. The energization of relay 33–P0R will also break the locking path to the relay 33–P7R by opening its break contacts 33–P0R–4. When the relay 33–P0R is energized it will lock up through its own contact in a path from ground in FIG. 33 through break contacts 33–50–RES–7, now closed break contact 33–42–PBRB–10, diode 33–D–24, now closed break contact 33–P07R2–7 now closed make contact 33–P0R–6, now closed break contact 33–P068R–5 through the winding of the relay 33–P0R to the −48 v. D.C. source in FIG. 33. This locking path for the relay 33–P0R will also maintain the relay 33–LSR energized. On this cycle of operation of the reader, the closure of the reader contacts 37–AUX–A will complete a circuit from ground (FIG. 37) through the closed make contacts 37–AUX–A, now closed break contacts 37–36–ITRB–6, now closed make contacts 37–33–P0R–12, diode 37–D–33, now closed break contact 37–33–P068R–8, now closed break contact 37–40–UNMR–10, through the winding of the lower notch stepper switch magnet 37–LNSS to −48 v. D.C. source in FIG. 37. The closure of the auxiliary contact 37–AUX–A will also complete a circuit from ground (FIG. 37) through the closed auxiliary contact 37–AUX–A now closed break contact 37–36–ITRB–6 now closed make contact 37–33–LSR–4, diode 37–D–34 and through the winding of the magnet 37–LBR to −48 v. D.C. source in FIG. 37. When at a later time in the cycle of the reader the contact 37–AUX–A re-opens, the lower notch stepping switch 37–LNSS will be released and will step its wipers from the normal of "11" position to position 1. The operation of relay 37–LBR, which is the line blinding relay, in cooperation with the previously energized line unblinding relay 37–LUR, will close a path to shunt the distributor contacts shown in FIG. 35 by closing their make contact 35–37–LBR–12 and 35–37–LUR–8 to prevent the feeding to the sending line relay 35–SLR, of signals which may be read by the reader contacts in FIG. 35 during the time that the digits of the direct distance dialing number are being fed into the subscriber subset forming part of the telephone equipment which completes the connection through the No. 5 crossbar exchanges to the called stations.

The circuit operations just described have all taken place during the cycle of operation of the reader when the reader detected the presence in the tape of the "FIG- URES" code plus a perforation in the "0" level of the tape. The circuit to the reader clutch magnet 27–RCM, however, has not been broken and the reader will thus go through another cycle, at which time it will sense the first digit of the direct distance dialing number that, in the example of the tape shown in FIG. 2, is the digit 2 plus the "0" and seventh level perforations. When the reader senses this code combination, the relay 28–R0 will have remained locked up from the previous sensing of the "0" control hole in connection with the "FIG-URES" shift code which preceded the first digit of the direct distance dialing number. When the reader is in its stop position, that is, at the end of its cycle, its auxiliary contact 33–AUXB will be closed and consequently, when the sensing pins on the cycle of the reader wherein the reader is reading the first digit of the direct distance dialing number, sense the tape and find in the tape perforations in the "0" and seventh levels and will cause the relay 28–R0 to remain energized and will cause the energization of relay 28–R7. The circuit for energizing the relays 28–R0 and 28–R7 under control of the transmitter reader sensing contacts will be the same as described hereinbefore.

With the relays 28–R0 and 28–R7 energized, a circuit will be completed from ground in FIG. 33 through the now closed make contact 33–AUX–B, diode 33–D–7, now closed make contacts 33–28–R7–4, through the now closed make contact 33–28–R0–4, now closed break contact 33–28–R6–4 and through now closed break contact 33–P068R–6 to the winding of relay 33–P07R2 to the –48 v. D.C. source in FIG. 33. A branch circuit is also established from the now closed break contact 33–28–R6–4 and now closed make contact 33–28–R7–2 and now closed break contact 33–P068R–4 through the winding of relay 33–P07R1 and to the –48 v. D.C. source (FIG. 33). This will cause the energization of the permutation relays 33–P07R2 and 33–P07R1. Relay 33–P07R2 will then lock up in a path from ground (FIG. 33) through now closed break contact 33–50–RES–7, now closed break contact 33–38–ABR–1, diode 33–D–19, now closed break contact 33–48–TORA–7, now closed make contact 33–P07R2–2, now closed break contact 33–P068R–6 and the winding of the relay 33–P07R2 to the –48 v. D.C. source in FIG. 33. Similarly a locking path will be established for the permutation relay 33–P07R1 in a path from ground (FIG. 33) through now closed break contact 33–50–RES–7, now closed make contact 33–28–LUR–9, now closed break contact 33–36–ITRA–11, now closed make contact 33–P07R1–2, now closed break contact 33–P068R–4, the winding of relay 33–P07R1 to –48 v. D.C. source (FIG. 33).

Figure 34:
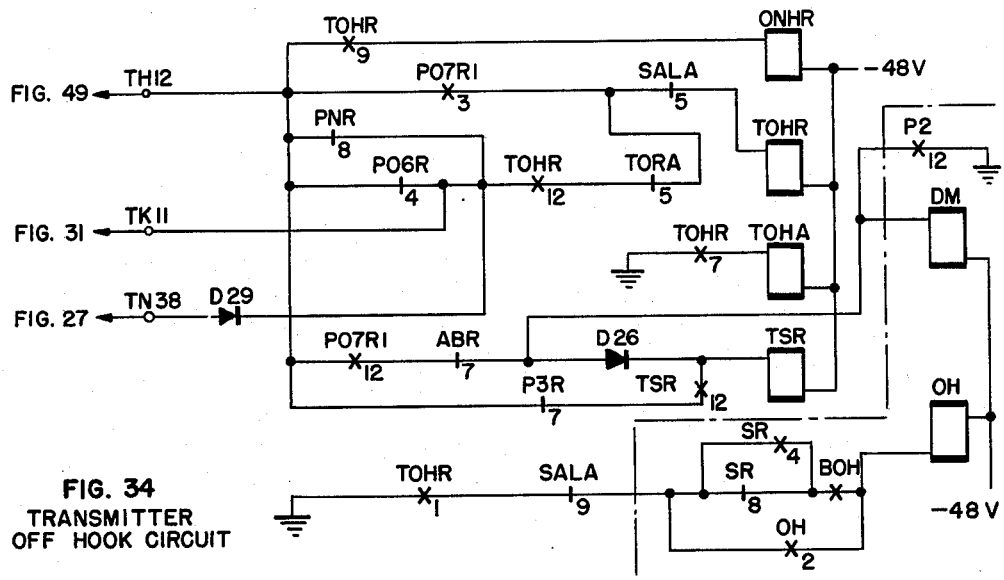
Figure 49:
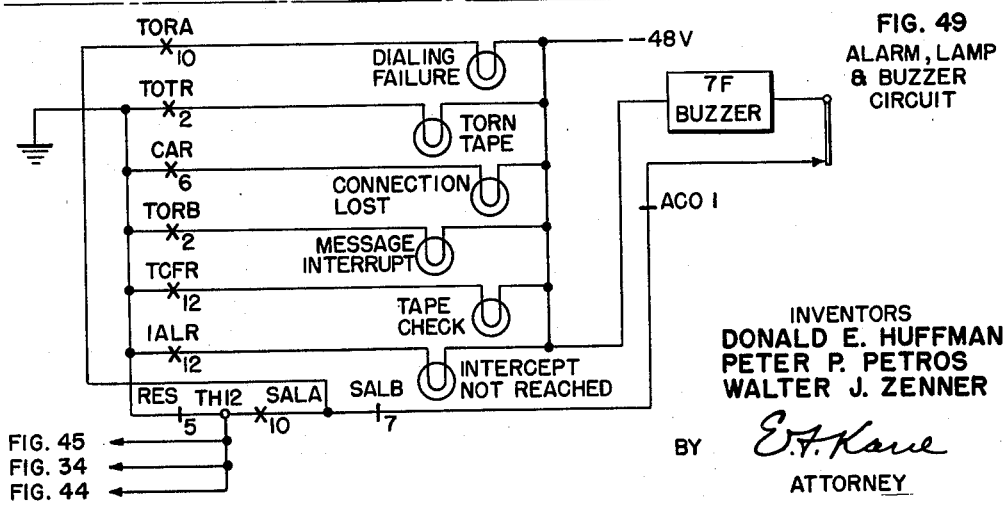

The energization of relay 33–P07R1 will cause the energization of the transfer shift relay 34–TSR in a circuit path from ground (FIG. 49), the now closed break contact 49–50–RES–5 terminal TH–12 on FIGS. 49 and 34, through closed make contacts 34–33–P07R1–12, now closed break contacts 34–38–ABR–7, diode 34–D–26, winding of relay 34–TSR to the –48 v. D.C. source in FIG. 34. This circuit extending from terminal TH–12 in FIG. 34 will also be closed by the energization of relay 33–P07R1 in closing its make contacts 34–33–P07R1–3 through the now closed contacts 34–50–SALA–5 of sending alarm relay A, and through the winding of relay 34–TOHR to –48 v. D.C. source (FIG. 34). When relay 34–TOHR is energized it will lock operated in a path from ground (FIG. 49) closed break contacts 49–50–RES–5, terminal TH–12 on FIGS. 34 and 49, now closed break contacts 34–33–PNR–8, make contacts 34–TOHR–12, break contacts 34–48–TORA–5, break contacts 34–50–SALA–5, winding of relay 34–TOHR to –48 v. D.C. source in FIG. 34.

Upon being energized the relay P07R1 will also complete an operating path for the energization of the unsent direct distance dialing number relay 44–UDR in a circuit path from ground in FIG. 44 through the now closed break contact 44–45–STC–1, now closed break contact 44–33–P068R–7, now closed make contact 44–33–P07R1–1, through the winding of the relay 44–UDR to –48 v. D.C. source in FIG. 44. The previously described energizing circuit for the reader clutch magnet 27–RCM to ground in FIG. 27 will be broken by the energization of relay 33–P07R1 in operating its transfer contacts 27–33–P07R1–8 to open the break contacts and close the make contacts of this set of transfer contacts. By closing make contact 27–33–P07R1–8 the reader clutch magnet 27–RCM will be placed under control of the subscribers set shown enclosed in dotted lines in FIG. 27. Therefore, the next pulse to operate the reader clutch magnet 27–RCM must come from the subscribers set which will respond upon receiving a digit of the address code of the called telephone subscriber, to energize the reader clutch magnet 27–RCM and call for the next digit to be read by the reader.

The operation of relay 33–P07R2 will open the holding path which had been established to permutation "0" relay 33–P0R by opening its break contacts 33–P07R2–7. The operation of relay 34–TSR as a consequence of the operation of relay 33–P07R1, will lock relay 34–TSR operated in a path from ground (FIG. 49) through the now closed break contact 49–50–RES–5, terminal TH–12 on FIGS. 49 and 34 and then through now closed break contact 34–53–P3R–7 of the permutation relay, make contacts of 34–TSR–12 and the winding of relay 34–TSR to –48 v. D.C. source in FIG. 34. The energization of this relay 34–TSR will place a series of numbering relays 35–NR–1 to 35–NR–5, shown on FIG. 35, under control of the reader contacts 1 to 5, respectively, also shown on FIG. 35. Consequently, the sensing of the tape by the reader will connect ground (FIG. 35) through any of the reader contacts 1, 2, 3, 4 or 5 that are closed by their associated sensing pins, then through make contacts 35–34–TSR–4, 35–34–TSR–6, 35–34–TSR–8, 35–34–TSR–10, 35–34–TSR–2, to the windings of the relays in 35–NR1, 35–NR2, 35–NR3, 35–NR4, 35–NR5, respectively, the other side of the windings of all these relays being connected to the –48 v. D.C. source in FIG. 35.

Figure 53:
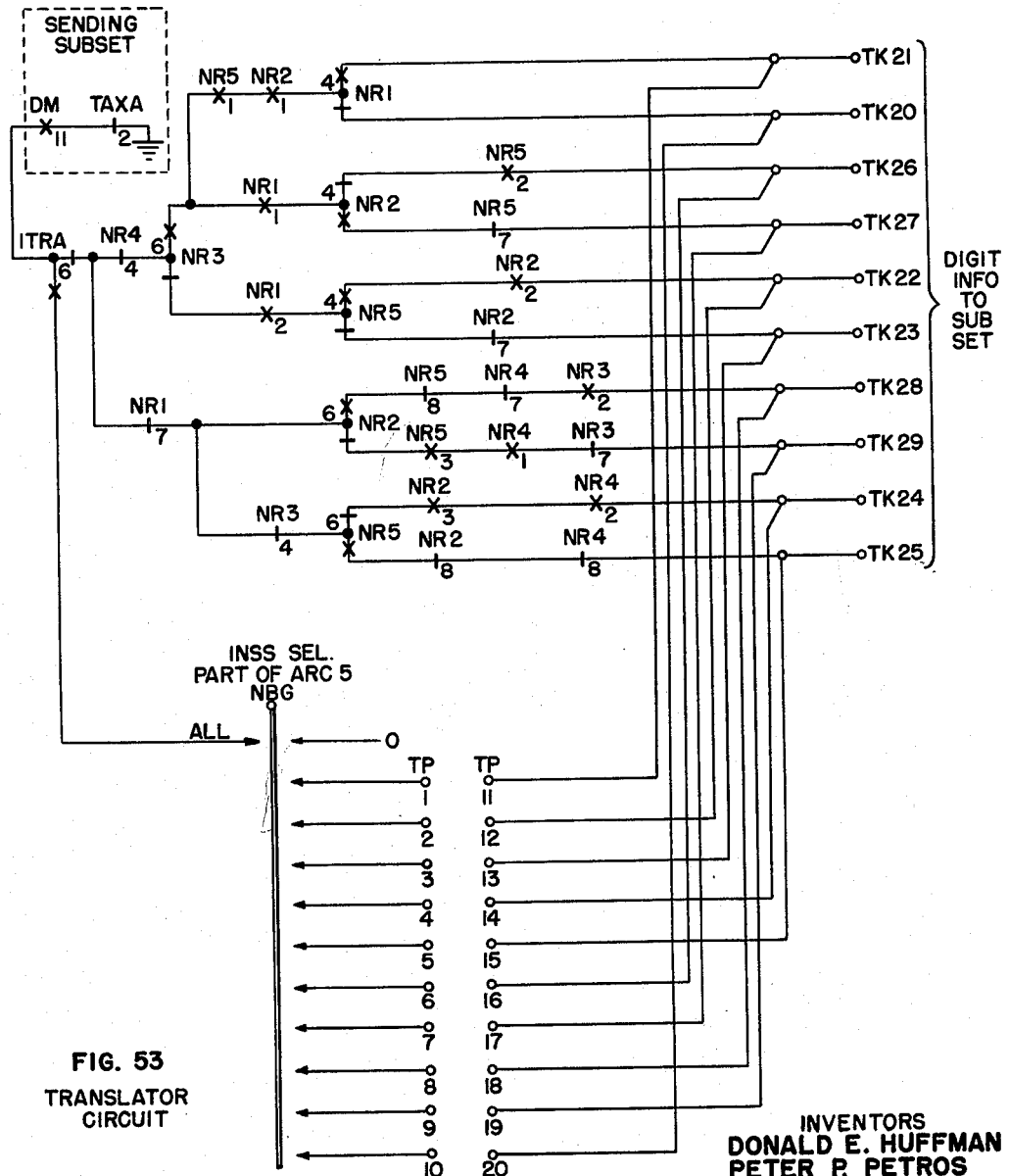

By reference to FIG. 53 it will be seen that the permutative operation of the relays 35–NR1 to 35–NR5 will translate a digit as represented by code perforations in the tape 145, into any one of ten separate leads representative of the digits 1–9 and 0. For example, as illustrated in FIG. 2 the first digit of the direct distance dialing number to be transmitted by the reader to the subscriber set is the digit 2 which in the Baudot code is "marking" in the 1, 2 and 5 levels. Consequently, the reader in reading the Baudot code for the digit 2 in the tape will cause the energization of relays 35–NR1, 35–NR2 and 35–NR5. These three relays will thus close their make contacts 53–35–NR1–2, 53–35–NR5–4 and 53–35–NR2–2 to complete a circuit from ground through break contacts 53–TAXA–2 and make contacts 53–DM–11 in the subscribers set, through now closed break contacts 53–36–1TRA–6, 53–35–NR4–4, 53–35–NR3–6 make contact 53–35–NR1–2, 53–35–NR5–4 and 53–35–NR2–2 to energize a single lead representative of the digit 2 leading to the subset thereby to cause the subscribers set to, in effect, dial the digit 2. The source of ground in the subscribers set cannot reach any other of the digital leads 1, 3 to 9 and 0 leading to the subset since as may be best seen in FIG. 53, the leads to the digits 1, 0, 6 and 7 are open at the now open make contact 53–35–NR3–6, the lead to the three digit is broken at now open break contact 53–35–NR5–4 and the leads to the digits 8, 9, 4 and 5 is broken at the now open break contact 53–35–NR1–7.

When relay 34–TOHR became energized due to the energization of relay 33–P07R1, as described hereinbefore, it closed a circuit to energize transmitter off hook relay 34–TOHA, in a path from ground (FIG. 34) through now closed make contact 34–TOHR–7 through the winding of relay 34–TOHA to the –48 v. D.C.

source (FIG. 34) and it also completed a circuit to energize the on-hook relay 34–ONHR in a circuit from ground (FIG. 49) through break contact 49–50–RES, terminal TH–12 in FIGS. 49 and 34 and the now closed contacts 34–TOHR–9 and through the winding of the relay 34–ONHR to the −48 v. D.C. source in FIG. 34. The relay 34–TOHR also closes a path from ground (FIG. 34) through its now closed make contact 34–TOHR–1 to break contact 34–50–SALA–9 of the sending alarm relay A and through a now closed break contact 34–SR8 in the subscriber set and the now closed contact 34–BOH also in the subscriber set to an off-hook relay 34–OH in the subscriber set to −48 v. D.C. source in the subscriber set as shown in FIG. 34.

With the apparatus in the condition just described, it stimulates the condition of a telephone apparatus when the receiver is lifted since in addition to the circuits operated under control relay 33–P07R1 and described hereinbefore an additional circuit was completed from terminal TH–12 on FIG. 34 through a now closed make contact 34–33–P07R1–12 now closed break contact 34–38–ABR–7 to a relay 34–DM in the subscriber set of the telephone apparatus to cause the telephone apparatus to go into dial mode. The energization of the off-hook relay 34–OH in the subscribers set conditions the set to receive the digits of the direct distance dialing number and particularly the first digit, which is still set up on the sensing pins of the reader and their associated contacts and through the numbering relay contacts NR1 through NR5 to the leads extending into the subscriber set of the telephone apparatus. Thus the subscribers set after going into dial mode upon energization of relays 34–DM is ready to receive the first digit of the called terminal station's direct distance dialing number (DDD). The subscriber set is arranged in such a manner that after receiving the first digit and succeeding digits of the direct distance dialing number, in the manner described hereinbefore in connection with the first digit, it will transmit a pulse through diode 27–D–11 and the now closed make contacts of transfer pair 27–33–P07R1–8 to the reader clutch magnet momentarily to pulse the reader clutch magnet 27–RCM thereby to initiate another cycle of the reader clutch magnet 27–RCM.

The reader clutch magnet 27–RCM will be maintained under control of the subscriber set until all of the digits are transmitted from the reader to the subset. Thus this operation will continue until the reader senses the letters code in the tape at the end of the direct distance dialing number with no control holes in the tape. As the last digit of the direct distance dialing number is thus transmitted from the reader to the subscribers set, a No. 8 hole will be perforated in the edge of the tape in line with the "FIGURES" code perforation which preceded the direct distance dialing number. As previously pointed out, the stepper switch 37–LNSS had been stepped to position 1 and this stepper switch will be advanced one step for each digit that is transmitted from the reader to the subscriber set, in a circuit from ground (FIG. 37) through make contact 37–AUX–A in the reader, which closes once in each cycle of the reader, now closed break contact 37–36–ITRB–6 now closed make contact 37–33–P07R1–9 diode 37–D–33, now closed break contact 37–33–P068R–8 and 37–40–UNMR–10 through the winding of the magnet 37–LNSS to −48 v. D.C. source (FIG. 37). This magnet 37–LNSS will thus be energized and de-energized once in each cycle of the reader until the reader senses the letters code in the tape with no control holes, at which time the stepper switch 37–LNSS will have stepped to its tenth position. The next time contact 37–AUX–A closes, a circuit will be completed through it and through now closed break contact 37–36–ITRB–6, the wiper of stepper switch 37–LNSS–ARC–1, in the tenth position, thence through make contact 37–33–P07R1–6 and break contact 37–45–STC–8 to operate the lower notch magnet 37–LNM. Operation of magnet 37–LNM (also shown on FIG. 9) will cause the piercing pin 383 (FIG. 12) to pierce the No. 8 level of the tape thereby to indicate that an attempt has been made to make a connection through the telephone switching system to the subscriber or terminating station whose address, in the form of the direct distance dialing number, has been read from the tape. This perforation by the piercing pin will be in line with the "FIGURES" code perforated in the tape preceding the first digit of the direct distance dialing number due to the spacing between the feed wheel 251 and the piercing pin 383.

*(4) Answer Back Received*

When the tape is stepped forward, after reading the last digit of the direct distance dialing number, the sensing pins 284 will sense the "LETTERS" code, with no control perforations in the "0," six, seven or eight positions. Thus, on this cycle of the reader no circuit will be made by reader contacts 0, 6, 7 and 8 and the recognition relays 28–R0 and 28–R7 will not be energized. The failure of any one of these contacts, in the reader, to be closed will also result in relay 28–LUR not operating since it was pulled up in parallel with relays 28–R0 and 28–R7. When relay LUR is thus not operated its make contact 33–28–LUR–9 will be open to break the holding path to relay 33–P07R1. Relay 37–LBR will also be released upon the de-energization of relay 28–LUR due to the opening of the locking path to the relay 37–LBR at make contact 37–28–LUR–4. In addition, the shunt around the distributor contacts shown on FIG. 35 will be removed by opening the make contacts 35–28–LUR–8. When relay 28–LUR is not operated the shunt around relay 37–LURB will be opened by opening make contact 37–28–LUR–3. On this cycle of the reader, when its auxiliary contact 33–AUX–B re-closes, a circuit will be completed from ground (FIG. 33) through break contact 33–50–RES–7, the now closed contact 33–AUX–B, diode 33–D–17, now closed break contacts 33–28–R7–4, 33–28–R0–6 and 33–28–R6–10 and through the winding of relay 33–PNR to the −48 v. D.C. source in FIG. 33 to energize the permutation none relay 33–PNR. When relay 33–PNR is energized it will lock operated through its make contact 33–PNR–3 to complete a circuit from ground in FIG. 33 through the recognition relays break contacts 33–28–R6–7, 33–28–R7–7, 33–28–R0–8, 33–28–R8A–8 and its own make contact 33–PNR–3 and winding to −48 v. D.C. in FIG. 33.

When relay 33–P07R1 is released it will open the operate path to the reader clutch magnet at 27–RCM by opening its make contacts 27–33–P07R1–10. The de-energization of relay 33–P07R1 will also open the operating path to relay 34–TOHR by opening its make contacts 34–33–P07R1–3, it being understood that the locking path to relay 34–TOHR, at end of message, will be opened upon the energization of relay 33–PNR due to the opening of the break contacts 34–33–PNR–8 and upon opening of contacts 34–33–P06R–4 and 27–AUX–8. Relay 33–P07R1 in being de-energized will also break the operating path to the relay 34–TSR by opening its make contacts 34–33–P07R1–12 and will also open the circuit path to the lower notch magnet 37–LMNM by opening its make contacts 37–33–P07R1–6. Relay 33–P07R1 also opens the operate path to relay 44–UDR, which is the unsent DD number relay, and to the relay 34–DM in the telephone subscriber's subset by opening its contacts 44–33–P07R1–1 and 34–33–P07R1–12, respectively. At this point in the operation, with the relay 34–DM de-energized, the subscriber set at the originating station will go off of dial mode and the reader clutch magnet 27–RCM will be released causing the reader shaft to stop rotating. The release of relay 33–P07R1 will also open its make contacts 27–33–P07R–1–8 to open the circuit from the subscriber's set.

At this time, the reader at the originating station will wait up to 11 seconds to receive an answer-back from the subscriber set indicating that the connection through the switching system to the called subscriber has been completed. This time interval of 11 seconds is controlled by the timer relay circuit shown in FIG. 48 which is called into operation by operating and then releasing the timer reset relay 37–TRR each time the make contact 37–reader AUX–A closes and then opens provided the relay 36–ITRB and the relay 38–CFR are not energized. A circuit for operating the timer reset relay 37–TRR is completed from ground (FIG. 37) through make contacts 37–AUX–A, closed break contacts 37–36–ITRB–6, closed break contacts 37–38–CFR–6, diode 37–D–35 and closed make contact 37–31–TCR–12 then through the winding of relay 37–TRR to the —48 v. D.C. source in FIG. 37. The operation of timer reset relay 37–TRR will release the timer relay circuit shown in FIG. 48 by closing its contacts 37–48–TRR–2. It should be noted at this time the line following relay 39–LFR is normally energized and consequently its break contacts 48–39–LFR–5 are open at this time.

Figure 48:
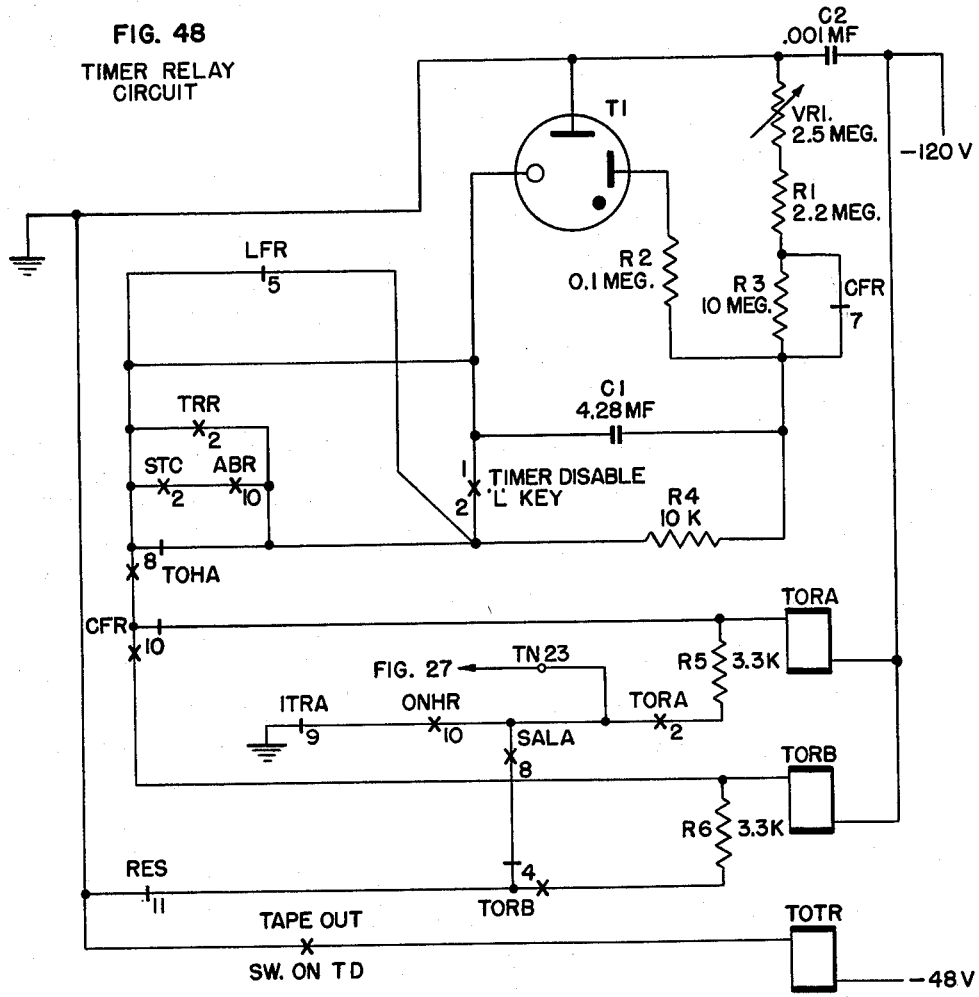

The timer circuit illustrated in FIG. 48 initiates a timing cycle each time the relay 34–TOHA is operated due to the closing of the make contacts 48–34–TOHA–8 to apply a charging potential from ground in FIG. 48 through the 2.5 megohm variable resistor 48–VR–1, 2.2 megohm resistor 48–R–1, now colsed break contact 48–38–CFR–7 to one side of the 4.28 mf. capacitor 48–C–1, the other side of the capacitor 48–C1 being connected through the now closed make contact 48–34–TOHA–8, break contact 48–38–CFR–10, the winding of the relay 48–TORA to —120 v. D.C. source in FIG. 48. This circuit will not energize the relay 48–TORA but will apply a charging potential to the capacitor 48–C1. By regulating the variable resistor 48–VR–1 the charging rate of the capacitor 48–C1 may be varied up to 11 seconds and if the circuit for charging the capacitor 48–C1 is not disabled, the capacitor will charge in approximately 11 seconds and cause the timer tube 48–T1 to fire thereby to complete a circuit from ground (FIG. 48) across the tube 48–T1 and through the now closed make contact 48–34–TOHA–8 and the now closed break contact 48–38–CFR–10 through the winding of the relay 48–TORA to operate the relay 48–TORA. As soon as the relay 48–TORA is energized it will lock up in a path from ground (FIG. 48) through the now closed break contact 48–36–ITRA–9, now closed make contacts 48–34–ONHR–10, its own contact 48–TORA–2 and resistance 48–R5, through the winding of the relay 48–TORA to the —120 v. source in FIG. 48. The sequence of operations initiated upon the failure to receive an answer back from the subscriber's set will be described hereinafter in section 15 and it will be assumed for the present that a connection has been estabilshed.

The No. 5 cross bar telephone switching systems are provided with circuitry whereby the terminating cross bar office, operating in conjunction with the subscriber's receiving or terminating station, will cause a polarity change in the transmission circuit through the office, which results in circuit action at the transmitting stations subscriber's set to operate the answer-back relay 38–ABR in a circuit from ground in the subscriber's set through the now closed contacts 38–34–TOHR–3, break contact 38–40–UNMR–5 now closed, through the winding of relay 38–ABR to the —48 v. D.C. source in FIG. 38. This will indicate that a connection has been made through the telephone switching equipment to a terminating station. When relay 38–ABR is operated, it will unblind the monitoring printing telegraph apparatus at the transmitting station by opening its break contact 47–38–ABR–5, thus to cause the monitoring printer at the transmitting station to print characters under control of the tape. The printing telegraph apparatus provided at both the receiving stations and at the transmitting stations preferably is of the type disclosed in the patent to W. J. Zenner No. 2,505,729, issued April 25, 1950, wherein the printer selector magnets 13 are the same as the magnet PTR–SEL–MAG shown in FIG. 47. The energization of the relay 38–ABR will also open its contacts 33–38–ABR–1 to release the relay 33–P07R2 and will, in opening its contact 34–38–ABR–7, open the operating path for relay 34–TSR. When relay 33–P07R2 is released it will cause the reader clutch magnet to be operated in a circuit from ground FIG. 27 through now closed break contacts 27–33–P07R1–8, now closed stop-run relay 27–SRR–12, now closed interrupter contacts 27–37–LNSS–INT and break contacts 27–48–TOTR–9, 27–33–P06R–5, 27–33–P67R–5, 27–53–P3R–5, 27–33–P7R–8, 27–33–P07R2–5, 27–28–R8B–2, 27–36–IDSR–7, 27–36–ITRA–5, 27–38–CAR–4, 27–50–RES–6, 27–50–SALA–7, 27–50–SALB–5, 27–42–PFR–4, 27–36–ITRA–4, 27–47–PSR–10, thence through the winding of the reader clutch magnet 27–RCM to the —48 v. D.C. source in FIG. 27.

Energization of the reader clutch magnet 27–RCM will cause the reader to go through successive cycles until the circuit to the reader clutch magnet 27–RCM is broken. The reader will advance the tape step-by-step and the contacts designated "reader contacts 1 to 5" on FIG. 35 will sense the code perforations in the tape for the mnemonic code and will control the energization of the monitor line relay 35–MLR and in the sending line relay 35–SLR to cause them to pulse under control of the distributor contacts 1 to 5 shown in FIG. 35. The pulsing of the monitor line relay 35–MLR will furnish the transmitting station with pulses to cause the printer at the originating station to print a copy of the mnemonic code whereas the pulsing of the sending line relay 35–SLR will, under control of its contacts 39–35–SLR–4, operate the line following relay 39–LFR and will pulse the originating subscriber set to drive its carrier channel to transmit to the telephone line. This operation will continue until the reader contacts sense the "SPACE" character (perforation in the No. 3 level of tape) after the mnemonic thereby to cause the operation of numbering relay No. 3, 35–NR–3 in a circuit from ground (FIG. 35) through the closed reader contact No. 3 in FIG. 35, through the closed make contact 35–34–TSR–8, and the winding of the relays 35–NR3 to the —48 v. D.C. source in FIG. 35. As soon as relay 35–NR3 pulls up it will complete a circuit from ground in FIG. 35 through its closed contacts 35–NR3–9 and 35–36–1TRC–8 to apply current to the distributor contacts 3 in FIG. 35. When relay NR3 is operated, it will close its contacts 53–35–NR3–12 to prepare a circuit for energizing relay 53–P3R which will be operated as soon as the reader closes its contacts 33–AUX–B in a circuit from ground (FIG. 33) through now closed break contacts 33–50–RES–7 then through the contacts 33–AUX–B and terminal TE–8 on FIGS. 33 and 53 through now closed break contact 53–35–NR4–10, now closed make contacts 53–35–NR3–12, break contacts 53–35–NR5–10, 53–35–NR2–10, 53–35–NR1–6, now closed make contacts 53–34–ONHR–8, the winding of relay P3R to —48 v. D.C. source in FIG. 53. Relay P3R upon becoming energized will lock energized over its own contacts 53–P3R–12 and the now closed make contacts 53–34–ONHR–8. The operation of relay P3R will also open the circuit to the reader clutch magnet by opening its contacts 27–53–P3R–5 and will release the locking path to relay 34–TSR by opening its break contacts 34–53–P3R–7. The release of relay 34–TSR will release relay 35–NR3 by opening its make contacts 35–34–TSR–8.

As pointed out hereinbefore, at this time, the transmitting station or originating station will be waiting for the confirmation to be received from the receiving station and will wait up to 11 seconds to receive such confirmation. It is to be assumed that the call has gone through to the terminating station and confirmation of the completion of the connection is received, relay 38–REC will be operated to close its spacing contact. When receive relay 38–REC is operated, it will complete an operating path for relay 38–CFR from ground in FIG. 38 through the closed make contacts 38–REC–5, 38–53–P3R–2, 38–34–TOHR–11, the winding of the relay 38–CFR to —48 v. D.C. source in FIG. 38. Upon being energized, the relay 38–CFR will lock operated over its own contacts 38–CFR–5 and contacts 38–34–TOHR–11. Also, upon being energized the relay 38–CFR will close an operating path for the upper notch magnet 41–UNM also shown in FIG. 9. The circuit for operating the upper notch magnet 41–UNM extends from ground in FIG. 41 through the now closed break contact 41–36–ITRB–9, now closed make contact 41–38–CFR–12, now closed break contact of slow to operate upper notch memory relay 41–UNMR–3 and the now closed break contact 41–45–STC–11 and the winding of the upper notch magnet 41–UNM to the —48 v. D.C. source in FIG. 41. The relay 41–UNMR which is slow to operate will pull up in parallel with the upper notch magnet 41–UNM and in so doing will open the break contacts 41–UNMR–3. Thus, a pierced hole will be formed in the sixth level of the tape to record the receipt of confirmation and this hole will be pierced in line with the eight level pierce which was made when the attempt to connect to a terminal station was recorded.

The operation of the relay 38–CFR will also arrange the timer relay circuit as shown in FIG. 48 so that, instead of timing out in 11 seconds, this circuit will time out in 45 seconds. This is accomplished by the relay 38–CFR opening its break contact 48–38–CFR–7 to insert the .10 megohm resistor 48–R3 in the circuit to the capacitor 48–C1 and through its transfer contacts 48–38–CFR–10 will open the break contact of this transfer contact arrangement to disconnect the operating path for relay 48–TORA.

When relay 41–UNMR is energized it will, as pointed out hereinbefore, open the operating path to the upper notch magnet 41–UNM and it will also close an operating path for relay 42–PBRA which is the pull-back relay A. The operating path for operating the relay 42–PBRA extends from ground (FIG. 42) through the now closed make contact 42–41–UNMR–8 and the now closed break contacts 42–33–P7R–4, 42–33–P6R–8, 42–PBRB–5 and the winding of the relay 42–PBRA to —48 v. D.C. source in FIG. 42. When this relay 42–PBRA is operated, it will supply an operating path for energizing the pull back magnet 43–PBM shown in FIGS. 9 and 43 in a circuit from ground (FIG. 43) through the now closed break contacts 43–33–P06R–10, now closed make contacts 43–42–PBRA–2, the winding of the pull back magnet 43–PBM to —48 v. D.C. source in FIG. 43. As described in conjunction with the mechanical features of the apparatus under consideration in the present application, the operation of the pull back magnet 43–PBM will cause the tape to be pulled back, through the reader gate or reader head, until the tape is taut between the reader and the pull forward or feed-out sprocket feed wheel 252. As the tape is pulled taut between the point where the sensing pins read it and the pull forward or sprocket feed wheel 252, the tight tape switch 40–TTS will be closed to connect ground in FIG. 40 through the tight tape relay 40–TTR to —48 v. D.C. source in FIG. 40, thus, to energize the tight tape relay 40–TTR. Energization of the tight tape relay 40–TTR will complete a circuit to operate the pull back relay "B," 43–PBRB in a circuit from ground (FIG. 42) through the now closed make contact 42–40–UNMR–8, now closed break contact 42–33–P7R–4, now closed contacts 42–40–TTR–2 and winding of the relay 42–PBRB to —48 v. D.C. source in FIG. 42. When the pull back relay "B," 42–PBRB is energized it will lock operated through its make contacts 42–PBRB–2 and the transmitter off hook relay make contacts 42–34–TOHR–10 to ground in FIG. 42. The operation of pull back relay "B," 42–PBRB will open the locking path to the permutation "06" relay 33–P06R by causing opening the break contacts 33–40–TTR–7.

When the pull back relay B, 42–PBRB is energized, it will operate the reader clutch magnet 27–RCM in a circuit from ground, through now closed break contacts 27–33–P07R1–8, now closed make contacts of stop-run switch relay 27–32–SRR–12 interrupter of the stepper switch 27–37–LNSS–INT, now closed break contacts of torn tape relay 27–48–TOTR–9, now closed break contact 27–33–P06R–5, now closed make contact 27–42–PBRB–4, now closed break contacts 27–38–CAR–4, 27–50–RES–6, 27–50–SALA–7, 27–50–SALB–5, 27–42–PFR–4, 27–36–ITRA–4, 27–PSR–10, the winding of the reader clutch magnet 27–RCM to —48 v. D.C. source in FIG. 27 thus to energize the reader clutch magnet. The energization of the relay 42–PBRB will also open the locking path to relay 33–P7R by opening its break contacts 33–42–PBRB–10. In addition to these circuits controlled by the pull back relay B, 42–PBRB, the relay 42–PBRB in operating will open its break contacts 42–PBRB–5 to break the operating circuit to the relay 42–PBRA permitting it to release. When relay 42–PBRA is released it will open its contacts 43–42–PBRA–2 to release the pull back magnet 43–PBM.

At this time the tape has been returned to its original starting or clamped position and the operation of the reader clutch magnet 27–RCM will start the tape advancing through the reader mechanism. As the tape advances, the characters are sensed by the sensing pins 284 in reader, which in turn, code the distributor as described hereinbefore and are transmitted to the line and to the monitor circuits by way of the sending line relay 35–SLR and the monitor line relay 35–MLR. Since the reader clutch magnet 27–RCM on its first operation will thus move the tape out of the position which it occupied after the pull back operation, the first code combination to be sensed by the reader will be the "CARRIAGE RETURN" code combination within the bracket "A" of FIG. 2 and the second character to be sensed in the tape will be the code combination for "LINE FEED." The telegraph printer at the originating station is equipped with a so-called "Stunt Box" which upon receiving the sequence of "CARRIAGE RETURN" and "LINE FEED" code combinations, will close a switch 47–CR–LF–SW thereby to energize a monitor blinding relay 47–MBR in a circuit from ground (FIG. 47) through now closed break contact 47–PSR–9 and the switch 47–CR–LF–SW and now closed make contacts 47–42–PBRB–12 and thence through the winding of the relay 47–MBR to —48 v. D.C. source in FIG. 47. This operation of the monitor blinding relay 47–MBR will cause the 47–MBR to be locked up over its own locking contacts 47–MBR–2 and the now closed contacts 47–34–TOHR–5.

(7) *Blinding Called DDD Number After Pull Back*

As soon as the monitor blinding relay 47–MBR is operated it will initiate a circuit action to cause the transmission to the terminating station of the message text, less the DDD number, which should not be included in the message received at the terminating station. As the tape is advanced by successive operations of the reader clutch magnet 27–RCM, the sensing pins 284 in the reader will sense the control holes "0," "6," and "8" at the beginning of the DDD number, thus, to energize relays 28–R0, 28–R6, and 28–R8A and 28–LUR by closing the reader contacts "0," "6," and "8" in FIG. 35. The relay LUR operates upon the energization of any one of the relays associated with 0, 6 and 7 control holes in the same manner as was described hereinbefore in connection with the energization of the relay 38–LUR upon the original sensing of the "0" perforation in the tape. Relay 28–R0 will be operated in a circuit similar to that described hereinbefore when the relay 28–R0 was previously energized, that is, through the contacts of the transmitter reader shown on FIG. 35. Similarly, relays 28–R6 and 28–R8A will be operated in a circuit originating at ground in FIG. 28 through the reader sensing contacts shown in FIG. 35 and thence through the terminals MD189 and MD187, respectively through the windings of the relays 28–R6 and 28–R8A to the —48 v. D.C. source in FIG. 28.

The operation of relay 28–R6 will open the locking path for the permutation none relay 33–PNR by opening its break contacts 33–28–R6–7. When, in this cycle of operation of the reader, the reader contact 33–AUX–B is closed, it will complete a circuit from ground in FIG. 33 through the now closed break contact 33–50–RES–7, the contact 33–AUX–B, diode 33–D17 and through the now closed break contacts 33–28–R7–4, make contacts 33–28–R8A–2, 33–28–R0–12, and 33–28–R6–2 and through the winding of the relay 33–P068R to the —48 v. D.C. source in FIG. 33. This circuit will also be completed through diode 33–D25 and now closed break contact 33–36–ITRB–5 to energize relay 33–LSR. Energization of relay 33–LSR closes a circuit from ground in FIG. 35 through its sets of contacts 35–33–LSR–5, 8, 9, 12, and 13 to the distributor contacts 1, 2, 3, 4, and 5 respectively. The application of this ground potential to the distributor contacts 1 to 5 as shown on FIG. 35 will cause the code combination for "LETTERS" to be transmitted instead of the code combination for "FIGURES" which is sensed by the sensing pins in this cycle of operation of the reader.

When relay 33–P068R is energized, it will break the path to relay 33–P07R2 by opening its break contacts 33–P068R–6 and will break the operating path to relay 33–P07R1 by opening its break contacts 33–P068R–4 and will also break the operating path to relay 33–P0R by opening its break contacts 33–P068R–5. The relay 33–P068R will also be locked up over its own contacts 33–P068R–2 and break contacts 33–PNR–7. Thus, as long as the relay 33–P068R is held energized it will prevent the operation of relays 33–P07R2, 33–P07R1 and 33–P0R. When the make contact 37–AUX–A of the reader is closed it will complete a circuit from ground (FIG. 37) through its now closed contacts 37–AUX–A now closed break contact 37–36–ITRB–6, make contact 37–33–LSR–4 and diode 37–D34 through the winding of the relay 37–LBR to —48 v. D.C. source in FIG. 37. As soon as the relay 37–LBR is thus operated it will lock operated through its own make contacts 37–LBR–4 and the now closed make contacts 37–28–LUR–4.

The operation of the relay 37–LBR, which is the line blinding relay, will cause the blinding or non-operation of the line and monitor functions during the sensing of the direct distance dialing number which had been fed to the telephone switching equipment and which had caused the completion of a circuit to the station whose address was read in the previously described portion of the operation. This blinding of the line and monitor is effected by completing a shunt around the distributor contacts through the now closed make contacts 35–37–LBR–12 and 35–28–LUR–8. The tape will continue to advance through the reader and the perforations in the "0" and "7" control holes of the tape associated with the direct distance dialing number will maintain the relays 28–LUR and 37–LBR operated thus to keep the line and the monitoring printer blinded. The tape will be advanced in this manner until the end of the direct distance dialing number and upon the reader sensing the first character after the direct distance dialing number without the control holes in the "0" and "7" positions of the tape, the relays 28–R0, 28–R7, and 28–LUR will be released, since the transmitter reader sensing contacts shown on FIG. 35 for the "0" and "7" control holes will not be closed. When relay 28–LUR is thus released, it will re-open its make contacts 35–28–LUR–8 to remove ground in FIG. 35 from the leads going to the relays 35–MLR and 35–SLR, thereby, to permit the relays 35–MLR and 35–SLR to follow the output of the distributor contacts shown on FIG. 35 and designated SS and 1 to 5. When relay 28–LUR was released, it re-opened its make contacts 37–28–LUR–4 to open the locking path to the relay 37–LBR, thus, releasing this, line-blinding relay 37–LBR.

When in this cycle of the operation of the apparatus, the reader contact 33–AUX–B re-closes, a circuit will be completed from ground in FIG. 33 through the break contact 33–50–RES–7 and the break contacts 33–AUX–B, the diode 33–D17 and the now closed break contacts 33–28–R7–4, 33–28–R0–6 and 33–28–R6–10 to the winding of the relay 33–PNR and thence to —48 v. D.C. source in FIG. 33. This will cause the permutation none relay 33–PNR to be energized and this relay will lock operated from ground, through the break contacts 33–28–R6–7, 33–28–R7–7, 33–28–R0–8, 33–28–R8A–8 and the now closed make contacts 33–PNR–3, through the winding of the relay 33–PNR to the —48 v. D.C. source in FIG. 33. When relay 33–PNR operates it will open its break contact 33–PNR–7 to open the locking path to relay 33–P068R and therefore this relay will be released.

With the circuit in this condition, the tape will be advanced and the mnemonic code, end-of-address code, text and end-of-message code will be transmitted to the line and monitor by the selective operation of relays 35–MLR and 35–SLR under control of the distributor contacts shown in FIG. 35. This will cause the transmission of the message text together with the mnemonic code to the terminating station whose address had been read in the reading of the direct distance dialing number. When the end-of-message code, which follows the text of the message, is sensed by the sensing pins, the distributor contacts shown in FIG. 35 will cause the transmission of all of the characters of the end-of-message sequence to be transmitted over the line to the terminating station.

It should be pointed out that this sequence of operation occurs when there is a single address or single direct distance dialing number perforated in the tape, indicating that, the message is to be directed to a single terminating station. The mode of operation of the apparatus, when multiple addresses are perforated in the tape, to direct the message to a number of stations, will be described hereinafter.

*(8) End-of-Message Continuous Tape*

In the operation of the apparatus as described hereinbefore, it has been assumed that a message is to be directed to a single station, that the connection has been established through the telephone switching equipment and confirmed by receipt of an answer-back and confirmation signal, that the tape was pulled back, that the reader clutch has been re-operated to cause the tape to be advanced, blinding the line and monitor circuits to the DDD number, and that the text has been transmitted to the line and to the monitoring circuit to transmit the message to the terminating station and also to print, on the teletypewriter at the transmitting station, the text of the message together with the mnemonic code for the addressed sation. When the tape was advanced through the reader to cause the reader to read the message text and transmit it over the line, the completion of the transmission of the message text will precede the end-of-message code sequence. When the end-of-message code sequence is read by the sensing pins at the reader, the sensing of the "0" and "6" control holes associated with the third "N" of the series of four "N's" at the end-of-message code sequence will cause the relay 33–P06R to be energized in a circuit from ground through the now closed break contact 33–50–RES–7, reader break contact 33–AUX–B, the diode 33–D17, break contact 33–28–R7–4, make contact 33–28–R0–6, make contact 33–28–R6–8, break contact 33–28–R8A–4, winding of relay 33–P06R to —48 v. D.C. source in FIG. 33. This relay 33–P06R upon being energized will lock operated through its own contacts 33–P06R–12 and the now closed break contacts 33–40–TTR–7 and break contact 33–50–RES–7 to ground.

The tape will continue to be fed and when the reader contacts sense the next character which happens to be "N" with no control holes, the relays 28–R0 and 28–R6 will not be energized and consequently relay 33–PNR will be operated in a circuit from ground (FIG. 33) through the break contact 33–50–RES–7, the auxiliary contact of the reader 33–AUX–B, the diode 33–D17, now closed break contacts 33–28–R7–4, 33–28–R0–6, 33–28–R6–10, through the winding of the relay 33–PNR to the —48 v. D.C. source in FIG. 33. Thus, in this cycle of operation of the reader, when the reader contact 33–AUX–B is closed, operation of relay 33–PNR will ensue and this relay will lock up under control of the un-operated recognition relays 28–R6, 28–R7, 28–R0 and 28–R8A and its own locking contact 33–PNR–3 in a circuit from ground (FIG. 33) through the break contacts 33–28–R6–7, 33–28–R7–7, 33–28–R0–8, 33–28–R8A–8, and its own locking contacts 33–PNR–3.

The energization of relay 33–PNR will open its break contact 27–33–PNR–10 to break the operating circuit to the reader clutch magnet 27–RCM and will also effect the operation of relay 42–PFR which is the pull forward relay. The circuit for operating relay 42–PFR extends from ground (FIG. 42) through the now closed make contacts 42–33–PNR–2 and 42–33–P06R–2 and through the break contacts 42–44–UDR–5 and 42–33–P67R–6 and winding of the relay 42–PFR to —48 v. D.C. source in FIG. 42. In addition the energization of the relay 33–PNR will open a locking circuit of the transmitter off-hook relay 34–TOHR by opening its break contacts 34–33–PNR–8 which is connected in a locking circuit for transmitter off-hook relay 34–TOHR.

The release of the reader clutch magnet as just described will stop the transmission to the monitor and line at the end of the cycle of operation in which the relay 33–PNR was operated. As soon as relay 42–PFR is energized, it will open its contacts 31–42–PFR–5 to cause the release of relay 31–TCR. In this same cycle, the opening of the contacts 27–DIST–AUX–D, which occurs just prior to the end of the cycle, will cause the release of the relay 34–TOHR by breaking the only relay 34–TOHR by breaking the only remaining path from ground through terminal TN–38 on FIGS. 27 and 34 and diode 34–D29 to the relay 34–TOHR.

When relay 34–TOHR is released, it will release relay 34–TOHA which is a transmitter off of relay A, by re-opening make contacts 34–TOHR–7. The release of relay 34–TOHR will also release the on-hook relay 34–ONHR by re-opening its make contacts 34–TOHR–9 and will also release the on-hook relay 34–OH in the subscribers set shown in FIG. 34 by opening its make contacts 34–TOHR–1. Since the transmitter off-hook relay 34–TOHR controls the coding circuit for relays 38–ABR, 28–CFR, 42–PBRB and 47–MBR it will release these relays by opening its contacts 38–34–TOHR–3, 38–34–TOHR–11, 42–34–TOHR–10, 47–34–TOHR–5, respectively. When relay 34–TOHA is released, it will open the circuit to time out relay A, 48–TORA by opening its make contacts 48–34–TOHA–8.

When relay 38–ABR, which is the answer-back relay, was energized as described in section 4, it blinded the monitoring teletypewriter by re-closing its contacts 47–38–ABR–5. When relay 38–CFR, which is the confirmation relay, was released, it released the upper notch memory relay 41–UNMR by opening its make contacts 41–38–CFR–12. When relay 53–P3R which is the permutation "3" relay, is released it will cause the reader clutch magnet 27–RCM to be operated in a circuit from ground (FIG. 27) through break contact 27–33–P07R1–8 now closed contacts 27–32–SRR–12, break contact 27–37–LNSS–INT and the now closed break contacts of relays 27–48–TOTR–9, 27–33–PNR–10, 27–33–P67R–5, 27–53–P3R–5, 27–33P7R–8, 27–33–P07R2–5, 27–28–R8B–2, 27–36–IDSR–7, 27–36–ITRA–5, 27–38–CAR–4, 27–50–RES–6, 27–50–SALA–7, 27–50–SALB–5, transmitter switch key 27–TRANS–SW position 1, 27–36–ITRA–4, 27–PSR–10, and the winding of the reader clutch magnet 27–RCM to —48 v. D.C. source in FIG. 27. The reader clutch magnet 27–RCM will remain energized over this circuit to advance the tape through a trailer section until the reader senses the first character of the start-of-message sequence of the next message, at which time a cycle of operation will be re-initiated as described in connection with the reading of the first start-of-message code sequence in section 1.

*(9) Blinding Uncalled DDD Number After Pull-Back*

The description thus far has assumed that a single addressee was to receive the message text and consequently, the address of only one terminating station was perforated in the tape. In the event that it is desired to transmit the same message to a plurality of addressees or terminating stations, the tape would be perforated as shown in FIG. 2 with the telephone address and the mnemonic code for one terminating station appearing, respectively, in the portions bracketed B and C, and then instead of having the end-of-address code perforated after the first terminating station's address, there would be the direct distance dialing number of a second station, such as shown bracketed by the letter D, and the mnemonic code of that station, as bracketed by the letter E, preceding the end-of-address code and time of day and identification of the originating station. The message text may be sent to any desired number of terminating stations and this may be done by entering the address in the form of the direct distance dialing number and the mnemonic code for the addressed terminating stations in sequence prior to the end-of-address code in the tape. When a multiple address, such as that just described, is to be transmitted the direct distance dialing number for the terminating stations to which a connection has not been completed will not be transmitted to the terminating station which has been connected to the originating station, but the mnemonic code for those stations will be transmitted to the called terminating station to which a connection has been completed. Consequently, it becomes necessary to blind the uncalled direct distance dialing number and this is effected by the reader sensing the presence of the "0" control hole in the tape which forms a part of the code sequence for the direct distance dialing number. As described hereinbefore, the sensing by the reader of a perforation at the "0" level of the tape in connection with section 3, regarding the dialing operation, the following relays will be energized: Recognition relay for the "0" hole 28–R0, line unblinding relay 28–LUR, and then when the reader contacts 33–AUX–B close, relays 33–P0R, that is the permutation zero relay, and relay 33–LSR, the line shunting relay will be operated. In being operated, relay 33–LSR will apply ground to the distributor contacts 1 to 5, shown on FIG. 35, and since the distributor shaft is starting its cycle at this time, with ground applied to all of the distributor contacts, the "LETTERS" combination will be transmitted to the line and the monitor, for the first character of the DDD number. As the reader contacts 37–AUX–A close, at the start of the next cycle of the reader shaft, the line blinding relay 37–LBR will be operated, as described in connection with the dialing operation, to complete the short around the distributor contacts 1 to 5 as shown on FIG. 35. As the first digit of the uncalled direct distance dialing number is sensed, the control holes "0" and "7" are sensed and this will cause relay 28–R7 to be operated and relay 28–R0 will remain operated from the previous sensing of the "0" control hole. The operation of the circuit during the time that the reader is reading the direct distance dialing number will be the same as in connection with the dialing operation considered under section 3 with the exception that the lower notch stepping switch 27–LNSS will not be operated at this time, as its operating path is open due to the fact that the upper notch memory relay 41–UNMR has been pulled up. Relays 33–P07R1 and 33–P07R2 will be operated and when relay 33–P07R1 is operated, it will complete a circuit to operate relay 44–UDR by closing its contacts 44–33–P07R1–1 and the energization of relay 33–P07R2 will release relay 33–P0R by opening its contacts 33–P07R2–7.

The tape will keep on advancing through the reader head with the "0" and "7" control holes being sensed to keep the relays 28–LUR and 37–LBR operated thereby to keep the line and monitor blinded. This will continue until the reader senses the first character without control holes following the direct distance dialing number, whereupon, relays 28–LUR, 28–R0 and 28–R7 will be released since these relays are only held up when the reader finds control holes such as the "0" hole, and the "7" hole in the tape. When relay 28–LUR, that is the line un-blinding relay, is released it will release the line blinding relay 37–LBR by opening its contacts 37–28–LUR–4, and the permutation "0-7" relay No. 1, 33–P07R1 and the permutation zero seven relay No. 2, 33–P07R2 by opening its contacts 33–28–LUR–9. When in this cycle of the reader the reader contacts 33–AUX–B close, the relay 33–PNR will be energized over the path to this relay described hereinbefore in connection with the operation of it. Similarly relay 33–LSR will be de-energized due to the break of the circuit to it at the contacts 33–28–LUR–9. With this condition of the circuitry, the tape will be advanced through the reader to present the code combination for the mnemonic code of the un-called station or stations and through the end-of-address, text and end-of-message code sequence, to transmit to the line and the monitor, by way of the reader sensing contacts shown on FIG. 35, and their associated distributor contacts, and the sending relay 35–SLR and monitoring line relay 35–MLR. After the reader contacts sense the "0" and "6" control holes associated with the third "N" of the series of "N's" in the end-of-message code sequence and they sense the fourth "N" the tape will be pulled back in a manner to be described hereinafter.

(10) Counting Dialing Attempts

As described in section 3, under the dialing operation, at the completion of the feeding of a DDD number to the originating subscriber set, in the "dialing" of the DDD number by the subscriber set, a pierce is made in the tape at the "8" level to record the fact that the dialing attempt has been made. When a number is dialed and the receiving station is not connected due to a busy or trouble condition, the tape must be pulled back to redial the direct distance dialing number. The sensing of No. 8 pierce in the tape and the absence of a pierce in the No. 6 position of the tape indicates that an attempt has been made to complete a connection to an addressee having a certain direct distance dialing number and this attempt has been unsuccessful. When the tape reader fails to find a pierce in the "6" level of the tape and finds a pierce in the "8" level of the tape, relay 28–R8A and 28–R8B will be operated. The relay 37–TRR, which is the timer reset relay, will be operated upon the closure of the reader contact 37–AUX–A in a circuit from ground in FIG. 37 through the now closed contacts 37–AUX–A, break contacts 37–36–ITRB–6, break contacts 37–38–CFR–6, which is closed at this time due to the fact that the confirmation relay has not pulled up, thence through the diode 37–D35 and the make contacts 37–31–TCR–12, through the winding of the relay 37–TRR to the —48 v. D.C. source in FIG. 37. The operation of the relay 37–TRR will partially close the operating path to the relay 28–R8B and the relay 28–R8B will be pulled up together with the relay 28–R8A in a circuit from ground in FIG. 28, through terminal MD–147 in FIGS. 28 and 35, through the now closed reader contact No. 8 shown in FIG. 35, terminal MD–187 on FIGS. 35 and 28 and through the now closed contact 28–R7–10 to the winding of the relay 28–R8A and from the terminal MD–187 through the now closed make contact 28–37–TRR–12 and the winding of the relay 28–R8B to —48 v. D.C. source in FIG. 28.

As described hereinbefore the operation of the relay 37–TRR will shunt the capacitor 48–C1 by closing its contacts 48–37–TRR–2. When the relay 28–R8B operates it will be close its contacts 37–28–R8B–6 to complete a circuit from ground, through the now closed break contacts 37–36–ITRB–7, 37–28–R6A–7, now closed make contacts 37–28–R8B–6, diode 37–D39 and now closed break contacts 37–33–P068R–8 and 37–41–UNMR–10 and through the winding of the lower notch stepping switch magnet 37–LNSS to —48 v. D.C. source (FIG. 37). When the normally open reader contact 37–AUX–A opens in this cycle of operation, it will break the circuit from ground in FIG. 37 that had energized the relay 37–TRR which will thereupon open the circuit to relay 28–R8B to cause this relay to release. Since the relay 28–R8B has a shorted secondary winding, it will be slow to release and will allow the lower notch stepper switch magnet 37–LNSS to operate before becoming completely de-energized. Since the lower notch stepping switch magnet 37–LNSS had been connected to ground potential through the closing of the make contacts 37–28–R8B–6, the opening of these contacts on the release of relay 28–R8B will de-energize the lower notch stepping switch magnet 37–LNSS and cause it to step from its normal position into position 1. Relay 28–R8B in becoming de-energized will close its contacts 27–28–R8B–2 to close an operating path to the reader clutch magnet 27–RCM.

Since, as just described hereinbefore, the lower notch stepper switch magnet 37–LNSS will be stepped to its No. 1 position under control of the relay 28–R8B, control of the magnet 37–LNSS will be transferred to the reader contacts 37–AUX–A. In stepping over the ten digits of the direct distance dialing number perforated in the tape the magnet 37–LNSS will be operated in a circuit from ground (FIG. 37) through contacts 37–AUX–A, now closed break contact 37–36–ITRB–6 and the now closed make contact 37–33–P07R1–9 or 37–33–P0R–12 and the diode 37–D33 and now closed break contact 37–33–P068R–8 and 37–41–UNMR–10 and will arrive at its No. 10 position one character earlier than it did when operating in the manner described under Dialing Operation in section 3. Thus, the lower notch stepping switch 37–LNSS will be operated under control of the reader contact 37–AUX–A in the manner described under the Dialing Operation in section 3, but due to the additional step of the lower notch stepper switch 37–LNSS through relay contacts 37–28–R8B–6 the stepper switch 37–LNSS will actuate the lower notch magnet 37–LNM one code combination earlier in its operation than it did under Dialing Operation and when the brush on ARC–1 of the lower notch stepper switch 37–LNSS reaches contact 10 it will energize the lower notch magnet 37–LNM upon the closure of the reader contact 37–AUX–A in that cycle of operation in a circuit from ground, FIG. 37, through the reader contact 37–AUX–A, now closed break contact 37–36–ITRB–6, then through the common brush of ARC–1 of 37–LNSS and the contact at position 10 of ARC–1 of 37–LNSS through the now closed make contact 37–33–P07R1–6 and now closed break contact 37–45–STC–8, the winding of the lower notch magnet 37–LNM to —48 v. D.C. source in FIG. 37. This will cause the piercing of a hole at the "8" level of the tape under the "LETTERS" code combination of the start-of-message code sequence.

Thus, the first No. 8 pierce to record a dialing attempt is under the "FIGURES" character at the start of the DDD number, the second No. 8 pierce to record that a second dialing attempt has been made is under "LETTERS" character at the end of the start-of-message code sequence, and the third and last No. 8 pierce to record a third dialing attempt is under the "LINE FEED" code combination of the start-of-message code sequence. In the event that the connection is not completed to the addressee whose direct distance dialing number is perforated in the tape after making three attempts to make such a connection the message will be sent to an intercept station which is explained hereinafter in section 11 under Intercept Call Initiation.

(11) *Intercept Call Initiation*

After the sending or originating station has failed on three attempts to receive an answer-back signal and confirmation signal from the addressed terminating station the tape will contain perforations in the "8" level in the form of pierced holes and will not have a pierced hole in the sixth level in line with any one of the pierced holes in the "8" level. The pierced holes in the "8" level will appear under the code combination for "FIGURES" at the beginning of the direct distance dialing number, under the code combination for "LETTERS" in the start-of-message code sequence and under the LINE FEED code combination in the sart-of-message code sequence as bracketed at A in FIG. 2. Thus, when the tape is pulled back and the reader shaft starts its sensing cycle, it will sense the third, second and first holes pierced at the "8" level of the tape and when it senses the pierce that is under the "FIGURES" character at the start of the direct distance dialing number, which has an associated "0" control hole, the reader contact 37-AUX-A will close and will effect the operation of the relay 37-TRR as described hereinbefore. The sensing of the "0" and "8" control holes will also operate relay 28-R0, 28-R8A, and 28-R8B in the manner described in connection with the counting of dialing attempts in section 10 to release the reader clutch magnet 27-RCM as also described in section 10.

In this sensing cycle when the reader contacts 37-AUX-A open they will release the relay 37-TRR and then when the reader contacts 33-AUX-B close later on, towards the end of this cycle, relays 33-P0R, 36-ITRA and 36-ITRC will be energized. The path for energizing relay 33-P0R extends from ground (FIG. 33) through the now closed break contacts 33-50-RES-7, the now closed contact 33-AUX-B, the diode 33-D17, now closed break contact 33-28-R7-4, now closed make contact 33-28-R0-6, now closed break contact 33-28-R6-8 (since the reader did not detect a hole in the sixth position of the tape at this code combination), then through the diode 33-D23 now closed break contact 33-P068-R-5 and the winding of the relay 33-P0R to the —48 v. D.C. source in FIG. 33. The circuit for energizing the relays 33-ITRA and 33-ITRC will be completed from ground in FIG. 33 through the now closed break contacts 33-50-RES-7, the reader contacts 33-AUX-B, the diode 33-D17, the now closed break contacts 33-28-R7-4, the now closed make contact 33-28-R0-6, the now closed break contact 33-28-R6-8, now closed make contacts 33-28-R8B-4 and 33-28-R8A-1, the terminal TJ-40 on FIGS. 33 and 36, the now closed break contact 36-37-TRR-10, the common brush of the ARC-3 of the lower notch stepping switch magnet 36-37-LNSS, and the No. 2 terminal on this ARC and then through the now closed break contact 36-ITRB-11 to the winding of the relays 36-ITRA and 36-ITRC and thence to —48 v. D.C. source in FIG. 36. With the opening of the make contact 28-37-TRR-12, the slow release relay 28-R8B will be released and the release of relay 28-R8B will open its contacts 37-28-R8B-6 the stepper switch 37-LNSS will step to its third position.

When relay 33-P0R is energized, it will lock operated in a path from ground (FIG. 33) through the now closed break contacts 33-50-RES-7, the now closed break contacts 33-42-PBRB-10 diode 33-D24, now closed break contacts 33-P07R2-7 and its own make contacts 33-P0R-6 and the break contacts 33-P068R-5. When relay 36-ITRC is energized it will close an operating path to the intercept stepping switch 27-INSS from ground in FIG. 27 through the now closed make contacts 27-36-ITRC-5 and now closed break contacts 27-36-ITRB-3, through the winding of the intercept stepping switch magnet 27-INSS-MAG to —48 v. D.C. source in FIG. 27. The relay 36-ITRC on becoming energized will lock operated through a circuit extending from ground in FIG. 36, through the now closed break contacts 36-50-RES-9, 36-38-CFR-8, and its own make contact 36-ITRC-2. The same locking path will also lock relay 36-ITRA operated. The energization of relay 36-ITRC will also connect the distributor contacts 1 to 5 shown in FIG. 35 to ARCS 6 to 10, respectively, of the intercept stepper switch 35-27-INSS by closing its contacts 35-36-ITRC-4, 6, 8, 10, and 9, respectively.

When the relay 36-ITRA is energized, it opens the operating path to the reader clutch magnet 27-RCM by opening its break contacts 27-36-ITRA-4 and through the same contacts transfers the ground path to partially close an operating path for the distributor clutch magnet 27-DCM. In operating the relay 36-ITRA also prepares a path for the operation of the intercept stepping switch 27-INSS by closing its make contact 27-36-ITRA-10 to place the intercept stepping switch 27-INSS under control of the subscriber set and in closing its contacts 27-36-ITRA-12 prepares a path from the distributor auxiliary contacts 27-AUX-D to control the intercept stepper switch 27-INSS in the event that an answer back is received from the intercept terminating equipment. The operation of the relay 36-ITRA causes the lower notch stepping switch 37-LNSS to be returned to its home or normal position by completing a circuit from ground in FIG. 36 through the now closed break contact 36-50-RES-9, the off-normal switch contact of the lower notch stepping switch 36-37-LNSS-ON-4, terminal TK-18 on FIGS. 36 and 37, now closed contacts 37-36-ITRA-2, now closed break contacts 37-36-ITRB-1 and 37-33-P07R2-6. Contacts of the stepper switch 37-LNSS-INT-1 through the winding of 37-LNSS-MAG to —48 v. D.C. source in FIG. 37. The lower notch stepper switch interrupter contact 37-LNSS-INT-1, operates repeatedly and the off-normal switch 36-37-LNSS-4 is closed at all times that the lower notch stepping switch is out of its normal position. Thus, the lower notch stepping switch 37-LNSS will be returned to its home position and will stop in that position.

When the lower notch stepping switch 37-LNSS arrives in its home position, it will operate the relay 36-ITRB in a circuit from ground (FIG. 36) through the now closed break contact 36-50-RES-9, the now closed break contact 36-37-LNSS-ON-5, now closed make contact 36-ITRC-11 and the winding of the relay 36-ITRB to —48 v. D.C. source in FIG. 36. Energization of the relay 36-ITRB will open its contacts 27-36-ITRB-3 to de-energize the intercept stepper switch magnet 27-INSS-MAG, thus to cause the intercept stepper switch 27-INSS to step to position 1. When relay 36-ITRB is energized, it will lock energized in a path from ground (FIG. 36) through the now closed break contacts 36-50-RES-9 and 36-53-P3R-10 and its own contacts 36-ITRB-12. When relay 36-ITRB is energized, it will open the operating path to the upper notch magnet 41-UNM and to the upper notch magnet memory relay 41-UNMR by opening its break contact 41-36-ITRB-9. When the intercept stepper switch moves into position 1, it will initiate an intercept call as described hereinafter.

(12) *Dialing the Intercept DDD Number*

When the intercept stepper switch 27-INSS has been stepped to position 1, it will through its ARC-2, shown in FIG. 33, complete a circuit from ground (FIG. 33) through break contact 33-50-RES-7 and the brush associated with 33-27-INSS-ARC-2 and contacts 1 to 10 of ARC-2, then through the now closed make contacts 33-36-ITRC-12 and the break contacts 33-P068R-4 through the winding of relay 33-P07R1 to the —48 v. D.C. source in FIG. 33. This path will also be completed through break contact 33-P068R-6 and the winding of the relay 33–P07R2 to the −48 v. D.C. source in FIG. 33 to energize both relays 33–P07R1 and 33–P07R1 and 33–P07R2. When relay 33–P07R1 is energized, it will cause the operation of relay 34–TOHR, 34–TSR, 44–UDR in the same manner that they were operated in connection with the regular dialing operation as described under section 3. When relay 33–P07R2 is energized, it will release 33–P0R by opening the locking path to the relay 33–P0R at contacts 33–P07R2–7 and relay 33–P07R2 will lock up through its own contacts in a circuit from ground (FIG. 33), the now closed break contacts 33–50–RES–7, now closed break contacts 33–38–ABR–1, diode 33–D19, now closed break contacts 33–48–TORA–7 and its own contacts 33–P07R2–2 and break contacts 33–P068R–6. When relay 34–TOHR is operated, the circuit action that follows the operation of this relay is the same as that described under the dialing operation in section 3 when relay 34–TOHR was operated, until the first digit is to be presented to the telephone subscriber's subset. In this case the direct distance dialing number is not read from the tape since the tape is not being fed past the reader, but rather the direct distance dialing number of the intercept terminating station is dialed under control of the intercept stepping switch 27–INSS which in its ARC No. 5, as shown on FIG. 53, has the terminals TP–1 to 10 connected to the terminals TP–11 to 20 in such a manner as to apply ground from the sending or originating subscriber's set, as shown in FIG. 53, through contacts 53–TAXA–2 and the now closed make contact 53–DM–11 (the subscriber's set being in dial mode) and now closed make contacts 53–36–ITRA–6 to the common brush of 53–INSS–ARC–5 and through the contact in Position 1 of this intercept stepping switch 53–27–INSS–ARC–5 to one of the leads connected to the terminals TP–11 to 20 on FIG. 53, thus, to selectively supply ground to one of the terminals TK–20 to TK–29 which are connected into the subscriber's set. When the subscriber's set requests the next digit, as was described in connection with the dialing operation in section 3, it will step the intercept stepper switch 27–INSS to position 2 and will continue to step the intercept stepping switch 27–INSS, step-by-step, until the stepper switch has arrived in position 11. The circuit for intermittently operating the intercept stepper switch 27–INSS originates at ground in the sending subscriber's set shown in FIG. 27 through diode 27–D11, now closed make contacts 27–36–ITRA–10, now closed break contact 27–38–ABR–8, and the winding of the intercept stepper switch magnet 27–INSS–MAG to −48 v. D.C. source in FIG. 27.

By reference to FIG. 37 it will be seen that when the intercept stepper switch 27–INSS moves into position 5, it will complete a circuit to operate the lower notch stepping switch magnet 37–LNSS by connecting the ground associated with ARC–3 of 37–27–INSS through the common brush and contact 5 of ARC–3 of 37–27–INSS through the winding of the lower notch stepping switch magnet 37–LNSS to −48 v. D.C. source in FIG. 37. As the intercept stepping switch 27–INSS moves into position 6, it will break the circuit to the lower notch stepping switch magnet 37–LNSS which has just been described. This will cause the lower notch stepping switch 37–LNSS to step into position 1 thereby to record that an attempt has been made to reach the intercept direct distance dialing terminating station.

When the intercept stepper switch 27–INSS moves to position 11, relay 33–P07R1 will be de-energized since the operating circuit to it had been broken by the operation of relay 36–ITRA in opening contacts 33–36–ITRA–11 and relay 33–P07R1 was held operated through the intercept stepper switch 33–27–INSS–ARC–2 in positions 1 to 10 and through the closed contacts 33–36–ITRC–12 and 33–P068R–4. Thus, when the intercept stepper switch reaches its 11th position, the circuit for holding relay 33–P07R1 operated, will be broken and in releasing relay 33–P07R1 will open its contact 34–33–P07R1–12 to release the dial mode relay 34–DM in the subscriber's set. After this occurs, the transmitting station will wait for an answer-back signal as described in the next section under Answer-Back Received in Response to the Calling of an Intercept Number.

*(13) Answer-Back Received in Response to Intercept Number*

At this point in the operation, the direct distance dialing number of the intercept station's terminating subscriber's set has been dialed and the transmitting station is waiting for an answer-back. When the receiving set at the intercept station goes off-hook, a circuit will be completed, similar to that completed when the terminating station was called under the dialing operation as described in section 3, that is, relay 38–ABR will be operated by the circuit action in the sending or transmitting subscriber's set. When the relay 38–ABR is operated, it will unblind the monitor teletypewriter apparatus as described in connection with the dialing operation in section 3 and will also remove the shunt from the monitor line relay 35–MLR as described hereinbefore and will also release relay 33–P07R2 by opening its contacts 33–38–ABR–1. The intercept stepping switch 27–INSS will also be removed from control of the sending subscriber set by the opening of the break contacts 27–38–ABR–8 of the answer-back relay. The de-energization of relay 33–P07R2 will cause its break contacts 27–33–P07R2–5 to re-close and this will complete the circuit to operate the distributor clutch magnet. The circuit for operating the distributor clutch magnet will extend from ground in FIG. 27 through the now closed break contact 27–33–P07R1–8, now closed stop-run relay make contacts 27–32–SRR–12, the now closed interrupter contact 27–37–LNSS–INT–4, the now closed break contact 27–48–TOTR–9 and the now closed break contacts 27–33–P06R–5, 27–33–P67R–5, 27–53–P3R–5, 27–33–P7R–8, 27–33–P07R2–5, 27–28–R8B–2, 27–36–IDSR–7, now closed make contacts 27–38–ABR–12, now closed break contacts 27–38–CAR–4, 27–50–RES–6, 27–50–SALA–7, 27–50–SALB–5, 27–42–PFR–4, and now closed make contacts 2736–ITRA–4 through the winding of the distributor clutch magnet 27–DCM to the −48 v. D.C. source in FIG. 27.

The energization of the distributor clutch magnet 27–DCM over the circuits just described will start the distributor shaft rotating and on each cycle of the distributor shaft the closing and opening of its contacts 27–AUX–D will repeatedly connect ground in FIG. 27 through the contact 27–DIST–AUX–D, terminal TN–38, closed make contact 27–36–ITRA–12 and the winding of the intercept stepper switch 27–INSS–MAG to the −48 v. D.C. source in FIG. 27 to cause this magnet to be energized once for each cycle of the distributor shaft. ARC5–6, 7, 8, 9 and 10 of the intercept stepper switch 35–27–INSS, as shown on FIG. 35, have their common brush connected to ground and have their contacts coded as indicated in FIG. 35 to transmit the mnemonic code for the intercept station by selectively applying ground to the distributor contacts 1 to 5 as shown in FIG. 35. As indicated in FIG. 35, ARC–6 of 35–INSS has its contacts in position 11, 17 and 20 connected to the distributor contact No. 1 through make contact 35–36–ITRC–4, ARC–7 has its contacts in the 11th, 12th, 14th, 15th, 18th and 20th position connected through now closed make contacts 35–36–ITRC–6 to the No. 2 distributor contact. Correspondingly, the other ARCS 8, 9 and 10 will supply ground, at the indicated position thereof, to the distributor contacts 3, 4, and 5, respectively, as the intercept stepper switch 27–INSS steps through positions 11 to 20, thereby to transmit to the sending line relay and monitoring line relay 35–SLR and 35–MLR the mnemonic code for the intercept station.

When the intercept stepper switch 27–INSS is stepped into position 20, it will complete a circuit from ground (FIG. 33) through the now closed break contact 33–50–RES–7, the common brush of 33–27–INSS–ARC–2 to the contacts in positions 20 to 25 thence through the winding of relay 36–IDSR to the —48 v. D.C. source in FIG. 36 to energize relay 36–IDSR. When relay 36–IDSR is energized, it will open its contacts 27–36–IDSR–7 to break the circuit to the distributor clutch magnet 27–DCM. As soon as the distributor clutch magnet 27–DCM is released, transmission to the line and monitor over the monitor line relay 35–MLR and sending line relay 35–SLR will cease and the transmitting station will wait for confirmation of the completion of transmission of this mnemonic code to the intercept station.

(14) *Confirmation Received in Response to Intercept Mnemonic*

As described hereinbefore, the direct distance dialing number of the intercept station has been transmitted to the line and upon receipt of the answer-back and consequent energization of relay 38–ABR, the mnemonic code for the intercept station has been transmitted and the transmitting station is waiting for a confirmation signal to be received from the intercept station. If the intercept station has been reached through the direct distance dialing network, the receiving relay 38–REC will be momentarily operated in the teletypewriter apparatus at the transmitting station thereby to operate relay 38–CFR as described in connection with confirmation received in Section 5 hereinbefore. When confirmation relay 38–CFR is energized, it will cause the lower notch stepper switch 37–LNSS to return to its home or 11th position by completing a circuit from ground in FIG. 37 through the common brush of 37–LNSS–ARC–2 and contacts 1 to 10 then through the now closed make contact 37–38–CFR–1 and the now closed break contacts 37–33–P07R2–6 and the interrupter contact 37–LNSS–INT–2 to the winding of the magnet 37–LNSS and then to —48 v. D.C. source in FIG. 37. The relay 38–CFR on becoming energized will lock up through its own contacts in a path from ground (FIG. 38) through now closed make contacts 38–CFR–5 and 38–34–TOHR–11 and thence through the winding of the relay 38–CFR to the —48 v. D.C. source in FIG. 38. Energization of the relay 38–CFR will also open its shunting contact 48–38–CFR–7 to add the resistor 48–R3 to the timer relay circuit so that the timer relay circuit will now take 45 seconds to time out rather than 11 seconds. In addition the operation of the relay 38–CFR will re-establish the circuit to the distributor clutch magnet 27–DCM which had been interrupted upon the energization of relay 36–IDSR. This re-establishment of the circuit to the distributor clutch magnet 27–DCM will be effected upon the closure of make contacts 27–38–CFR–11 which are connected in parallel with the contacts 27–36–IDSR–7. The operation of the distributor clutch magnet 27–DCM will initiate a cycle of rotation of the distributor shaft and, with the intercept stepper switch 27–INSS in position 20, its arcs 35–27–INSS–ARCS 6, 7, 8, 9 and 10 will code the distributor contact to send the "FIGURES" combination to the line and the monitor. When the distributor, in this cycle of rotation, closes its auxiliary contacts 27–DIST–AUX–D, the intercept stepper switch magnet 27–INSS–MAG will be energized through closed contacts 27–36–ITRA–12 and the closed make contacts 27–38–ABR–8 and in addition the relay 33–P07R2 will be operated in a circuit from the auxiliary contact 27–DIST–AUX–D terminal TN–38, now closed make contacts 27–36–ITRA–12, now closed make contacts 27–38–CFR–3 and 27–36–IDSR–12 and diode 27–D16, terminal TM–35 on FIG. 27 and 33 through the winding of the relay 33–P07R2 to —48 v. D.C. source in FIG. 33.

When relay 33–P07R2 is thus energized, it will open the operating path to the distributor clutch magnet 27–DCM by opening its contacts 27–33–P07R2–5. As soon as the distributor, in this cycle of operation, re-opens its auxiliary contacts 27–DIST–AUX–D, the circuit to the intercept stepper switch magnet 27–INSS–MAG will be broken and consequently the stepper switch 27–INSS will step to its 21st position. In moving into its 21st position, the intercept stepper switch 27–INSS will complete a circut from ground in FIG. 27 through its common brush, 27–INS–ARC–1 and contacts 21 to 25 on this ARC of the stepper switch through the interrupter contacts 27–INSS–INT–2 to the intercept stepping switch magnet 27–INSS–MAG thus to drive the stepper switch 27–INSS back to its home or 26th position.

When the stepper switch 27–INSS arrives in its home position, the circuit from ground in FIG. 33 through the closed break contact 33–50–RES–7, and the common brush of 33–27–INSS–ARC–2 to the contacts 20 to 25 of this ARC of the interrupter stepper switch will be broken and consequently relay 36–IDSR will be de-energized. When the relay 36–IDSR is de-energized, it will open its contacts 27–36–IDSR–12 to open the circuit through terminal TM–35 on FIGS. 27 and 33 thereby to de-energize the relay 33–P07R2. When relay 36–IDSR is de-energized, it will also open its contacts 36–IDSR–8 thus to release relays 36–ITRA and 36–ITRC. When relays 36–ITRA and 33–P07R2 are de-energized together with relay 36–IDSR, the circuit path to the reader clutch magnet 27–RCM will be re-established by the closing of the break contacts 27–33–P07R2–5, 27–38–CFR–11 and 27–38–ABR–12 and as a result of the energization of the reader clutch magnet the tape will be advanced.

Since the tape was stopped with the first digit of the DDD number of the addresses to whom a connection had been attempted to be established in line with the sensing pins and the "FIGURES" code combination has been transmitted, the reader contacts will now read the tape and due to the fact that the relay 34–TSR is energized at this time the reader contacts will close the circuit from ground through the reader contacts 1 to 5 and thence over the make contacts 4, 6, 8, 10 and 2 of relay 35–34–TSR to the numbering relays 35–NR1 to 35–NR5, respectively, to energize these relays and cause them to close their contacts 35–NR1–9, 35–NR2–9, 35–NR3–9, 35–NR4–9, 35–NR5–9, selectively. The relays 35–NR1 to 35–NR5 will thus, under control of the reader contacts 1 to 5 shown in FIG. 35 complete circuits from ground in FIG. 35 through their respective closed contacts and the now closed break contacts 35–36–ITRC–4, 6, 8, 10 and 7 of relay 35–36–ITRC to the distributor contacts 1 to 5 shown in FIG. 35 which will apply this ground to the monitor line relay 35–MLR and sending line relay 35–SLR to cause transmission of the direct distance dialing number of the party to whom a unsuccessful attempt has been made to complete connection. This operation will continue until the complete direct distance dialing number of the called terminating station and the mnemonic code for the called terminating station have been transmitted over the line to the intercept station.

At the end of the mnemonic code for the called terminating station the "SPACE" character code combination will be sensed at the end of the mnemonic code to operate relay 35–NR3 without operating any other of the numbering relays 35–NR1, 35–NR2, 35–NR4 or 35–NR5 to complete a circuit from ground in FIG. 33 through the now closed break contact 33–50–RES–7 the reader contact 33–AUX–B, terminal TE–8 on FIGS. 33 and 53, the now closed make contacts 53–35–NR3–12, and the now closed break contacts 53–35–NR4–10, 53–35–NR5–10, 53–35–NR1–6, and 53–35–NR2–10, closed make contacts 53–34–ONHR–8 and the winding of relay 53–P3R to the —48 v. D.C. source in FIG. 53. When, at the end of this cycle of operation the distributor contacts 27–DIST–AUX–D open with relay 53–P3R operated, relay 36–ITRB will be released by the opening of the 27–AUX–D contacts. When relay 53–P3R is operated, it will lock operated through its own contacts 53–P3R–12 so long as the relay 34–ONHR holds its contact 53–34–

ONHR-8 closed. When relay 53-P3R is operated, it will release the reader clutch magnet 27-RCM by breaking its break contacts 27-53-P3R-5 thus, to stop the reader at this position. The energization of relay 53-P3R will also open the locking path to relay 34-TSR by opening its break contacts 34-53-P3R-7.

Upon its release, as just described, relay 36-ITRB will close its contacts 41-36-ITRB-9 and due to the fact that the confirmation relay 38-CFR had been operated and had closed its contacts 41-38-CFR-12, the upper notch magnet 41-UNM will be energized as will be the slow to operate upper notch memory relay 41-UNMR. The relay 41-UNMR being slow to operate will not operate until after the upper notch magnet 41-UNM has caused a pierce to be formed in the sixth level control hole of the tape to record in the tape the receipt of confirmation whereupon the upper notch magnet 41-UNM will be de-energized due to the opening of the contact 41-UNMR-3. In addition to opening the circuit path to the upper notch magnet 41-UNM, the operation of the relay 41-UNMR will close a circuit to energize the pull back relay 42-PBRA in a circuit from ground in FIG. 42 through the now closed make contacts 42-41-UNMR-8, now closed break contacts 42-33-P7R-4 and 42-33-P06R-8 and 42-PBRB-5 through the winding of the relay 42-PBRA to -48 v. D.C. source in FIG. 42. The operation of the circuit will now be the same as that described under the pull back after confirmation in section 6 hereinbefore.

(15) *Answer-Back Not Received*

In the event that the attempt to call a particular terminating station has been unsuccessful and an answer-back signal is not received at the completion of three attempts to dial the direct distance dialing number, the "LETTERS" code combination at the end of the DDD number sequence will be sensed with no control holes in the tape. Consequently, relays 28-R0, 28-R7, and 28-LUR will be released due to the fact that the reader sensing contacts on FIG. 35 will not complete a circuit to these three relays. When relay 28-LUR is released, it will break the holding path to relay 33-P07R1 by opening its make contacts 33-28-LUR-9 and will cause the release of relay 37-LBR by opening its make contacts 37-28-LUR-4. In addition the de-energization of relay 28-LUR will open its make contacts 37-28-LUR-3 to remove the shunt from around relay 37-LURB. The release of relay 37-LBR together with relay 28-LUR will remove the shunt from around the distributor contacts SS and 1 to 5 as shown on FIG. 35 by opening the make contacts 35-37-LBR-12 and 35-28-LUR-8.

In this sensing cycle of the reader when the reader contacts 33-AUX-B re-close, a path will be established from ground in FIG. 33 through the break contacts 33-50-RES-7 the reader contacts 3-AUX-B, the diode 33-D17, break contacts 33-28-R7-4, 33-28-R0-6, 33-28-R6-10 and the winding of the relay 33-PNR to the -48 v. D.C. source in FIG. 3. When the relay 33-PNR is energized, it will lock operated through its own make contact 33-PNR-3 and the break contacts of the recognition relays 33-28-R6-7, 33-28-R7-7, 33-28-R0-8, 33-28-R8A-8. The release of relay 33-P07R1 will open operating path which had been established to the reader clutch magnet 28-RCM by opening its contacts 27-33-P07R1-10. The release of relay 33-P07R1 will also break the circuit to the relay 34-DM in the subscriber's subset by opening its contacts 34-33-P07R1-12. As a result of the de-energization of the reader clutch magnet 27-RCM, the reader shaft will stop rotating and at this time the sending set will wait up to 11 seconds for an answer back from the terminating equipment to which a call has been directed.

Since the line following relay 39-LFR will be energized, in following the sending line relay 35-SLR, contacts 48-39-LFR-5 will be opened to remove the shunt from around the capacitor 48-C1, thus to start the capacitor 48-C1 to be charged. In about 11 seconds the capacitor 48-C1 will reach about 72 volts and will fire the tube 48-T1 thereby to operate the relay 48-TORA. At this point it should be noted that normally the receipt of the answer-back signal would start the transmitter and the sending line relay 35-SLR would follow distributor signals, as described in section 4 thus, operating relay 39-LFR to disable, with each character, the timer circuit shown in FIG. 48.

When relay 48-TORA operates, it will open the locking path to relay 33-P07R2 by opening its break contact 33-48-TORA-7 and it will also open the path to relay 34-TOHR by opening its break contacts 34-48-TORA-5 and will lock operated through its own contacts 48-TORA-2 in a circuit from ground in FIG. 48 through make contacts 48-34-ONHR-10, break contacts 48-36-ITRA-9, make contacts 48-TORA-2 and through resistance 48-R5 and the winding of the relay 48-TORA to -120 v. D.C. source in FIG. 48. The release of relay 34-TOHR will open its contacts 34-TOHR-7 to de-energize relay 34-TOHA and by opening its contact 34-TOHR-9 will release relay 34-ONHR. In addition, the release of relay 34-TOHR will open its make contacts 34-TOHR-1 to release the off-hook relay 34-OH in the subscriber's subset. When relay 34-ONHR is released, it will open the locking path for relay 48-TORA by opening its make contacts 48-34-ONHR-10 so that when relay 34-ONHR, which is the on-hook relay, is released, relay 48-TORA will be de-energized.

Figure 36:
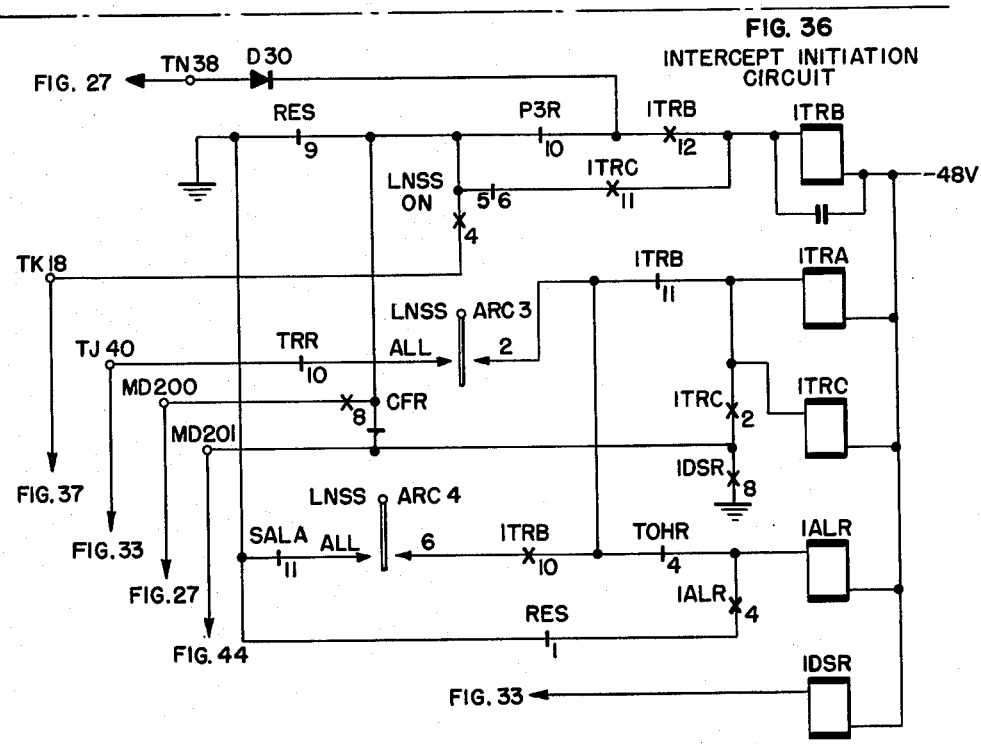
Figure 38:
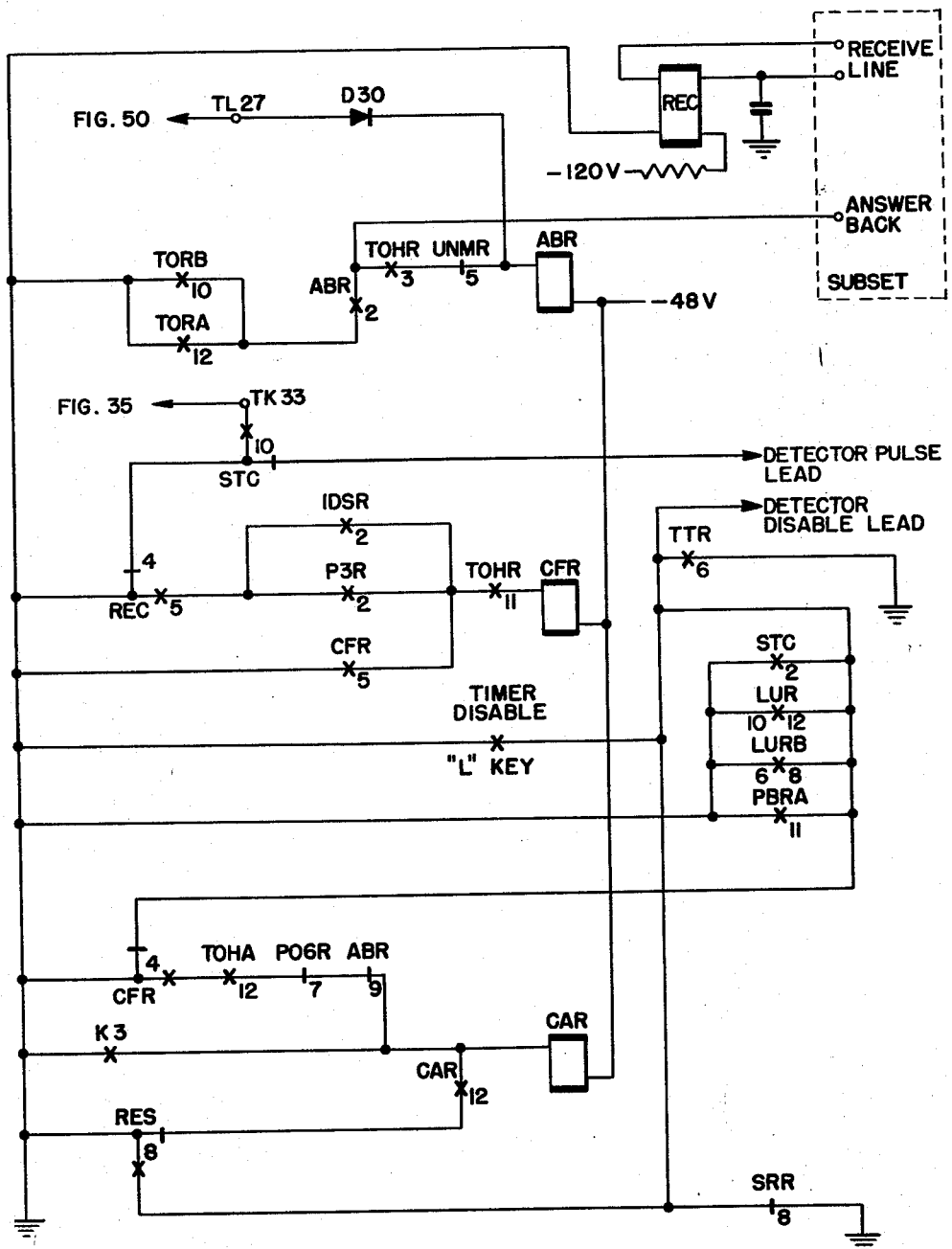
Figure 39:
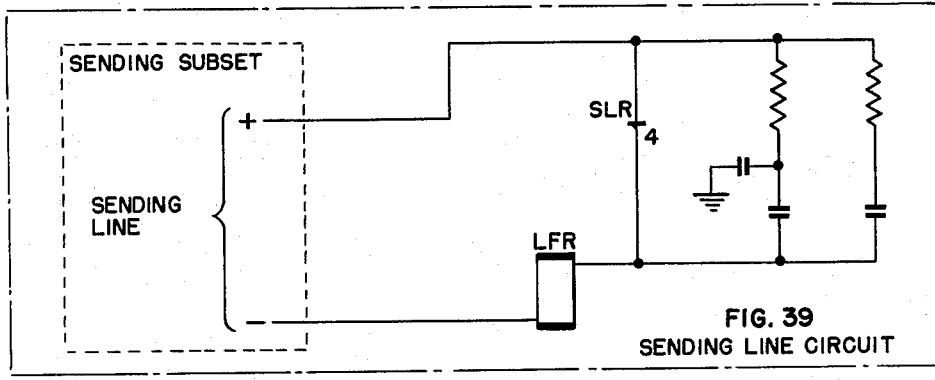
Figure 40:
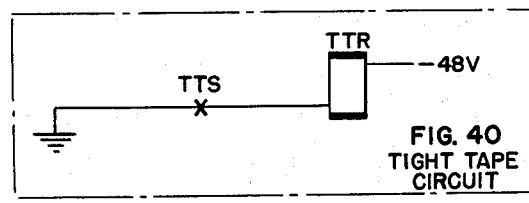
Figure 41:
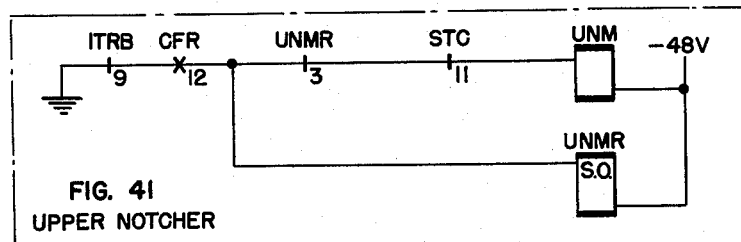
Figure 42:
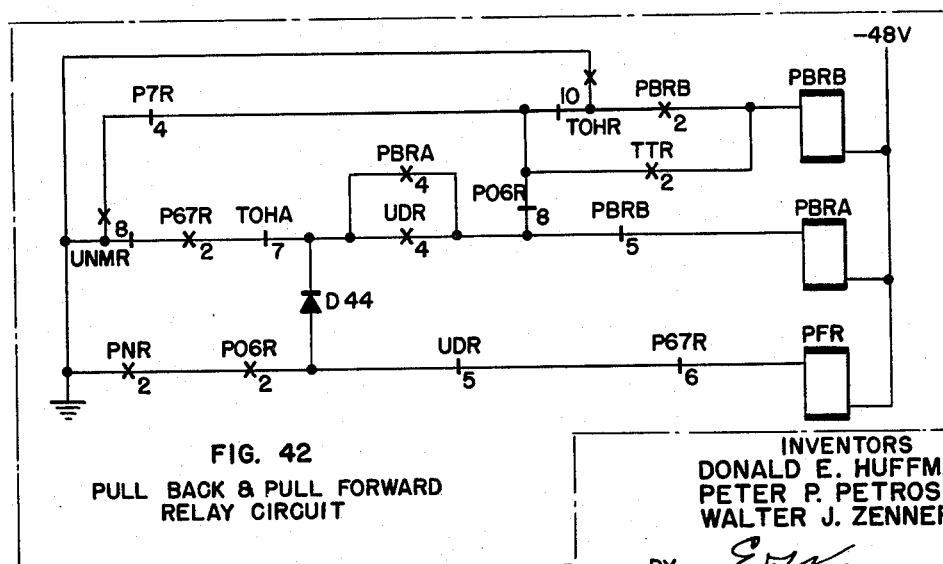
Figure 46:
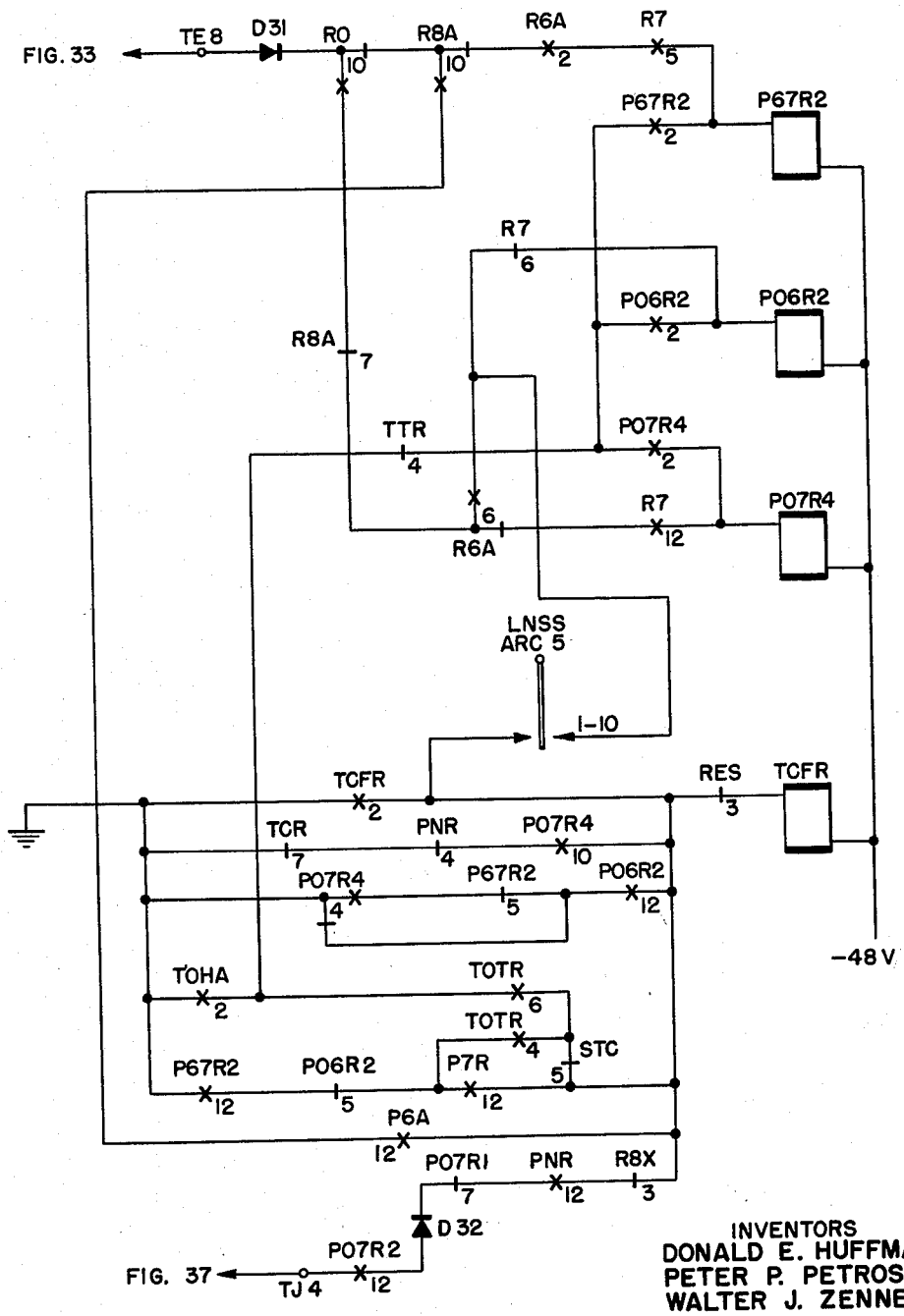

When relay 48-TORA was operated and as a consequence relay 33-P07R2 was released as just described hereinbefore, a circuit was completed through break contacts 27-33-P072-5 to operate the reader clutch magnet 27-RCM thereby to cause the tape to be advanced through the reader and the reader will sense the mnemonic code (as included in the bracket C of FIG. 2), to encode the distributor contacts 1 to 5 on FIG. 36. However, if relay 38-ABR has not been energized, due to the failure of an answer-back signal to be received at the transmitting station, its contacts 47-38-ABR-5 will remain closed and although the monitoring line relay 35-MLR operates under control of the contacts 1 to 5 in FIG. 35, its contacts 47-35-MLR-3 will be shunted by the closed contact 47-38-ABR-5 and the printer selector magnets shown in FIG. 47 will be held energized. This blinds the monitoring teletypewriter equipment.

In view of the fact that relay 34-TOHR has been released, the off-hook relay 34-OH in the subscriber's set will be de-energized, as described hereinbefore, and consequently, although the sending line relay 35-SLR operates, the on-hook condition of the subscriber's set blocks the application of pulses through the transmission line and the printer of the originating station will be blinded by now closed break contacts 47-38-ABR-5. As the tape continues to advance, the "SPACE" code combination, at the end of the mnemonic code, will not initiate a pull back operation such as described in section 6 due to the fact that the operating path to the relay 53-P3R is open at the now open make contact 53-34-ONHR-8.

If a multiple address message is being transmitted, the tape in being fed forward to the point where the second direct distance dialing number (as bracketed under D in FIG. 2), comes into alignment with the sensing pins of the reader and operation will be initiated as described in section 3 under the dialing operation. If the second direct distance dialing number as perforated in the tape causes a connection to be completed to a terminating station, the message will be transmitted to that terminating station as described hereinbefore. If on the first attempt none of the terminating station addressees are reached through the telephone switching system, the tape will continue to advance through the reader until the reader senses the "6" and "7" control holes at the start of the end-of-address sequence as shown under the "LINE FEED" code combination at the start of the portion bracketed F in FIG. 2.

(16) End-of-Address Pull Back

Upon sensing the control holes "6" and "7" of the end-of-address sequence, the reader contacts will complete a circuit from ground in FIG. 28 through terminal MD–147 on FIGS. 28 and 35 thence through the reader sensing contacts 6 and 7 and then through terminals MD–189 and MD–188, respectively, on FIGS. 35 and 28 to energize relays 28–R6 and 28–R7. The operation of relay 28–R6 will close its contacts 28–R6–12 to supply ground to energize relay 28–R6A. When, in this cycle of operation, the reader contacts 33–AUX–B are closed, a circuit will be established to operate relays 33–P67R and 46–P67R–2. The circuit for energizing the relay 33–P67R extends from ground in FIG. 33 through the break contacts 33–50–RES–7 and 33–AUX–B, diode 33–D17, the now closed make contact 33–28–R7–4, now closed break contact 3–28–R0–4, now closed make contact 33–28–R6–6, and the winding of the relay 33–P67R to −48 v. D.C. source in FIG. 33. The circuit for energizing relay 46–P67R–2 will extend from ground in FIG. 33 through the break contacts 33–50–RES–7, the reader contacts 33–AUX–B, terminal TE–8 on FIGS. 33 and 46, diode 46–D31, the now closed break contacts 46–28–R0–10 and 46–28–R8A–10 and now closed make contacts 46–28–R6A–2 and 46–28–R7–5 through the winding of the relay 46–P67R–2 to −48 v. D.C. source in FIG. 46.

At this time, the operation of the reader will be interrupted by breaking the circuit to the reader clutch magnet 27–RCM at now open break contact 27–33–P67R–5. The operation of the relay 33–P67R will also open its break contacts 33–P67R–4 to open the locking circuit to the relay 33–P7R and will also cause the operation of the pull back relay A 42–PBRA. The circuit for operating relay 42–PBRA extends from ground in FIG. 42 through the now closed break contacts 42–41–UNMR–8, now closed make contacts 42–33–P67R–2 now closed break contacts 42–34–TOHA–7, now closed make contacts 42–44–UDR–4, now closed break contact 42–PBRB–5 and the winding of the relay 42–PBRA to −48 v. D.C. source in FIG. 42. When relay 42–PBRA is energized, it will close a circuit from ground in FIG. 43 through the now closed break contacts 43–33–P06R–10 and make contacts 43–42–PBRA–2 and the winding of the pull back magnet 43–PBM to the −48 v. D.C. source in FIG. 43. The relay 42–PBRA will lock operated through its own contacts 42–PBRA–4, the tape will be pulled back through the reader until the tape becomes taut between the reader and the feed out tape feed wheel thereby to operate the tight tape switch contacts 40–TTS when the tape returns to its original starting position.

The closure of the tight tape switch 40–TTS will energize the relay 40–TTR by completing a circuit from ground through the winding of the relay to the −48 v. D.C. source in FIG. 40. The energization of the tight tape relay 40–TTR will complete a circuit from ground in FIG. 42 through now closed break contacts 42–41–UNMR–8, now closed make contacts 42–33–P67R–2, now closed break contacts 42–34–TOHA–7, now closed make contacts 42–PBRA–4, now closed break contacts 42–33–P06R–8, now closed make contacts 42–40–TTR–2 and the winding of the relay 42–PBRB to −48 v. D.C. source in FIG. 42. The energization of the tight tape relay 40–TTR will also release relay 44–UDR which is the unsent direct distance dialing number relay, by opening its contacts 44–40–TTR–5. The operation of the relay 42–PBRB will complete a circuit to energize the reader clutch magnet 27–RCM in a circuit from ground in FIG. 27 through the now closed break contacts 27–33–P07R1–8, now closed make contacts 27–32–SRR–12, now closed break contacts 27–LNSS–INT–4, now closed break contacts 27–48–TOTR–9 now closed break contacts 27–34–TOHA, now closed break contacts 27–44–UDR–6, now closed make contacts 27–42–PBRB–4, now closed break contact 27–38–CAR–4 now closed break contact 27–50–RES–6, 27–50–SALA–7, 27–50–SALB–5, 27–42–PFR–4, 27–36–ITRA–4, 27–47–PSR–10, and the winding of the reader clutch magnet 27–RCM to −48 v. D.C. source in FIG. 27. Energization of the relay 42–PBRB also opens the path from ground through to relay 42–PBRA by opening its break contacts 42–PBRB–5. When relay 44–UDR is released, it will complete an operating path for the reader clutch magnet 27–RCM shunting the now open contacts 27–33–P67R–5 by closing its break contacts 27–44–UDR–7. When relay 42–PBRA is released, it will open the operating path which had been established to the pull back magnet to de-energize the pull back magnet by opening its contacts 43–42–PBRA–2.

The operation of the reader clutch magnet 27–RCM will start the tape advancing through the reader. As the first code combination sensed by the reader contains no control holes, relays 33–P67R and 46–P67R–2 will be released due to the fact that the contacts 46–28–R7–5 are opened and the tight tape relay contacts 46–40–TTR–4 have been opened as well as make contacts 33–28–R6–6. With this condition prevailing, the reader will advance the tape and count the dialing attempts as described hereinbefore in section 7 under counting dialing attempts and will retransmit the direct distance dialing number as described under the dialing operation in section 3.

(17) Confirmation Not Received

In the event that the transmitting station has completed dialing a direct distance dialing number and has received an answer-back signal resulting in the operation of relay 38–ABR, the transmitting station will send the mnemonic code to the terminating station to which it has been connected. At the end of transmission of the mnemonic code, the reader will sense the "SPACE" code combination at the end of the mnemonic code sequence to operate relay 35–NR3 in in the manner described hereinbefore in connection with the reading of the end of the mnemonic code. As also described hereinbefore, at the end of the reader cycle when the reader contacts 33–AUX–B re-close a circuit will be completed from ground in FIG. 33 through the break contact 33–50–RES–7, the break contacts 33–AUX–B, terminal TE–8 on FIGS. 33 and 53 and thence through now closed break contacts 53–35–NR–10 now closed make contacts 53–35–NR3–12, break contacts 53–35–NR5–10, 53–35–NR1–6, 53–35–NR2–10, and now closed make contact 53–34–ONHR–8, through the winding of the relay 53–P3R to the −48 v. D.C. source in FIG. 53. Relay 53–P3R, in operating, will lock operated over its own contacts 53–P3R–12 and in operating, relay 53–P3R will open its break contacts 27–53–P3R–5 to de-energize the reader clutch magnet 27–RCM. The operation of relay 53–P3R will also open its break contact 34–53–P3R–7 to open the locking path to the transmitter shift relay 34–TSR thereby releasing this relay which, in turn, in releasing, will release relay 35–NR3 by re-opening its make contacts 35–34–TSR–8. At this point the reader clutch magnet 27–RCM being de-energized, the reader shaft will stop and the transmitter will also stop transmitting.

At this time the originating, or transmitting, station will wait up to 11 seconds for confirmation from the terminating station. When the originating station fails to receive a confirmation signal, the timer relay circuit tube 48–T1 will fire and operate relay 48–TORA in the same manner as described under the section on answer-back not received, that is, in section 15. As described in connection with the answer-back not received, the operation of the relay 48–TORA will release the relay 34–TOHR which in turn will release relay 34–TOHA. However, since an answer-back has been received and relay 38–ABR has been energized, the relay 38–ABR must be released and is effected on the release of relay 34–TOHR which will open its make contacts 38–34–TOHR–3 to release the answer-back relay 48–ABR. When relay 34–TOHR was released, it released relay 34–ONHR, by opening its contacts 34–TOHR–9, and relay 34–ONHR will in turn release relay 53–P3R by opening its contacts 53–34–ONHR–8.

When relay 53–P3R is released, it will reestablish an operating path for operating the reader clutch magnet 27–RCM by closing its break contacts 27–53–P3R–5 to start the tape advancing through the reader head. At this time the line and the monitor circuits will be blinded due ot the fact that the relay 38–ABR has been released and shorts out the reader selector magnets in FIG. 47 and the fact that the relay 34–TOHR in being released opened the circuit to the off-hook relay 34–OH in the subscriber's subset. The tape will thus be advanced to either sense a succeeding direct distance dialing number or will advance to the beginning of the end-of-address sequence whereupon the control holes at the "6" and "7" levels will be sensed to initiate a pull back operation as described under End-of-Address Pull Back in section 16.

(18) *Answer-Back Not Received in Response to Intercept Number*

In section 12 the dialing of the intercept direct distance dialing number was described and it was assumed that the intercept station had been properly connected to receive the message which could not be sent in the normal manner. In that operation as described under the dialing of the intercept number, the number was dialed and in being dialed the stepper switch for intercept 27–INSS arrived on contact 11 of its banks of arcs and the lower notch stepping switch 37–LNSS was on position 1 and the reader clutch was released. As described hereinbefore the answer-back signal was received and consequently, the message was transmitted to the intercept terminating station. However, in the event that an answer-back is not received, the timing circuit will time out and tube 48–T1 will fire, as described previously, to operate relay 48–TORA. The firing of the tube 48–T1 and consequent operation of relay 48–TORA will effect approximately the same operation as was effected in connection with the answer-back not received described in section 15 hereinbefore. Relay 48–TORA in operating releases the slow to release relay 34–TOHR which in turn release relays 34–TOHA and 34–ONHR. In this case however, when relay 34–TOHR was released it closed an operate path to the intercept stepper switch magnet 27–INSS–MAG in a path from ground (FIG. 27) through make contact 27–INSS–ON–1 now closed make contact 27–48–TORA–4, now closed break contact 27–34–TOHR–6 and the intercept stepper switch interrupter contact 27–INSS–INT and the winding of the intercept stepper switch magnet 27–INSS to –48 v. D.C. source in FIG. 27. Since the intercept stepper switch off-normal contact 27–INSS–ON is closed whenever the stepper switch is out of its normal position this circuit will be maintained and repeatedly opened and closed by the interrupter contact 27–INSS–INT until the intercept stepper switch 27–INSS arrives at its home position.

As the brush for the intercept stepper switch 27–INSS in ARC–1 reaches position 21 relay 48–TORA will be released due to the breaking of the circuit from ground (FIG. 27) through the 27–INSS–ARC–1 contacts 1 to 20 and terminal TN–23 on FIGS. 27 and 48, thus breaking the locking path to relay 48–TORA. Due to the fact that contacts 21 to 25 of 27–INSS–ARC–1 are connected in the circuit to the interrupter switch magnet 27–INSS–MAG through the contacts 27–INSSS–INT, the intercept stepper switch will be stepped to its home or 26th position. In its home position the intercept stepper switch 27–INSS will close its break contact 27–INSS–ON–3 and since at this time relay 36–ITRC which is the intercept transfer relay 3, is energized and since the stepper switch 37–LNSS is in its No. 1 position where its off normal make contact is closed, a circuit will be completed from ground through the now closed break contact 27–INSS–ON–3, now closed make contact 27–36–ITRC–1 and 27–37–LNSS–ON–N–2, through the closed break contact 27–34–TOHR and the intercept stepper switch interrupter contact 27–INSS–INT to the intercept stepper switch magnet 27–INSS–MAG to cause this switch to step to position 1.

In the event that, on the first and on the five succeeding attempts, to reach the intercept terminating station, no circuit is completed through to this station, the cycle of operation just described will be repeated and the lower notch stepping switch 37–LNSS will be stepped through five positions. Each time an attempt is made to reach the intercept terminating station by dialing the direct distance dialing number of it, the operation as described under dialing intercept DDD number in section 12 will be repeated and if the originating station fails to receive an answer-back after five attempts the action that follows is described hereinafter under section 26 Intercept Not Reached Alarm.

(19) *Confirmation Not Received in Response to Intercept Mnemonic*

If it be assumed that, on the dialing of the intercept direct distance dialing number, a circuit was completed to a terminating station and an answer-back signal has been received, then the answer-back relay 38–ABR will be operated as described in previous sections. After the receipt of the answer-back signal and the consequent operation of relay 38–ABR the intercept mnemonic code sequence will be transmitted over the line and at the completion of the transmission of the intercept mnemonic the transmitting station will wait for a confirmation signal. At the completion of the transmission of the mnemonic code sequence, the intercept stepper switch 27–INSS will have been stepped to position 20 to complete a circuit from ground in FIG. 33 through now closed break contact 33–50–RES–7 and the common brush of ARC–2 of the intercept stepper switch 33–27–INSS in position 20 to the relay 36–IDSR and thence to the –48 v. D.C. source in FIG. 36 to operate the intercept distributor relay 36–IDSR. Since under the condition assumed at the present time, the transmitting station fails to receive a confirmation signal, the timer circuit shown on FIG. 48 will become effective to cause the firing of tube 48–T1 and the resultant operation of relay 48–TORA. The action that follows this will be the same as described in setcion 18 under Answer-Back Not Received in Response to Intercept Number except that the release of relay 48–TORA will release relay 38–ABR by opening its contacts 38–48–TORA–12. Under these conditions the intercept stepper switch 27–INSS will step to its home position and in moving out of position 25 will release relay 36–IDSR by opening the circuit to it in moving out of position 25 of ARC–2 of 33–27–INSS.

(20) *Foreign Interconnect or Broadcast Messages With Call Direction Codes*

In the description thus far it has been assumed that all of the messages to be transmitted have been directed to terminating stations on this system or upon failure of the completion of a connection to a terminating station on this system the messages have been transmitted to the intercept terminating station. If it be assumed that a message is to be sent to a station not on this system, i.e., a system to which the present system has access but at a single point rather than access to all of the stations on the foreign system, the tape will be prepared in a slightly different manner. When such connections are to be made a tape is prepared, under control of the Codomat card or under control of the operator, with a direct distance dialing number followed by either a mnemonic code sequence of pseudo-mnemonic code sequence. If the message is to be a broadcast message, that is, a message simultaneously transmitted to a number of terminating stations on a system other than the present system, then the Codomat card is prepared, having on it control perforations that will cause the tape to be perforated with the direct distance dialing number address of a terminating station which can connect into a broadcast type of circuit. This direct distance dialing number will then be followed by a mnemonic code sequence indicating that a broadcast message is to be sent, such for example as the sequence W, B, C, S, T, D, L, SPACE and each of these characters comprising the mnemonic code for the broadcast circuit will have perforations in the "7" level. The tape may then be perforated with a call direction code such as A, B, "LETTERS" having the "6" level perforated for each of the characters of this sequence. This will then be followed by the mnemonic code for the terminating station to which the message is to be sent, followed by a "SPACE" code. This may then be followed by the call direction code and mnemonic code of a second station to which the broadcast message is to be sent such as, K, Q, "LETTERS" B, T, W, O, A, C, L, 'SPACE." This may then be followed by the end-of-address code sequence including the time and address of the transmitting station in mnemonic code which may be put into the tape under control of the end-of-address key and then the text of the message may be put into the tape followed by the end-of-message code sequence as described in connection with the regular processing of a message to be delivered to a terminating station on this system.

If it is desired to connect to a foreign system not on this sytem, the tape is prepared, either under keyboard control or under Codomat control, to insert in the tape, the direct distance dialing number of the relay station to which the message is to be transmitted and this code sequence will be the same, as previously described, then the pseudo-mnemonic code for the relay station to whom the message is addressed will be perforated in the tape together with the "7" hole for each character of the pseudo-mnemonic including the "SPACE" code combination at the end of the pseudo-mnemonic code sequence. This will be followed by the call directing code of the addressed station comprising three characters each of which also has the "6" control hole perforated in alignment with it and the mnemonic code for the called station will be followed by the end-of-address code sequence, the text, and the end-of-message sequence.

When tapes of this type are fed into the reader, the pseudo-mnemonic codes are transmited to a relaying station which would be a communications center having translator equipment for translating these pseudo-mnemonic codes for processing in systems other than the present type of system. When this tape is fed through the reader at the originating station, an attempt will be made to complete a circuit through the telephone switching system to the addressee as represented by the direct distance dialing number perforated in the tape. If such a connection is made and an answer-back is received, the reader clutch magnet 27-RCM will be operated as described in connection with the dialing attempts in section 3. The distributor contacts as shown on FIG. 35 will then pulse the relays 35-MLR and 35-SLR which are the monitor line relay and the sending line relay. As soon as the reader sensing pins sense a control hole in the "7" level associated with the first character of the pseudo-mnemonic code combination, relays 28-R7 and 28-LUR will be operated in the same manner as was described hereinbefore in connection with these relays. When relay 28-LUR operates, it will partially close the shunt path around the distributor contacts "SS" and 1 to 5, shown on FIG. 35, by closing its make contacts 35-28-LUR-8 and it will also shunt relay 37-LURB by closing its contacts 37-28-LUR-3.

In this cycle of operation of the reader mechanism, when the reader contacts 33-AUX-B close, relay 33-P7R will be operated in a circuit path from ground (FIG. 33) through break contact 33-50-RES-7 through break contact 33-AUX-B, diode 33-D17, now closed make contact 33-28-R7-4 and break contacts 33-28-R0-4 and 33-28-R6-6 through the winding of the relay 33-P7R to —48 v. D.C. source in FIG. 33. When the relay 33-P7R is energized, it will lock operated over its own locking contacts in a circuit from ground in FIG. 33 through the break contacts 33-50-RES-7, break contacts 33-42-PBRB-10

33-P07R1-4, 33-P0R-4, 33-P67R-4, and 33-P068R-10 and its own locking contacts 33-P7R-10.

As the tape continues to be stepped through the reader, the reader contacts will sense the "SPACE" code combination at the end of the pseudo-mnemonic code sequence thereby operating the relay 35-NR3 in a path from ground (FIG. 35) through the reader contact 3, make contact 35-34-TSR-8 which had been closed when the transmitter relay shift 34-TSR was operated due to the sensing of the zero and seven control holes associated with the direct distance dialing number, thence through the winding of the relay 35-NR3 to —48 v. D.C. source in FIG. 35. As described hereinbefore the energization of the relay 35-NR3 will close the operating path to the relay 53-P3R by closing make contact 53-35-NR3-12 since the relay 35-ONHR, that is the off-hook relay, had previously been operated and closed its contacts 53-34-ONHR-8. Upon energization of the relay 53-P3R it will lock up through its own locking contacts 53-P3R-12 and the closed make contacts 53-34-ONHR-8. The energization of the magnet 53-P3R will open its break contacts 27-53-P3R-5 to break the operating path to the reader clutch magnet 27-RCM and it will also release relay 34-TSR by opening its break contacts 34-53-P3R-7. The release of relay 34-TSR will release relay 35-NR3 by opening its make contacts 35-34-TSR-8.

At this point in the operation the originating, or transmitting station will wait for the confirmation of the reception of the pseudo-mnemonic code combination sequence and the operation that follows will be the same as described under Confirmation Received, in Section 5, until the relay 41-UNMR is operated as a result of the receipt of confirmation from the called or addressed relaying station. Of course, at this time the operation of the upper notch magnet relay 41-UNMR occurred simultaneously with the operation of the upper notch magnet 41-UMN. However, since the relay 41-UNMR is slow to operate, it will complete pull up after the operation of the upper notch magnet 41-UNM and thereupon release the upper notch magnet 41-UNM by opening its break contacts 41-UNMR-3. The operation of the upper notch magnet relay 41-UNMR will also bridge the now open break contacts 27-53-P3R-5 by closing its contacts 27-41-UNMR-2 to reoperate the reader clutch magnet 27-RCM.

Since, in the code sequence being discussed herein, the call directing code sequence of characters follows the "SPACE" signal at the end of the pseudo-mnemonic code sequence and since the call directing code characters have associated with them perforations at the "6" level of the tape, the reader in sensing the code combinations for the call directing codes will pulse the monitor line relay and sending line relay 35-MLR and 35-SLR and will operate the relay 28-R6 in a circuit from ground in FIG. 28 through terminal MD-147 and the closed sending contacts for "6" level in FIG. 35, thence through the terminal MD-189 and the winding of the relay 28-R6 to —48 v. D.C. source in FIG. 28. Relay 28-LUR will be pulled up simultaneously with relay 28-R6 in the circuit path as previously described to shunt relay 37-LURB by closing its contacts 37-28-LUR-3.

When the tape advances to the point where the first character following the call directing code sequence is sensed, relays 28-LUR and 28-R6 will be released due to the absence of a control hole in the tape at the "6"

level. The release of relay 28-LUR will remove the shunt around relay 37-LURB by opening its contacts 37-28-LUR-3 thereby permitting relay 37-LURB to be energized. Relay 37-LURB will be operated in a circuit from ground (FIG. 37) through the closed reader contacts 37-AUX-A, now closed break contacts 37-36-ITRB-6, now closed break contacts 37-42-PBRB-7, make contacts 37-38-CFR-2 and the winding of the relay 37-LURB to —48 v. D.C. source in FIG. 37. As soon as relay 37-LURB pulls up, it will lock operated through its own make contacts 37-LURB-2, now closed break contacts 37-42-PBRB-7 and now closed make contacts 37-38-CFR-2 through the winding of the relay 37-LURB to —48 v. D.C. in FIG. 37. The energization of relay 37-LURB will close its make contacts 35-37-LURB-5 to shunt the distributor contacts 1 to 5 and "SS" as shown on FIG. 35.

The tape will continue to advance and since there are no control holes perforated in the tape, relay 33-PNR will be operated in a circuit from ground in FIG. 33 through the now closed break contacts 33-50-RES-7, reader contacts 33-AUX-B, diode 33-D17, the now closed break contacts 33-28-R7-4, 33-28-R0-6, 33-28-R6-10 and through the winding of the relay 33-PNR to the —48 v. D.C. source in FIG. 33. The tape will continue to advance through the characters representing the mnemonic code that follows the call directing code sequence, with the line and monitor blinded due to the shunting of the distributor contacts by the closure of the contacts 35-37-LURB-5.

In the event that the tape format contains a second direct distance dialing number, the tape would advance until the reader contacts sense the "0" control hole of a second DDD number, whereupon, relay 28-R0 would be energized by the closure of the "0" contact of the group of sensing contacts in the reader as shown in FIG. 35 to energize relay 28-R0 in a circuit path from ground in FIG. 27 through the break contact of the key 27-MR terminal, MD-146 on FIGS. 27 and 35 thence through the closed "zero" contacts in FIG. 35, through terminal MD-190 on FIG. 35 and 28, thence through the winding of the relay 28-R0 to the —48 v. D.C. source in FIG. 28. With the relay 28-R0 energized, the closing of the reader contacts 33-AUX-B will complete a circuit from ground in FIG. 33 through the now closed break contacts 33-50-RES-7, the reader contacts 33-AUX-B, the diode 33-D17, the now closed break contact 33-28-R7-4, the now closed make contact 33-28-R0-6, the now closed break contact 33-28-R6-8, the diode 33-D23, and the now closed break contacts 33-P068R-5, and through the winding of the relay 33-P0R to the —48 v. D.C. source in FIG. 33 thereby to operate the relay 33-P0R. Operation of the relay 33-P0R will cause the release of relay 33-P7R by opening its contacts 33-P0R-4. The release of relay 33-P7R will cause the operation of relay 42-PBRA in a circuit from ground in FIG. 42 through the now closed make contacts 42-41-UNMR-8, now closed break contacts 42-33-P7R-4, 42-33-P06R-8, 42-PBRB-5 and the winding of the relay 42-PBRA to the —48 v. D.C. source in FIG. 42. The operation of pull back relay A, 42-PBRA will initiate a pull-back operation such as that described under Pull Back After Confirmation in section 6 hereinbefore.

If the tape format does not contain a second direct distance dialing number, the tape will advance to the beginning of the end-of-address code sequence and will continue until the reader contacts sense the control holes in the "6" and "7" level aligned with the "LINE FEED" code combination forming a part of the end-of-address code sequence This will initiate a pull-back operation which is described in full in section 16 under the heading End-of-Address Pull-Back. In either of these two cases when the reader clutch magnet 27-RCM re-operates, the succeeding circuit operation will be the same as that described in section 7 under the heading Blinding Called Direct Distance Dialing Number After Pull-Back.

*(21) Transmission Interrupted Alarm*

If it be assumed that an attempt had been made successfully to establish a connection to a called terminating station from the originating station and that the confirmation of this connection has been received and as a result thereof the confirmation relay 38-CFR has operated and the reader clutch magnet 27-RCM has re-operated, then transmission is stopped for any reason the operator should be notified of the break in this transmission. Relay 39-LFR, which is the line following relay, is released each time the sending line relay 35-SLR goes to spacing due to the opening of the contacts 39-35-SLR-4 of the sending line relay. Thus, if the sending line relay 35-SLR stops spacing, indicating the transmission has stopped, the relay 39-LFR will remain energized and will keep its contacts 48-39-LFR-5 open. This will permit the capacitor 48-C1 to charge and if this condition prevails for 45 seconds, tube 48-T1 will fire. The circuit for operating the timer relay to cause it to time out in 45 seconds, rather than in 15 seconds, is operative since confirmation has been received and relay 38-CFR is energized to open its break contacts 48-38-CFR-7 and to open its break contacts and close its make contacts 48-38-CFR-10. The opening of the contacts 48-38-CFR-7 removes the shunt from around the resistor 48-R3 to increase the time interval necessary to fully charge the capacitor 48-C1 and the operation of the transfer contacts 48-38-CFR-10 will complete a circuit through the relay 48-TORB and will break the circuit to the relay 48-TORA. If the failure in transmission condition continues for 45 seconds, relay 48-TORB will be operated and will lock operated through its own contacts in a path from ground (FIG. 48) through the now closed break contacts 48-50-RES-11 now closed make contacts 48-TORB-4 and resistor 48-R6 and the winding of the relay 48-TORB to —120 v. D.C. source in FIG. 48.

When relay 48-TORB is energized, it will complete a circuit from ground in FIG. 50 through its contacts 50-48-TORB-12 break contact 50-reset key-5, break contact 50-RES-4 and the winding of the relay 50-SALA to the —48 v. D.C. source in FIG. 50. The operation of relay 48-TORB will also complete a circuit from ground in FIG. 49 through the now closed make contacts 49-48-TORB-2 and a message interrupted lamp to the —48 v. D.C. source in FIG. 49 to light the message interrupted lamp. When relay 50-SALA is energized, it will open its break contact 27-50-SALA-7 to interrupt the circuit to the reader clutch magnet 27-RCM and stop the reader operation. The operation of relay 50-SALA will also open its contacts 34-50-SALA-5 to release the relay 34-TOHR and by opening its contacts 34-50-SALA-9 it will release the off-hook relay 34-OH in the subscriber's set. If at the time that the relay 50-SALA is operated, the stepper switch 37-LNSS is off of its normal or home position, the energization of the relay 50-SALA will return the stepper switch 37-LNSS to its home position in a circuit from ground in FIG. 37 through 1 to 10 of ARC-2 of 37-LNSS, closed make contacts 37-50-SALA-12, closed break contacts 37-33-P07R2-6, and the interrupter contacts 37-LNSS-INT and the winding of the magnet 37-LNSS to —48 v. D.C. source in FIG. 37. When the relay 50-SALA is operated, it will also close its make contacts to complete a circuit from ground in FIG. 49 through the break contact 49-50-RES-5 and closed make contact 49-50-SALA-10 and closed break contact 49-50-SALB-7 and the alarm cut off key 49-ACO through the contact and armature of the 7F buzzer in FIG. 49 and thence to the —48 v. D.C. source in FIG. 49. This will cause the message interrupt lamp to light and the buzzer to sound calling the attention of the operator to the failure of the circuitry to continue a proper transmission of the message.

When relay 34–TOHR is released, it will release relays 42–PBRB, 34–TOHA, 38–ABR, 34–ONHR, and 38–CFR. The circuit to relay 42–PBRB will be broken by the opening of the make contact of transfer set of contacts 42–34–TOHR–10, the release of relay 34–TOHA will be effected by re-opening the make contacts 34–TOHR–7, the release of relay 38–ABR will be effected by the re-opening of the contacts 38–34–TOHR–3, the release of relay 34–ONHR will be effected by the re-opening of the make contact 34–TOHR–9 and the release of relay 38–CFR will be effected by the re-opening of the contact 38–34–TOHR–11. When relay 34–ONHR is released, it will in turn release relay 53–P3R by opening its contacts 53–34–ONHR–8. When relay 38–CFR is released, it will release the upper notch magnet relay 41–UNMR by re-opening its make contacts 41–38–CFR–12.

(22) Dialing Failure Alarm

If at any time during the dialing operation, when the subscriber's set is transmitting a direct distance dialing number to the telephone line, the dialing operation stops and the reader clutch magnet 27–RCM is not pulsed; the reader contacts 37–AUX–A will fail to close and operate the relay 37–TRR within the 15 seconds that it takes the capacitor 48–C1 to become charged to the point where it will fire the tube 48–T1, the tube 48–T1 will be fired as described hereinbefore to operate the relay 48–TORA. When relay 48–TORA operates, it will complete a circuit from ground in FIG. 50 through its now closed contacts 50–48–TORA–6, now closed break contacts 50–38–ABR–4, now closed make contacts 50–33–P07R1–11 and the now closed break contact 50–reset key–5, now closed break contact 50–RES–4 through the winding of the relay 48–TORA will also effect the release of relay 34–TOHR by opening its break contacts 34–48–TORA–5 and the relay 48–TORA in operating will lock operated through its own contacts 48–TORA–2 and the now closed make contacts 48–50–SALA–8, break contacts 48–TORB–4, and the break contacts 48–50–RES–11 to ground in FIG. 48.

As described in the previous sections, the operation of the relay 50–SALA will home the lower notch stepper switch 37–LNSS if it is not in the home position, will operate the buzzer shown in FIG. 49, will release the off-hook relay 34–OH in the subscriber set, break the operating path to the reader clutch magnet 27–RCM and in addition will operate the dialing failure lamp shown in FIG. 49 by completing a circuit from ground in FIG. 49 through the now closed break contact 49–50–RES–5, the now closed make contact 49–50–SALA–10 and the now closed make contact 49–48–TORA–10 through the dialing failure lamp to −48 v. D.C. source in FIG. 49. In connection with this operation the relase of the relay 34–TOHR will open the circuit to the relays 34–TOHA and 34–ONHR as described in the previous sections.

(23) Mnemonic Transmission Failure Before Confirmation

If it be assumed that the apparatus has been operated to establish a connection from the originating station to a terminating station on the system, as indicated by the receipt of an answer-back signal at the originating station and the consequent operation of the relay 38–ABR, and the reader clutch magnet 27–RCM has been re-operated to present the mnemonic code to the line, and for some reason the transmission is stopped by the release of the reader clutch magnet 27–RCM, the line following relay 39–LFR will open its contacts 48–39–LFR–5 to initiate a timing cycle in the timer relay circuit. When this happens, the operation will be the same as that described under Dialing Failure Alarm in section 22.

(24) Tape Check Alarm

The failure to prepare the tape properly for use in the apparatus will be called to the operator's attention as soon as the faulty portion of the tape format is read by the reader. For example, if a tape is being transmitted and has gone through the cycle to the point where the end-of-address code sequence should be perforated in the tape, but such code sequence has not been perforated in the tape, an alarm will be given. At that point in the operation when the end-of-address code sequence should appear in the tape the connection would have been established through to the called terminating station and an answer-back signal would have been received at the originating station as evidenced by the operation of the answer-back relay 38–ABR. In addition, since the called terminating station has been connected in the circuit, the confirmation signal would have been received at the originating station as evidenced by the operation of the confirmation relay 38–CFR and the tape would have been pulled back and the text of the message transmitted over the line. At that stage in the operation the permutation 0, 7 relay No. 4, 46–P07R4 would have been operated and locked operated. At that point in the operation the relay 46–P67R2 should have been operated, but since the tape format does not contain the end-of-address code sequence, the relay 46–P67R2 would be released. The tape, upon the occurrence of such an event, would be advanced by the reader clutch magnet 27–RCM to the end-of-message code sequence whereupon the reader contacts as shown on FIG. 35 upon the sensing the "0" and "6" control holes in the tape, will cause the relay 46–P06R2 to be operated the next time the contacts in the reader, 33–AUX–B, are closed as described in connection with the previous operation of the relay 46–P06R2. As soon as relay 46–P06R2 is operated, it will lock operated over its own contacts in a circuit from ground in FIG. 46 through the now closed make contacts 46–34–TOHA–2 and the now closed break contacts of the tight tape relay 46–40–TTR–4, the now closed make contacts 46–P06R2–2 and the winding of the relay 46–P06R2 to −48 v. D.C. source in FIG. 46. The energization of relay 46–P06R2 will close its make contacts 46–P06R2–12 to complete a circuit from ground in FIG. 46 through the now closed make contact 46–P07R4–4, now closed break contacts 46–P67R2–5, and make contacts 46–P06R2–12 and break contacts 46–50–RES–3 through the winding of the relay 46–TCFR to −48 v. D.C. source in FIG. 46. This relay will then lock up over its own contacts 46–TCFR–2. In operating the relay 46–TCFR will close its make contacts 49–46–TCFR–12 to complete a circuit from ground in FIG. 49 through the tape check lamp in FIG. 49 to the −48 v. D.C. source, lighting this lamp. The energization of relay 46–TCFR will also cause the operation of the relay 50–SALA by closing its contacts 50–46–TCFR–4 to complete a circuit from ground through these contacts, through the reset key contacts 50 reset key–5 and relay 50–RES–4 through the winding of the relay 50–SALA to −48 v. D.C. source in FIG. 50. This operation of the relay 50–SALA will release the reader clutch, release the relay 34–TOHR, release the off-hook relay 34–OH in the subscriber's set, home the lower notch stepper switch 37–LNSS and operate the 7F buzzer in FIG. 49 in the same manner as was described in connection with failure of the transmission during the confirmation, as described in section 23.

(25) Connection Lost Alarm

If it is assumed that a connection has been established and a message is being transmitted from the originating station to the terminating station and the line connection is broken for any reason, the answer-back relay 38–ABR will be released and will cause relay 38–CAR to operate. If the circuit assurance signal being returned from terminating station ceases for a predetermined length of time, approximately 500 milli-seconds, relay 38–CAR will be operated. The circuit for operating the relay 38–CAR, upon the failure of circuit assurance signals from the terminating station, will cause contacts 38–K3 to be closed to complete a circuit from ground in FIG. 38 through these now closed contacts and the winding of the relay 38–CAR to the −48 v. D.C. source in FIG. 38. The universal contacts in the receiving printer at the terminating station, such as the break contacts 51–UNIV, upon remaining closed for 500 milli-seconds will cause contacts 38–K3 to close. The circuit for energizing the relay 38–CAR, in the event that the relay 38–ABR is released, will be completed from ground in FIG. 38 through the now closed confirmation relay's make contacts 38–CFR–4, the now closed make contacts of the transmitter off-hook relay 38–34–TOHA–12 and the now closed break contacts 38–33–P06R–7 and 38–ABR–9 through the winding of the relay 38–CAR to the −48 v. D.C. source. When the relay 38–CAR is energized, it will lock operated through its own make contacts 38–CAR–12 and the contacts of the reset relay 38–50–RES–8 to ground.

In operating the relay 38–CAR will close its contacts 49–38–CAR–6 to close a circuit from ground in FIG. 49 through the connection lost lamp in FIG. 49 to −48 v. D.C. source. In addition the operation of the relay 38–CAR will complete a circuit to energize the relay 50–SALA by closing its contacts 50–38–CAR–8 over a circuit similar to that described in connection with the tape check alarm circuit described in section 24 and the operation of the relay 50–SALA will open its contacts 34–50–SALA–5 and 34–50–SALA–9 to release relays 34–TOHR and 34–OH as well as closing its contacts 49–50–SALA–10 to operate the buzzer in FIG. 49. The action of this circuit will be exactly the same as that described under the tape check alarm in section 24 when relay 34–TOHR was released.

(26) *Intercept Not Reached Alarm*

In the event that, for some reason, the originating or transmitting station has made three attempts to complete a connection through to the addressed terminating station and these attempts have failed and further that after five dialing attempts have been made to reach the intercept terminating station, no connection has been completed, as described under dialing of the intercept number and answer-back not received in response to the intercept number in sections 12 and 18, an alarm will be given. With the apparatus in the condition it would be in after five unsuccessful attempts have been made to reach the intercept terminating station, the intercept stepping switch 27–INSS whould have stepped to position 6 of its various ARCS and it will also have stepped the lower notch stepping switch 37–LNSS to position 6 on its respective ARCS to record the sixth attempt to reach the direct distance dialing number of the intercept terminating station. Under these conditions the brush or wiper of ARC–4 of 37–LNSS as shown in FIG. 36 will partially close an operating path for relay 36–IALR which is the intercept alarm relay. Since under these conditions the answer-back was not received, relay 48–TORA will be operated as described in section 15 under the answer-back not received and in being so operated relay 48–TORA will release relay 34–TOHR, by opening its break contacts 34–48–TORA–5 and will lock operated as described in connection with the failure to receive an answer-back signal in section 15. In this case the release of relay 34–TOHR will close its break contact 36–34–TOHR–4 to complete a circuit from ground in FIG. 36 through the now closed break contact 36–50–SALA–11 through the common brush of 36–37–LNSS–ARC–4 and contact 6 of ARC–4 of 36–37–LNSS and the now closed make contact 36–ITRB–10 and the now closed break contact 36–34–TOHR–4 through the winding of the relay 36–IALR to −48 v. D.C. source in FIG. 36. When relay 34–TOHR is released it will release relays 34–TOHA, 34–OH and 34–ONHR as described in connection with previous operation of the relay 34–TOHR. The intercept stepper switch 27–INSS will now be stepped to its home position in a circuit from ground (FIG. 27) through the off-normal interrupter switch 27–INSS–ON, now closed make contact 27–48–TORA–4 now closed break contact 27–34–TOHR–6, and the intercept interrupter switch 27–INSS–INT through the winding of the magnet 27–INSS–MAG to the −48 v. D.C. source. When the 27–INSS reaches its home position its off normal contacts 27–INSS–ON will open.

When relay 36–IALR was energized, it locked operated to ground in FIG. 36 through the now closed break contact 36–50–RES–1 and its own make contact 36–IALR–4. The operation of relay 36–IALR will complete a circuit from ground in FIG. 49 through its now closed make contact 49–36–IALR–12 and through the intercept not reached lamp to the −48 v. D.C. source in FIG. 49 to light the intercept not reached lamp. The operation of relay 36–IALR will also operate relay 50–SALA by closing its contacts 50–36–IALR–2 in a manner similar to that described hereinbefore in connection with the operation of the relay 50–SALA. In this case the operation of the relay 50–SALA will complete a circuit from ground associated with the common brush of 37–LNSS–ARC–2 and through contacts 1–10 on that ARC and through the now closed make contacts 37–50–SALA–12, now closed break contacts 37–33–P07R2–6 and the interrupter switch 37–LNSS–INT through the winding of the relay 37–LNSS to −48 v. D.C. source in FIG. 37 to cause this stepper switch to step to its home position. Relay 50–SALA in operating will also open the ground path to ARC–4 of 36–37–LNSS, by opening its break contacts 36–50–SALA–11, and will also, by closing its contacts 48–50–SALA–8, lock relay 48–TORA operated in a path from ground in FIG. 48 through the now closed break contacts 48–50–RES–11 and 48–TORB–4, now closed make contact 48–50–SALA–8 and 48–TORA–2 through the resistor 48–R5 and the winding of relay 48–TORA to the −120 v. D.C. source in FIG. 48.

When intercept stepper switch 27–INSS arrives at its home position, it will not be stepped into its No. 1 position, as described under answer-back not received in response to intercept number in section 18, in view of the fact that the lower notch stepping switch 37–LNSS has been stepped to its home position and therefore when the intercept stepper switch 27–INSS arrives at its home position, it will close its break contacts 27–INSS–ON–3 and open its corresponding make contacts. However, the path to the intercept stepper switch 27–INSS will be broken due to the fact that the stepper switch 37–LNSS has reached its home position and has opened its contacts 27–37–LNSS–ON–2. The operation of the 7F buzzer in FIG. 49 due to the operation of relay 50–SALA will notify the operator that a faulty condition exists and the operator will be apprised of the faulty condition by the alarm lamp which is lighted.

In order to restore the apparatus to an operative condition after the sounding of an alarm for any of the reasons discussed hereinbefore, the operator may operate the alarm silence key 50–ACO–2 to supply a ground connection through any one of the contacts which were closed as a result of an alarm condition to operate relay 50–SALB. For example, the circuit may extend from ground in FIG. 50 through the tape check format relay contacts 50–46–TCFR–4 and through the reset key 50-reset-key-5 and now closed break contacts 50–RES–4 through now closed contacts 50–ACO–2 and the now closed break contacts of the stepper key 50-Step-Key-2 and the now closed break contacts 50–RES–10 through the winding of the relay 50–SALB to the −48 v. D.C. source in FIG. 50. When relay 50–SALB is energized, it will open its break contact 49–50–SALB–7 to break the circuit to the 7F buzzer in FIG. 49 and also it will lock through its own contacts 50–SALB–12 and thence through the path of the relay contacts which had originally energized it, such for example, as the contacts 50–46–TCFR–4. The operation of the relay 50–SALB will also open the operating path to the reader clutch magnet 27–RCM by opening its contacts 27–50–SALB–5.

In order to determine the cause of the failure, the operator will next open the stop-run switch 32–SRTTS to de-energize the stop-run relay 32–SRR. This will open the make contact 27–32–SRR–12. When the operator has ascertained the reason for the alarm, the reset key may be operated to open the break contacts 50–Reset-Key-5 and close the make contact 50–Reset-Key-1. The opening of the break contacts 50–Reset-Key-5 will release the relay 50–SALA and 50–SALB and the closing of contacts 50–Reset-Key-1 will operate the reset relay 50–RES. The circuit for operating relay 50–RES will extend from ground in FIG. 50 through the now closed break contacts 50–Reset-Key-1, the diode 50–D42, the now closed break contacts 50–48–TOTR–7, 50–32–SRR–9, 50–SALB–4 and 50–SALA–3 through the winding of the relay 50–RES to the —48 v. D.C. source in FIG. 50. When relay 50–RES is operated, it will open its break contacts 27–50–RES–6 to break the circuit to the reader clutch magnet 27–RCM, it will close its make contact 27–50–RES–2 to home the intercept stepper switch 27–INSS by forming a shunt path around the contacts 27–48–TORA–4, it will open its contacts 33–50–RES–7 to break the circuit to all the relays which might possibly have been held operated under control of ground in FIG. 33 through this particular contact, it will open its break contacts 36–50–RES–9 and 36–50–RES–1 to release any relays which might have been held up over these circuit paths, it will transfer its contacts 38–50–RES–8 to release relay 38–CAR, it will open its break contacts 46–50–RES–3, to break the circuit path to relay 46–TCFR, it will open its break contacts 48–50–RES–11 and it will open its break contact 50–RES–4 and close its make contact 50–RES–12. Relay 50–RES in operating will complete a circuit from ground in FIG. 27 through its now closed make contacts 27–50–RES–6 to operate the reader clutch magnet to clear out any control hole level that might be stored in the contacts of the reader as shown on FIG. 35. If this condition is maintained, that is, the reset push button is still held down and consequently the reset relay 50–RES is held operated, at the time in the cycle of operation in clearing out the reader, that the auxiliary contacts 37–AUX–A close, a path would be established from ground through the closed contacts 37–AUX–A, diode 37–D43, terminal TE–9 on FIGS. 37 and 50 to re-energize the relay 50–SALB. However, relay 50–SALB will be released as soon as the reset push button is released and the relay 50–RES is de-energized. This will put the apparatus in condition for initiation of a new cycle of operation.

(27) *End-of-Message Pull Back*

In those cases where the same message is to be transmitted to a plurality of terminating stations the tape will have perforated in it more than one address in the form of DDD numbers and mnemonic codes for the terminating stations to whom the message is to be transmitted. When a connection is made to the terminating station, the first address is read from the tape, the operation will be as described hereinbefore. When the end-of-message code sequence is read, the tape will be pulled back and the tape will be advanced again and the first direct distance dialing number sensed by the reader to which the message has not been transmitted will not have perforations in the "6," and "8" levels of the tape and consequently the relay 33–P068R will not be operated. Therefore, when the "0" and "7" control holes are sensed in the tape together with the first digit of the unsent direct distance dialing number, relay 33–P07R1 will be operated in the same manner as described hereinbefore upon reading the first digit of a direct distance dialing number. The operation of relay 33–P07R1 will close its contacts 44–33–P07R1–1 to complete a circuit from ground in FIG. 44 through the now closed break contact 44–45–STC–1, now closed break contact 44–33–P068R–7 and the now closed make contact 44–33–P07R1–1 through the winding of the relay 44–UDR to the —48 v. D.C. source in FIG. 44. The tape will continue to be advanced to read the direct distance dialing number and transmit the message to the terminating station whose address has just been read from the tape. When the reader contacts sense the "0" and "6" control holes in line with the third "N" code combination of the end-of-message code combination sequence it will effect the operation of the relay 33–P06R in the same manner as described hereinbefore in connection with the operation of this relay. When the reader contacts sense the next character which is the fourth "N" in the end-of-message code sequence and find no control holes, the permutation non-relay 33–PNR will be operated and locked operated under control of all of the released permutation control hole relays which are released, in the manner described previously in connection with the operation of the relay 33–PNR. The energization of the relay 33–PNR will also open the operating path to the reader clutch magnet 27–RCM by opening its contacts 27–33–PNR–10 due to the fact that relay 33–P06R is still locked operated and consequently is holding its contacts 27–33–P06R–5 open. The operation of relay 33–PNR will complete a circuit from ground in FIG. 42 through the now closed make contact 42–33–PNR–2 and 42–33–P06R–2, the diode 42–D44, now closed make contacts 42–44–UDR–4 and now closed break contacts 42–PBRB–5 through the winding of the relay 42–PBRA to —48 v. D.C. source in FIG. 42. During this cycle of operation of the apparatus, the opening of the distributor contacts 27–AUX–D will cause relay 34–TOHR to be released by opening the path through terminal TN–38 on FIGS. 27 and 34 and it in turn will release relay 34–ONHR, 34–TOHA, and 34–OH in the subscriber's set. Energization of the relay 42–PBRA will close a circuit from ground in FIG. 43 through the now closed break contacts 43–33–P06R–10 and the now closed make contacts 43–42–PBRA–2 through the winding of the pull back magnet 43–PBM to —48 v. D.C. source in FIG. 43. As a consequence of this action the tape will be pulled back through the reader until the tape becomes taut between the sensing pins and the pull forward feed wheel to operate the tight tape switch 40–TTS thereby to energize the tight tape relay 40–TTR. At this point the tape will be in its original starting position and the circuit action that will forward it is as described under the dialing operation in section 3 and the blinding of the called direct distance dialing number after pull back in section 7.

(28) *Monitor Blinding of Multiaddress Messages*

Figure 47:
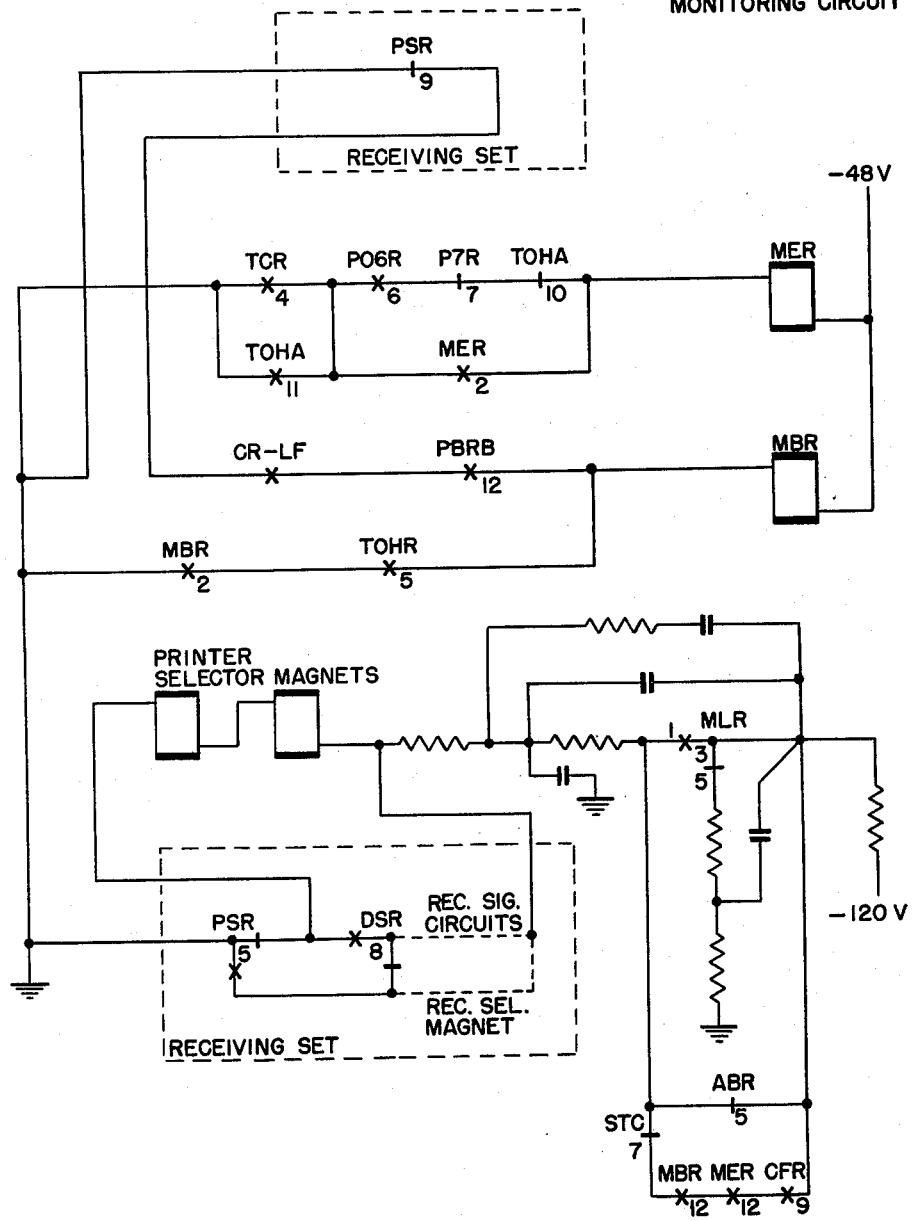

When a message has been transmitted to one addressee and the pull back initiated, as described under End-of-Message Pull Back in section 27, the release of the relay 34–TOHA will complete a circuit from ground in FIG. 47 through the now closed make contacts 47–31–TCR–4 and 47–33–P06R–6, now closed break contacts 47–33–P7R and 47–34–TOHA–10 through the winding of relay 47–MER to —48 v. D.C. source in FIG. 47, thereby to pull up the relay 47–MER which will lock through its own contacts 47–MER–2 and closed make contacts 47–31–TCR–4. Under these conditions, when the tape starts to advance after the pull back, the called direct distance dialing number will be blinded as described under Blinding Called DDD Number After Pull Back in section 7 and the second direct distance dialing number will be transmitted as described under the Dialing Operation in section 3. When as a result of dialing of the second direct distance number a confirmation is received relay 38–CFR will be energized and will lock operated as described hereinbefore in connection with the operation of this relay.

After receipt of the confirmation and the consequent operation of relays 38–CFR the pull back operation will be accomplished as described under confirmation received in section 5. The operation of the reader will also be initiated and as the tape starts to advance and reads the "CARRIAGE RETURN" and "LINE FEED"

code combinations in succession, at the start-of-message code sequence, contacts 51–CR–LF in the "stunt box" of the monitor printer will be closed. FIG. 51 also shows the various code combinations which will close contacts in the "stunt box" for utilization in the operation of the printer in this system. When the "CARRIAGE RETURN" and "LINE FEED" signals are thus received by the monitoring printer and as a consequence contacts 51–CR–LF are closed, contacts 47–CR–LF will also be closed to complete a circuit from ground in FIG. 47 through the break contacts 47–PSR–9, make contacts 47–CR–LF and the now closed make contacts 47–42–PBRB–12 through the winding of the relay 47–MBR to the —48 v. D.C. source in FIG. 47. Energization of relay 47–MBR will complete the shunt path for contacts 47–35–MLR–3 over the contacts of operated relays 47–MBR, 47–MER and 38–CFR, shown in FIG. 47 as contacts 47–MBR–12, 47–MER–12 and 47–38–CFR–9 and the unoperated break contact 47–45–STC–7. This will blind the monitor printer although the signals are being transmitted to the line. The monitor blinding circuit will be removed when relay 34–TOHR releases due to the consequent de-energization of relay 47–MBR, but will be applied again in the same manner if the tape contains another uncalled DDD number. The release of the relay 34–TOHR will release the monitor blinding relay 47–MBR by opening its contacts 47–34–TOHR–5.

Although a particular embodiment of the invention is shown in the drawings and described in the foregoing specification, it will be understood that the invention is not limited to that specific embodiment but is capable of modification, and rearrangement and substitution of parts and elements without departing from the scope of the invention. For example, the contacts designated CALL-TELCO-KEY in FIG. 45 may be closed to energize the service test center relay 45–STC when it is desired to initiate a test of the apparatus. Furthermore, the stop-run switch may be operated to close its contacts 32–SRTTS to energize the stop-run relay 32–SRR and transmitter switch in FIG. 31 may be operated to its various positions to effect such operations as stopping the apparatus after completion of the transmission of a message which is in progress so that a priority message may be sent under control of the operator. These features are inherent in the apparatus and comprise variations in the mode of operation of apparatus, but are still within the concept of the invention.

What is claimed is:

1. In a printing telegraph line switching message transmission system, means operable under control of a tape for attempting to complete a connection to a station the address of which is perforated in permutation code in the tape, means for detecting the success or failure of such attempt, means rendered effective by the detection of the success of such attempt for transmitting a message text under control of the tape to the station the address of which is in the tape, and means operable under control of the detecting means upon the failure of such attempt to initiate at least one more attempt to complete the connection.

2. In a printing telegraph line switching message transmission system, means under control of a tape which has perforated therein a message text and the address of a station to which the text is to be sent for attempting to complete a connection to the station the address of which is perforated in the tape, means for detecting the success or failure of such attempt, means rendered effective by the detection of the success of such attempt for transmitting the message text to the station the address of which is in the tape, means operable under control of the detecting means upon the failure of such attempt to initiate at least one more attempt to complete the connection, and means operable upon the failure of a predetermined number of attempts to complete the connection to a station the address of which is perforated in the tape for automatically attempting to complete a connection to a station other than the station the address of which is perforated in the tape.

3. In a printing telegraph line switching message transmission system, means operable under control of a record member having coded information in it comprising a message text and addresses of stations to which the text is to be sent for attempting to complete a connection to a station the address of which is in the tape, means for detecting the success or failure of such attempt, means rendered effective by the detection of the success of such attempt for transmitting the message to the station to which a connection has been established, and means operable under control of said detecting means for sending the message text and the address of a station to which an attempt to complete a connection has been unsuccessful, to a station the address of which is not in the record member.

4. In a printing telegraph line switching message system, means operable under control of a tape, in which there is perforated a message text and the address of a station to which the text is to be sent, for attempting to complete a connection to said station; means for detecting the success or failure of such attempt; means rendered effective by the detection of the success of such attempt for transmitting the message text to the station the address of which is in the tape, and means for automatically making a plurality of attempts to complete said connection solely under control of the prepared tape.

5. In a printing telegraph line switching message transmission system, means operable under control of a record member, having coded information in it representative of a message text and the address of a station to which the text is to be sent, for attempting to complete a connection to the station the address of which is coded on the record member; means for detecting the success or failure of such attempt; means rendered effective by the success of such attempt for transmitting the message to the station the address of which is on the record member; and means under control of said detecting means for sending the message text and the address of the station on the record member to a station the address of which is not on the record member.

6. In a printing telegraph line switching message transmission system, an originating station and a plurality of terminating stations, means at the originating station for preparing a control member with permutation code indicia representing a message text and the line switching address of a terminating station to which the message is to be sent, a reader for reading the address of the terminating station from said control member, means for translating some of said permutation code indicia into digital pulses, means for utilizing said pulses to attempt to make a connection from the originating station to the terminating station under control of said reading means, means for detecting success or failure of such attempt, means at the terminating station for directing information to the originating station indicating the success or failure of such attempt, and means at the originating station operable under control of the control member for making further attempts to complete said connection when the first attempt is a failure.

7. In a printinng telegraph line switching message transmission system, an originating station and a plurality of terminating stations, means at the originating station for preparing a control member with permutation code indicia representing a message text and the line switching address of a terminating station to which the message is to be sent, a reader for reading the address of the terminating station from said control member, means for translating said permutation code indicia read from said control member into digital pulses, means for utilizing said pulses to attempt to make a connection from the originating station to the terminating station under control of said reading means, means for detecting success or failure of such attempt, means at the terminating station for directing information to the originating station indicating the success or failure of such attempt, and means for attempting to complete a line connection from the originating station to another terminating station upon the failure of the attempts to reach the terminating station whose line switching address is on the control member.

8. In a printing telegraph line switching message transmission system operable under control of a tape perforated with permutation code holes representing a message text, the direct-distance-dialing and mnemonic addresses of terminating stations to which the text is to be sent and with circuit controlling holes, an originating station operated under control of said tape and including cyclically operable tape sensing means, a first tape feed wheel for feeding said tape step-by-step past said sensing means in one direction, a second tape feed wheel for feeding said tape continuously in said one direction, means for driving said first tape feed wheel in the opposite direction, means for initiating step-by-step operation of the first tape feed wheel in said one direction and the tape sensing means, means responsive to the direction by the sensing means of a predetermined code combination in the tape for stopping the operation of said first feed wheel and initiating the operation of said second feed wheel to pull the tape taut between the first and second tape feed wheels, means for detecting said taut-tape condition, means operated by said taut-tape detecting means for latching said second feed wheel against further operation and re-initiating the step-by-step operation of the first feed wheel to read a direct-distance-dialing address from the tape, means for establishing a line connection through the switching system, means responsive to the detection of a second code combination in the tape for rendering the connection establishing means operable, means for putting the cyclically operable tape sensing and first-mentioned tape feed wheel under control of the connection establishing means to cause the reading of successive code combinations from the tape to direct the connection establishing means to attempt to make a connection to a terminating station, means for piercing the tape at a predetermined level to record on the tape the fact that an attempt has been made to complete the connection, means responsive to the completion of a connection for piercing the tape in another predetermined level thereof, means under control of said last-mentioned means for re-initiating operation of the tape sensing means and first feed wheel to transmit over the completed connection the address of the addressed terminating station in mnemonic code, cooperating means at the originating and terminating stations for confirming the fact that the addressed station has been reached, means controlled by said last-mentioned means for re-initiating operation of said first tape feed wheel in said opposite direction to again pull the tape taut between the first and second tape feed wheels, means operated jointly by said taut-tape detecting means and said confirming means for re-initiating operation of the first feed wheel and tape sensing means to again sense the code combinations in the tape and transmit the mnemonic code of the addressed station over the established connection, means for transmitting the address of the originating station in mnemonic code, the time of day and message text over the established connection, means responsive to an end-of-message code sequence in the tape for breaking the established connection, and means for initiating operation of the second feed wheel to feed the tape out of the reader and advance a second section of tape to position to control the system.

9. A system according to claim 8 wherein means are provided for blinding the connecting establishing means to the code signals representing the direct-distance-dialing numbers on the second passage of the tape past the sensing means.

10. A system according to claim 8 wherein the piercing means pierce the tape in an area ahead of the significant code combinations for the direct-distance-dialing number to selectively control the transmission of the code sequences following in the tape.

11. A system according to claim 8 wherein means are provided for interpreting the significance of the pierced holes in the tape to determine whether or not another attempt should be made to complete the connection.

12. A system according to claim 8 wherein the tape may have a plurality of addresses perforated in it ahead of the message text and means are provided for attempting to complete a connection to another address upon failure to complete a connection to a preceding address.

13. The system according to claim 8 wherein means are provided for actuating an alarm if the tape has an improper code sequence perforated in it.

14. The system according to claim 8 wherein means are provided for making at least one attempt to complete a connection to another terminating or intercept station upon failure of a predetermined number of attempts to complete a connection to a terminating station the address of which is in the tape.

15. In a printing telegraph line switching message transmission system operable under control of a perforated tape having in it code sequences representing the telephone address of a terminating station, a message text and control holes, a transmitter distributor for reading the code combinations in the tape, means in said transmitting distributor for feeding tape forward step-by-step to read the perforations representing the address in the tape, feed-out means for feeding the tape forward in a continuous motion, means for feeding the tape backward, means responsive to control perforations in the tape for initiating an operation of the feed-out means for feeding the tape forward in a continuous motion, and for stopping the operation of the means for feeding the tape forward step-by-step to pull the tape taut between the step-by-step and feed-out feeding means, means controlled by the taut tape for re-initiating the operation of the means for feeding the tape step-by-step, means responsive to a predetermined code combination in the tape for disabling the means for feeding the tape step-by-step, and means subsequently operable for initiating the operation of the means for feeding the tape backward to present the previously read perforations in the tape to the transmitter distributor a second time.

16. In printing telegraph line switching message transmission system operated completely under control of perforated tape, an originating station, a plurality of terminating stations, a subscriber set at the originating station for receiving pulses to control attempts to set up a connection from an originating station to a terminating station, transmitter-distributor means at the originating station for reading the address of a terminating station from the tape to generate the pulses for controlling the subscriber set, means for feeding the tape step-by-step past the reading means in a forward direction, means automatically operated after an attempt to complete a connection from the originating station to the terminating station for feeding the tape in a backward direction to present the tape to the reading mechanism a second time and means for re-initiating the forward step-by-step movement of the tape to transmit a message from the originating station to the terminating station to which a connection has been established, and means responsive to a predetermined code combination sequence in the tape for feeding the tape forward in a continuous motion at the completion of the transmission of a message from the originating station to the terminating station.

17. The system according to claim 16 wherein there is provided means for detecting the failure of an attempt to complete a connection to the terminating station whose address was in the tape for re-initiating a cycle of operation of the means for feeding the tape step-by-step to read the address of the terminating station at least one more time.

18. The system according to claim 16 wherein there is provided means for repeatedly attempting to complete a connection between the originating station and the terminating station and means for transmitting the message to a second terminating station after a predetermined number of unsuccessful attempts have been made to complete the connection to the first-named terminating station.

19. A system according to claim 16 wherein there is provided means in the transmitter-distributor for piercing the tape to indicate that an attempt has been made to complete a connection from the originating station to the terminating station.

20. A line switching message according to claim 16 wherein means are provided in the transmitter-distributor for piercing the tape to indicate the successful completion of a connection from the originating station to the terminating station.

21. A system according to claim 16 wherein there are provided means in the transmitter distributor for piercing the tape to indicate an attempt to complete a connection from the originating station to the terminating station, means for piercing the tape to indicate the successful completion of a connection from the originating station to the terminating station, means for detecting the presence or absence of pierces in the tape indicating attempts to complete a connection from an originating station to a terminating station, and means for controlling the feeding of the tape forward and backward through the transmitter distributor under control of the detecting means.

22. In printing telegraph line switching message transmission system operated completely under control of perforated tape, an originating station, a plurality of terminating stations having addresses, a subscriber set at the originating station for receiving pulses to control the setting up of a connection from an originating station to a terminating station, means for reading code combinations representing the address of a terminating station from the tape to generate pulses for controlling the subscriber set, means for feeding the tape step-by-step past the reading means in a forward direction, means responsive to the completion of a connection by the subscribers set from the originating station to the terminating station for feeding the tape in a backward direction to present the tape to the reading mechanism a second time, means for re-initiating the forward step-by-step movement of the tape to transmit a message and one form of the address from the originating station to the terminating station to which a connection has been established, and means controlled by the tape for feeding the tape forward out of the reading means in a continuous motion at the completion of the transmission of a message from the originating station to the terminating station.

23. The system according to claim 22 wherein there is provided means for detecting the failure to complete a connection to the terminating station whose address is in the tape, means operable after an attempt has been made to complete a connection to a terminating station the address of which is in the tape and before a message text is transmitted for re-initiating a cycle of operation to read the address of the terminating station at least one more time and attempt again to complete the connection.

24. The system according to claim 22 wherein there is provided means for repeatedly attempting to complete a connection between the originating station and the terminating station, means for attempting to complete a connection to a second terminating station after a predetermined number of unsuccessful attempts have been made to complete the connection to the first-named terminating station, and means for transmitting the message and information identifying the originating station and addressed station to said second terminating station when a connection is established between the originating station and the second terminating station.

25. In a printing telegraph line switching message transmission system operable under control of a tape having perforated in it a message text, addresses of stations to which the text is to be sent and function controlling perforations means operable under control of the tape for attempting to complete a connection to a station the address of which is in the tape, means for detecting the success or failure of such attempt, means rendered effective by the detection of the success of such attempt for transmitting the message text to the station the address of which is in the tape, and means operable under control of said detecting means for sending the message text and address of the station to which a connection has not successfully been made to a station the address of which is not in the tape.

26. In a printing telegraph line switching message transmission system means for preparing a tape including message text and addresses of stations to which the text is to be sent, means operable under control of the tape for attempting to complete a connection to a station the address of which is in the tape, means for detecting the success or failure of such attempt, means rendered effective by the detection of the success of such attempt for transmitting the message text to the station the address of which is in the tape, and means for automatically making a plurality of attempts to complete said connection under the sole control of the prepared tape when preceding attempts have failed.

27. In a printing telegraph line switching message transmission system, means operable under control of a tape for attempting to complete a connection to a station the address of which is perforated in permutation code in the tape, feeding means for advancing said tape through said last-mentioned means, means for detecting the success or failure of such attempt, means rendered effective by the detection of the success of such attempt for transmitting a message text under control of the tape to the station the address of which is in the tape, and means operable under control of the detecting means upon the failure of such attempt for pulling said tape back through the feeding means and starting another operation of the feeding means to initiate at least one more attempt to complete the connection.

References Cited in the file of this patent
UNITED STATES PATENTS
2,555,714    Talbot ------------------ June 5, 1951